United States Patent
Kawata et al.

(10) Patent No.: US 6,824,838 B2
(45) Date of Patent: Nov. 30, 2004

(54) RETARDERS AND CIRCULAR POLARIZERS

(75) Inventors: Ken Kawata, Minami-ashigara (JP); Hiroshi Takeuchi, Minami-ashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 63 days.

(21) Appl. No.: 10/384,749

(22) Filed: Mar. 11, 2003

(65) Prior Publication Data

US 2004/0004688 A1 Jan. 8, 2004

(30) Foreign Application Priority Data

Mar. 11, 2002 (JP) ......................................... 2002-065573

(51) Int. Cl.[7] .............................................. C09K 19/00
(52) U.S. Cl. ...................... 428/1.31; 428/1.3; 428/1.1; 349/98; 349/117; 349/121
(58) Field of Search ...................... 428/1.1, 1.2, 1.21, 428/1.3, 1.31; 349/74, 76, 81, 82, 83, 84, 98, 117, 121

(56) References Cited

FOREIGN PATENT DOCUMENTS

| JP | 2000-284120 A | 10/2000 |
|---|---|---|
| JP | 2000-284126 A | 10/2000 |
| JP | 2001-4837 A | 1/2001 |
| JP | 2001-21720 A | 1/2001 |
| JP | 2001-91741 A | 4/2001 |
| JP | 2001-91951 A | 4/2001 |
| JP | 2001-155866 A | 6/2001 |
| JP | 2001-183643 A | 7/2001 |
| JP | 2001-272536 A | 10/2001 |

Primary Examiner—Shean C. Wu
Assistant Examiner—Jennifer R. Sadula
(74) Attorney, Agent, or Firm—Burns, Doane, Swecker & Mathis, L.L.P.

(57) ABSTRACT

A novel retarder comprising a long transparent substrate, and up on the substrate, a first and a second optically anisotropic layers formed from a homogenously aligned rod-like liquid crystal compound and having a phase shift substantially equal to n measured and equal to $\pi/2$ respectively at a wavelength of 550 nm; and a first alignment layer having a rubbing axis defining the azimuthal direction of the homogenous alignment in the first anisotropic layer. The angle between the slow axis of the first anisotropic layer and the longitudinal direction of the transparent substrate is 75°, the angle between the slow axis of the second anisotropic layer and the longitudinal direction is 15°, the angle between the slow axis of the second anisotropic layer and the slow axis of the first anisotropic layer is 60° and the azimuthal direction of the homogenous alignment in the first anisotropic layer is substantially orthogonal to the rubbing axis of the first alignment layer.

21 Claims, 2 Drawing Sheets

RETARDERS AND CIRCULAR POLARIZERS

FIELD OF THE INVENTION

The present invention relates to retarders (preferably a phase retardation film) that are useful as λ/4 plates in reflective liquid crystal display devices, pickups for writing on optical discs or anti-reflection coatings; circular polarizers using said retarders; and preparation processes thereof. Particularly, the present invention relates to retarders comprising a long transparent substrate and optically anisotropic layers having a laminate structure of rod-like liquid crystals formed thereon by coating; circular polarizers that can be prepared by laminating such a retarder to a polarizer in a roll-to-roll manner; and preparation processes thereof.

DESCRIPTION OF RELATED ART

λ/4 plates find great many applications and have already been practically used. However, most of λ/4 plates achieve λ/4 only at a specific wavelength though they are called λ/4 plates. JP-A 1998-68816 and JP-A 1998-90521 (the term "JP-A" as used herein means an "unexamined published Japanese patent application") disclose retarders obtained by laminating two optically anisotropic polymer films. In the retarder described in JP-A 1998-68816, a quarter-wave plate forming a birefringence light with a phase difference of a quarter wavelength and a half-wave plate forming a birefringence light with a phase difference of a half wavelength are laminated with their optic axes being crossed. In the retarder described in JP-A 1998-90521, at least two retarders having a retardation value of 160–320 nm are laminated at an angle with their slow axes being neither parallel nor orthogonal to each other. The retarders described in both documents specifically having laminate structures of two polymer films. Both documents explain that λ/4 can be achieved in a wide wavelength region with this arrangement. However, the preparation processes of the retarders described in JP-A 1998-68816 and JP-A 1998-90521 require cutting two polymer films at a predetermined angle and laminating the resulting chips in order to control the optical directions (optic axes or slow axes) of the two polymer films. If retarders are to be prepared by laminating chips, the process becomes complex and other disadvantages occur such as liability to quality failure due to misalignment, decrease in yield, increase in cost and liability to deterioration due to contamination. Moreover, it is difficult to strictly control the retardation value in polymer films.

On the other hand, techniques for more easily providing a broadband v/4 plate by including at least two optically anisotropic layers containing a liquid crystal compound are disclosed in JP-A2001-4837, JP-A2001-21720 and JP-A 2000-206331. Especially, the technique disclosed in JP-A 2001-4837, in which the same liquid crystal molecules can be used, is also attractive in terms of production costs.

During the preparation of a retarder by laminating optically anisotropic layers containing a liquid crystal compound, it is important to control the alignment of the liquid crystal compound. For example, optically anisotropic layers can be formed of homogenously aligned rod-like liquid crystal compounds with respect to a substrate. If a layer containing a rod-like liquid crystal compound is formed on an alignment layer subjected to a rubbing treatment, the rod-like liquid crystal compound is normally homogenously aligned with the long axis being in the rubbing direction. However, our careful studies revealed that the accuracy of liquid crystal alignment decreased when a conventional alignment layer is used for an alignment of liquid crystal molecules in a direction of the rubbing axis to form the liquid crystal molecular layer disclosed in JP-A 2001-4837. It was also found that many optical defects occurred with some types of rod-like liquid crystal compounds or with some types of liquid crystal compositions.

SUMMARY OF THE INVENTION

In view of the problems described above, the present invention aims to provide a retarder (preferably a phase retardation film) that can perform in a broad wavelength range (visible wavelength range) and can be easily and stably prepared in a thin-layer form. The present invention also aims to provide a circular polarizer that can perform in a broad wavelength range (visible wavelength range) and can be easily and stably prepared in a thin-layer form. The present invention also aims to provide a process by which a retarder and a circular polarizer performing well in a broad wavelength range (visible wavelength range) and capable of being in a thin-layer form can be prepared by stably controlling the alignment of the molecules of the liquid crystal compound. The present invention also aims to provide a novel technique for controlling the alignment of rod-like liquid crystals.

As a result of careful studies about retarders having laminate structures of λ/4 liquid crystal layers and λ/2 liquid crystal layers, we found that when an alignment layer which allows liquid crystal molecules to be aligned along the rubbing axis is used, the alignment of the liquid crystal molecules induced by the alignment layer is not stabilized though the rod-like liquid crystal compound should be homogenously aligned at a large azimuthal angle with respect to the longitudinal direction of the transparent substrate to form a λ/2 liquid crystal layer. We also found that liquid crystal molecules are aligned in various directions near free surfaces to bring about optical defects in the liquid crystal molecules though the rod-like liquid crystals in the λ/2 liquid crystal layer and λ/4 liquid crystal layer should be homogenously aligned with high accuracy. Further profound studies based on these findings led us to accomplish the present invention.

In one aspect, the present invention provides a retarder (preferably a phase retardation film) comprising:

a long transparent substrate, and up on the substrate, a first optically anisotropic layer formed from a homogenously aligned rod-like liquid crystal compound and having a phase shift substantially equal to n measured at a wavelength of 550 nm;

a second optically anisotropic layer formed form a homogenously aligned rod-like liquid crystal compound and having a phase shift substantially equal to π/2 measured at a wavelength of 550 nm; and a first alignment layer having a rubbing axis defining the azimuthal direction of the homogenous alignment of the rod-like liquid crystal compound in the first optically anisotropic layer;

wherein the angle between the slow axis in the plane of the first optically anisotropic layer and the longitudinal direction of the transparent substrate is substantially 75°, the angle between the slow axis in the plane of the second optically anisotropic layer and the longitudinal direction of the transparent substrate is substantially 15°, the angle between the slow axis in the plane of the second optically anisotropic layer and the slow axis in the plane of the first optically anisotropic layer is substantially 60° and the azimuthal direction of the homogenous alignment of the rod-like liquid crystal compound in the first optically anisotropic layer is substantially orthogonal to the rubbing axis of the first alignment layer.

As preferred, there are provided the retarder comprising a second alignment layer having a rubbing axis defining the azimuthal direction of the homogenous alignment of the rod-like liquid crystal compound in the second optically anisotropic layer, wherein the angle between the rubbing axis of the first alignment layer and the longitudinal direction of the transparent substrate is substantially −15° and the angle between the rubbing axis of the second alignment, layer and the longitudinal direction of the transparent substrate is substantially 15°; the retarder wherein the first alignment layer is formed of at least one copolymer having at least one of repeating units represented by any one of formulae (I) to (III) below and at least one of repeating units represented by formula (IV) below:

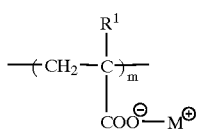  (I)

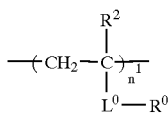  (II)

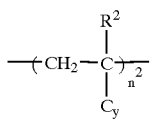  (III)

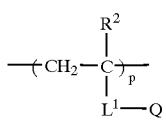  (IV)

wherein $R^1$ to $R^3$ independently represent a hydrogen atom, a halogen atom or an alkyl group having 1 to 6 carbon atoms; M represents a proton, an alkali metal ion or an ammonium ion; $L^0$ and $L^1$ independently represent a divalent linking group selected from the group consisting of —O—, —S—, —CO—, —NR$^4$—, —SO$_2$—, alkylene groups, alkenylene groups, arylene groups and combinations thereof; $R^4$ represents a hydrogen atom or an alkyl group containing 1 to 6 carbon atoms; $R^0$ represents a C10–100 group containing at least two aromatic rings or aromatic heterocycles; Cy represents a condensed aromatic cyclic hydrocarbon group or a condensed aromatic heterocyclic group; Q represents a polymerizable group; and m, $n^1$, $n^2$ and p represent the mol % of each repeating unit where m is 10–99 mol %, $n^1$ and $n^2$ are each 1–90 mol % and p is 0.1–20 mol %; the retarder wherein the first optically anisotropic layer contains at least an agent for promoting homogenous alignment represented by formula (V) below:

(Hb—L$^2$—)$_n$B$^1$        Formula (V)

wherein Hb represents an aliphatic group having 6 to 40 carbon atoms or an aliphatic-substituted oligosiloxanoxy group having 6 to 40 carbon atoms; L$^2$ represents a divalent linking group selected from the group consisting of —O—, —S—, —CO—, —NR$^5$—, —SO$_2$—, alkylene groups, alkenylene groups, arylene groups and combinations thereof; $R^5$ represents a hydrogen atom or an alkyl group having 1 to 6 carbon atoms; n represents an integer of any of 2 to 12; and B$^1$ represents an n-valent group containing at least three cyclic structures;

and wherein the tilt angle of the rod-like liquid crystal compound is substantially less than 10°; and the retarder wherein the rod-like liquid crystal compound in the first optically anisotropic layer or the second optically anisotropic layer is at least one of rod-like liquid crystal compounds of formula (VI) below:

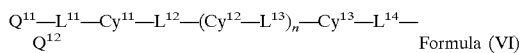

wherein $Q^{11}$ and $Q^{12}$ independently represent a polymerizable group; $L^{11}$ and $L^{14}$ independently represent a divalent linking group; $L^{12}$ and $L^{13}$ independently represent a single bond or a divalent linking group; $Cy^{11}$, $Cy^{12}$ and $Cy^{13}$ independently represent a divalent cyclic group; and n represents 0, 1 or 2.

In another aspect, the present invention provides a method for preparing a retarder comprising the steps of:

forming a first alignment layer up on a long transparent substrate, said first alignment layer having a rubbing axis at an angle of substantially −15° with respect to the longitudinal direction of the transparent substrate, forming a first optically anisotropic layer by applying a rod-like liquid crystal compound to the first alignment layer and homogenously aligning the rod-like liquid crystal compound in an azimuthal direction substantially orthogonal to the rubbing axis of the first alignment layer, so as that the first optically anisotropic layer has a phase shift substantially equal to n measured at a wavelength of 550 nm, forming a second alignment layer on the transparent substrate, said second alignment layer having a rubbing axis at an angle of substantially 15° with respect to the longitudinal direction of the transparent substrate, and forming a second optically anisotropic layer by applying a rod-like liquid crystal compound to the second alignment layer and homogenously aligning the rod-like liquid crystal compound in an azimuthal direction substantially parallel to the rubbing axis of the second alignment layer, so that the second optically anisotropic layer has a phase shift substantially equal to π/2 measured at a wavelength of 550 nm.

In another aspect, the present invention provides a circular polarizer comprising:

a long transparent substrate having a front surface and rear surface, and up on the front surface of the substrate, a first optically anisotropic layer formed of a homogenously aligned rod-like liquid crystal compound and having a phase shift substantially equal to n measured at a wavelength of 550 nm;

a second optically anisotropic layer formed of a homogenously aligned rod-like liquid crystal compound and having a phase shift substantially equal to π/2. measured at a wavelength of 550 nm; and a first alignment layer having a rubbing axis defining the azimuthal direction of the homogenous alignment of the rod-like liquid crystal compound in the first optically anisotropic layer;

and on the rear surface of the substrate,
a polarizing film having a polarization axis substantially orthogonal to the longitudinal direction of the substrate;
wherein the angle between the slow axis in the plane of the first optically anisotropic layer and the longitudinal direction of the transparent substrate is substantially 75°, the angle between the slow axis in the plane of the second optically anisotropic layer and the longitudinal direction of the transparent substrate is substantially 15°, the angle between the slow axis in the plane of the second optically anisotropic layer and the slow axis in the plane of the first optically anisotropic layer is substantially 60° and the azimuthal direction of the homogenous alignment of the rod-like liquid crystal compound in the first optically anisotropic layer is substantially orthogonal to the rubbing axis of the first alignment layer.

In another aspect, the present invention provides a method for preparing a circular polarizer comprising the steps of:
forming a first alignment layer up on a front surface of a long transparent substrate, said first alignment layer having a rubbing axis at an angle of substantially −15° with respect to the longitudinal direction of the transparent substrate,
forming a first optically anisotropic layer by applying a rod-like liquid crystal compound to the first alignment layer and homogenously aligning the rod-like liquid crystal compound in an azimuthal direction substantially orthogonal to the rubbing axis of the first alignment layer, so as that the first optically anisotropic layer has a phase shift substantially equal to n measured at a wavelength of 550 nm,
forming a second alignment layer on the transparent substrate, said second alignment layer having a rubbing axis at an angle of substantially 15° with respect to the longitudinal direction of the transparent substrate,
forming a second optically anisotropic layer by applying a rod-like liquid crystal compound to the second alignment layer and homogenously aligning the rod-like liquid crystal compound in an azimuthal direction substantially parallel to the rubbing axis of the second alignment layer, so as that the second optically anisotropic layer has a phase shift substantially equal to π/2 measured at a wavelength of 550 nm, and
forming a polarizing film on a rear surface of the substrate, having an absorption axis substantially parallel to the longitudinal direction of the transparent substrate and a polarization axis in a direction substantially perpendicular to the longitudinal direction of the transparent substrate.

As used herein, the expressions "substantially 15°", "substantially −15°", "substantially 75°", "substantially 60°", "substantially parallel" and "substantially orthogonal" mean that each angle is within the range of the exact angle less than 5°. The error from the exact angle is preferably less than 4°, more preferably less than 3°. As used herein, the "slow axis" means the direction in which the refractive index is maximum and the "rubbing axis" means the direction of rubbing. Also as used herein, the expressions "a front surface of a transparent substrate" and "a rear surface of a transparent substrate" simply mean the directions viewed from the transparent substrate, but should not be construed to limit embodiments in which retarders and circular polarizers of the present invention are used.

DESCRIPTION OF THE PREFERRED EMBODIMENTS

A retarder of the present invention comprises a transparent substrate, and a first optically anisotropic layer having a phase shift substantially equal to n measured at a wavelength of 550 nm and a second optically anisotropic layer having a phase shift substantially equal to π/2 measured at a wavelength of 550 nm, laminated at the top thereof. The first optically anisotropic layer contains a homogenously aligned rod-like liquid crystal compound, and the second optically anisotropic layer contains a homogenously aligned rod-like liquid crystal compound. On the other hand, a circular polarizer of the present invention comprises a retarder of the present invention and a polarizing film at the bottom of the transparent substrate of the retarder. In retarders and circular polarizers of the present invention, the order in which the first optically anisotropic layer and the second optically anisotropic layer are laminated is not specifically limited, and either may be closer to the transparent substrate. In the present invention, the optically anisotropic layers preferably consist of the first and second optically anisotropic layers.

Each of the first and second optically anisotropic layers may achieve a phase shift of substantially equal to π or π/2 at a specific wavelength. However, they preferably achieve a phase shift of π or π/2 at 550 nm, a wavelength near the center of the visible region. In order to achieve a phase shift of π at a specific wavelength (λ), the retardation value of the optically anisotropic layer measured at the specific wavelength (λ) may be adjusted to λ/2. In order to achieve a phase shift of π/2 at a specific wavelength (λ), the retardation value of the optically anisotropic layer measured at the specific wavelength (λ) may be adjusted to λ/4. That is, the first optically anisotropic layer preferably has a retardation value of 240 to 290 nm, more preferably 250 to 280 nm measured at a wavelength of 550 nm. The second optically anisotropic layer preferably has a retardation value of 110 to 145 nm, more preferably 120 to 140 nm measured at a wavelength of 550 nm.

The retardation value means the in-plane retardation value for the light entered from the normal direction of the optically anisotropic layer. Specifically, it is defined by the equation below:

$$\text{Retardation value } (Re) = (nx - ny) \times d$$

where nx and ny mean the principal refractive indices in the plane of an optically anisotropic layer or a birefringent film, and d is the thickness (nm) of the optically anisotropic layer or birefringent film. JP-A 1998-68816 contains an explanation of the achievement of circular polarization by the Poincare sphere.

Figure 1:
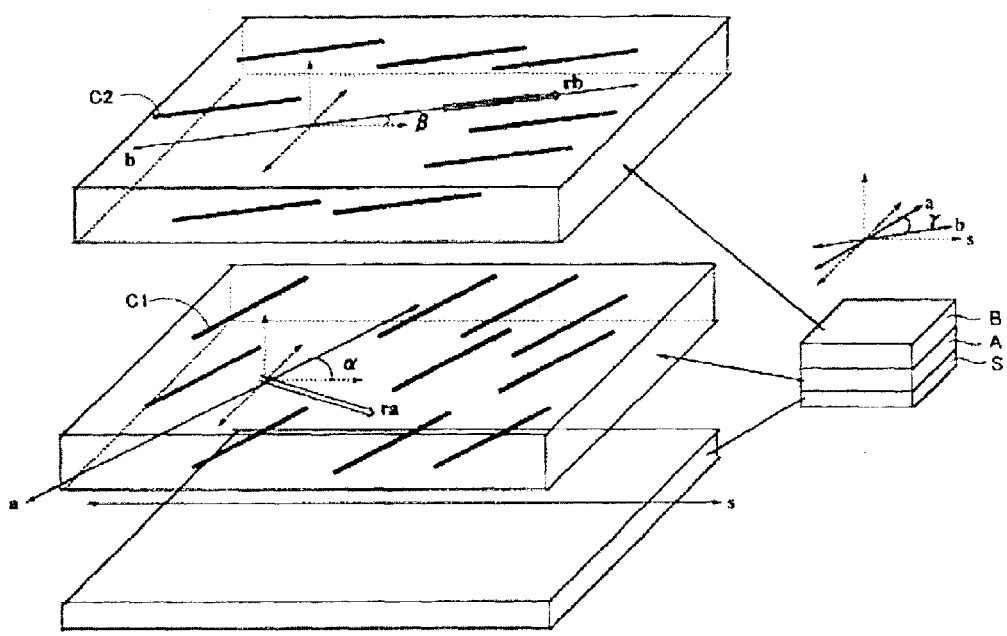
FIG. 1 is a schematic diagram showing a basic structure of a retarder of the present invention.

FIG. 1 is a schematic diagram showing a basic structure of a retarder of the present invention. As shown in FIG. 1, a basic retarder has a transparent substrate (S), a first optically anisotropic layer (A) and a second optically anisotropic layer (B). The first optically anisotropic layer (A) has a phase shift substantially equal to π, and the second optically anisotropic layer (B) has a phase shift substantially equal to π/2. The angle (α) between the longitudinal direction (s) of the transparent substrate (S) and the slow axis (a) in the plane of the first optically anisotropic layer (a) is 75°. The rubbing axis (ra) of the alignment layer and the slow axis (a) in the first optically anisotropic layer (A) are orthogonal to each other. The angle (β) between the slow axis (b) in the plane of the second optically anisotropic layer (B) and the longitudinal direction (s) of the transparent substrate (S) is 15°. The rubbing axis (rb) of the alignment layer and the slow axis (b) in the second optically anisotropic layer (B) have the same direction. And, the angle (γ) between the slow axis (b) in the plane of the second optically anisotropic layer (B) and the slow axis (a) in the plane of the first optically anisotropic layer (A) is 60°. The first optically anisotropic layer (A) and the second optically anisotropic layer (B) shown in FIG. 1 contain rod-like liquid crystal molecules (c1 and c2). The rod-like liquid crystal molecules (c1 and c2) are homogenously aligned. The longitudinal directions of the rod-like liquid crystal molecules (c1 and c2) correspond to the slow axes (a and b) in the planes of the optically anisotropic layers (A and B).

Figure 2:
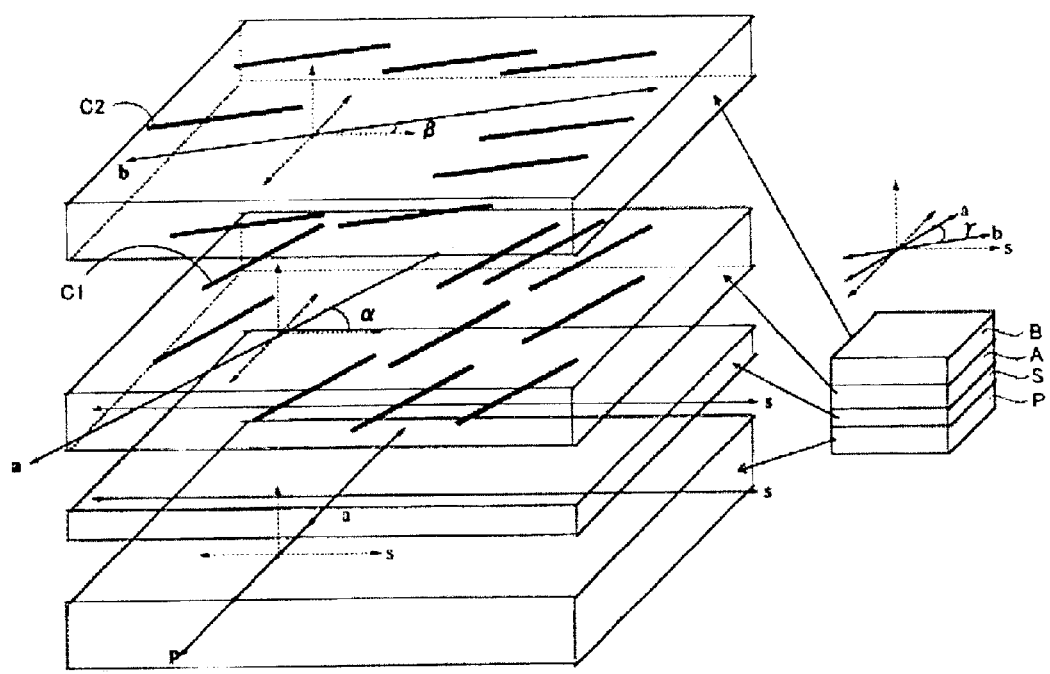
FIG. 2 is a schematic diagram showing a typical structure of a circular polarizer of the present invention.

FIG. 2 is a schematic diagram showing a typical structure of a circular polarizer of the present invention. The circular polarizer shown in FIG. 2 further comprises a polarizing film (P) in addition to the transparent substrate (S), first optically anisotropic layer (A) and second optically anisotropic layer (B) shown in FIG. 1. In the same manner as shown in FIG. 1, the angle (α) between the longitudinal direction (s) of the transparent substrate (S) and the slow axis (a) in the plane of the first optically anisotropic layer (A) is 75°, the angle (β) between the slow axis (b) in the plane of the second optically anisotropic layer (B) and the longitudinal direction (s) of the transparent substrate (S) is 15°, and the angle (γ) between the slow axis (b) in the plane of the second optically anisotropic layer (B) and the slow axis (a) in the plane of the first optically anisotropic layer (A) is 60°. In addition, the polarization axis (p) of the polarizing film (P) and the longitudinal direction (s) of the transparent substrate (S) are orthogonal to each other. The first optically anisotropic layer (A) and the second optically anisotropic layer (B) shown in FIG. 2 also contain rod-like liquid crystal molecules (c1 and c2). The rod-like liquid crystal molecules (c1 and c2) are homogenously aligned. The longitudinal directions of the rod-like liquid crystal molecules (c1 and c2) correspond to the slow axes (a and b) in the planes of the optically anisotropic layers (A and B).

Materials used for preparing retarders of the present invention and preparation examples thereof are explained in detail below. For convenience of explanation, the following description relates to processes for preparing retarders in which the first optically anisotropic layer and the second optically anisotropic layer are successively laminated on the transparent substrate, but the first and second optically anisotropic layers may be laminated in the reverse order.

In a retarder of the present invention, a first alignment layer defining the azimuthal angle of the homogenous alignment of the rod-like liquid crystal compound contained in the first optically anisotropic layer is first formed at on the transparent substrate.

The present invention is characterized in that an alignment layer subjected to a rubbing treatment is used to homogenously align the rod-like liquid crystal compound in the first optically anisotropic layer in a direction substantially orthogonal to the rubbing axis of the alignment layer so that the rod-like liquid crystal compound is homogenously aligned in a direction at an angle of substantially 75° with respect to the longitudinal direction of the transparent substrate. When the optic axes of the molecules of the rod-like liquid crystal compound are to be aligned at an angle greater than 45° with respect to the longitudinal direction of the transparent substrate, stable alignment can be achieved by using an alignment layer that allows the optic axes of the rod-like liquid crystal molecules to be aligned in a direction orthogonal to the rubbing direction (hereinafter referred to as an orthogonal alignment layer).

For example, a solution of a polymer constituting a material of the orthogonal alignment layer described below is applied on the surface of a long transparent substrate and dried to form a film, which is then subjected to a rubbing treatment to form an orthogonal alignment layer. The rubbing process can be performed by rubbing the surface of the film in a direction several times with paper or a cloth. In the present invention, the rubbing treatment can be performed in a direction at an angle of substantially −15° with respect to the longitudinal direction of the transparent substrate. That is, the rubbing process can be performed in such a manner that the angle between the rubbing axis and the longitudinal direction of the transparent substrate is substantially −15°. A coating solution containing a rod-like liquid crystal compound is applied to thus formed orthogonal alignment layer, so that the rod-like liquid crystal molecules are aligned in a direction at an angle of 90° with respect, to the rubbing axis of the orthogonal alignment layer. That is, the rod-like liquid crystal compound can be aligned in a direction at an angle of 75° with respect to the longitudinal direction of the transparent substrate to form a first optically anisotropic layer having a phase shift of π.

The thickness of the orthogonal alignment layer is preferably 0.01 to 5 μm, more preferably 0.05 to 1 μm.

The first alignment layer (orthogonal alignment layer) may be formed on a temporary substrate and the liquid crystal compound in the first optically anisotropic layer may be aligned and then the first layer may be transferred onto the transparent substrate. The liquid crystal compound fixed in an alignment can remain the alignment without the first alignment layer.

The first alignment layer is an orthogonal alignment layer which allows the rod-like liquid crystal compound in the first optically anisotropic layer to be homogenously aligned in a direction substantially orthogonal to the rubbing axis. Materials that can be applied to the present invention as materials for the orthogonal alignment layer are described in JP-A 2002-062427, JP-A 2002-098836, JP-A2001-254481 and Japanese Application No. 2000-174829. Especially preferred are orthogonal alignment layers formed of a copolymer comprising a repeating unit of any one of formulae (I), (II) and (III) below and a repeating unit of formula (IV) below:

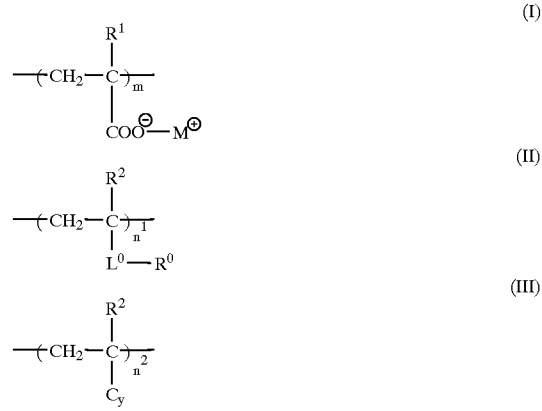

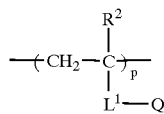
(IV)

wherein $R^1$ to $R^3$ independently represent a hydrogen atom, a halogen atom or an alkyl group having 1 to 6 carbon atoms; M represents a proton, an alkali metal ion or an ammonium ion; $L^0$ and $L^1$ independently represent a divalent linking group selected from the group consisting of —O—, —S—, —CO—, —NR$^4$—, —SO$_2$—, alkylene groups, alkenylene groups, arylene groups and combinations thereof; $R^4$ represents a hydrogen atom or an alkyl group having 1 to 6 carbon atoms; R represents a C10–100 group containing at least two aromatic rings or aromatic heterocycles; Cy represents a condensed aromatic cyclic hydrocarbon group or a condensed aromatic heterocyclic group; Q represents a polymerizable group; and m, $n^1$, $n^2$ and p represent the mol % of each repeating unit where m is 10–99 mol %, $n^1$ and $n^2$ are each 1–90 mol % and p is 0.1–20mol %.

Formulae (I) to (III) above are explained in detail below.

In formula (I) above, $R^1$ represents a hydrogen atom, a halogen atom or an alkyl group containing 1 to 6 carbon atoms. $R^1$ preferably represents a hydrogen atom or an alkyl group having 1 to 6 carbon atoms, more preferably a hydrogen atom, a methyl group or an ethyl group, most preferably a hydrogen atom or a methyl group. Compounds wherein $R^1$ is a hydrogen atom are acrylic copolymers and compounds wherein $R^1$ is methyl are methacrylic copolymers.

In formula (I) above, M represents a proton, an alkali metal (e.g., Na, K) ion or an ammonium ion. The ammonium ion (including primary to quaternary ammonium ion) may be substituted by organic groups (e.g., methyl). Examples of ammonium ions include $^+NH_4$, $^+NH_3CH_3$, $^+NH_2(CH_3)_2$, $^+NH(CH_3)_3$ and $^+N(CH_3)_4$.

Acrylic copolymers of formula (I) above are soluble in water because COOM is a hydrophilic group. Thus, the alignment layer can be formed with an aqueous solvent.

In formula (I) above, m represents the mol % of the repeating unit in the range of 10 to 99 mol %. m is preferably 10 to 95 mol %, more preferably 25 to 90 mol %.

In formula (II) above, $R^2$ represents a hydrogen atom, a halogen atom or an alkyl group having 1 to 6 carbon atoms. $R^2$ preferably represents a hydrogen atom or an alkyl group having 1 to 6 carbon atoms, more preferably a hydrogen atom, a methyl group or an ethyl group, most preferably a hydrogen atom or a methyl group.

In formula (II) above, $L^0$ represents a divalent linking group selected from the group consisting of —O—, —S—, —CO—, —NR$^4$—, —SO$_2$—, alkylene groups, alkenylene groups, arylene groups and combinations thereof, preferably —CO—L$^2$— where —CO— is bonded to the backbone and —L$^2$— represents a divalent linking group selected from the group consisting of —O—, —CO—, —NR$^4$—, alkylene groups and combinations thereof. $L^0$ is preferably —CO—O—, —CO—NH—, —CO—O-alkylene-, —CO—O-alkylene-O— or —CO—O-alkylene-CO—O—, especially —CO—O— or —CO—NH—. The alkylene group may be branched or may have a cyclic structure. The alkylene group preferably contains 1 to 30, more preferably 1 to 15, most preferably 1 to 12 carbon atoms.

In formula (II) above, $R^0$ represents a substituted or unsubstituted C10–100 hydrocarbon group containing at least two aromatic rings or aromatic heterocycles, which may be substituted. The aromatic rings or aromatic heterocycles are preferably aromatic rings, preferably containing 6 to 18 carbon atoms. Examples of aromatic rings include benzene, naphthalene, anthracene, phenanthrene, pyrene and naphthacene rings. Examples of aromatic heterocycles include pyridine and pyrimidine rings. Benzene and naphthalene rings are preferred, and benzene is most preferred.

Substituents that the aromatic rings or aromatic heterocycles may have include halogen atoms, carboxyl, cyano, nitro, carbamoyl, sulfamoyl, alkyl groups, cycloalkyl groups, alkoxy groups, alkylthio groups, acyl groups, acyloxy groups, alkyl-substituted carbamoyl groups, alkyl-substituted sulfamoyl groups, amide groups, sulfonamide groups and alkylsulfonyl groups.

In formula (II) above, the group linking the plurality of aromatic rings independently represents an ethynylene group, a single bond, —CO—, —O—CO—, —CO—O—, -alkylene-O—, —CO—NH—, —O—CO—O—, —NHSO$_2$— or —NH—CO—O—. Preferably, at least one represents a single bond or an ethynylene group.

In formula (II) above, $n^1$ represents the mol. % of the repeating unit in the range of 1 to 90 mol. %. $n^1$ is preferably 5 to 80 mol %, more preferably 10 to 70 mol %. Examples of repeating units having a hydrocarbon group having 2, 3 or 4 aromatic rings or aromatic heterocycles in the side chain are shown below.

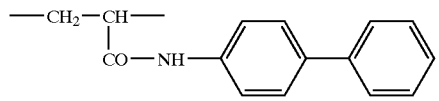
(VI-1)

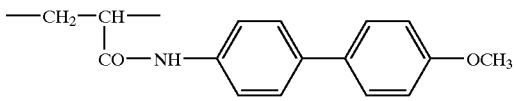
(VI-2)

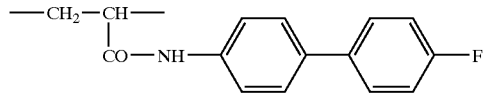
(VI-3)

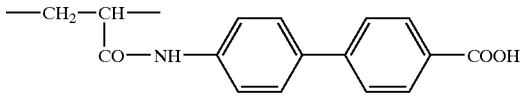
(VI-4)

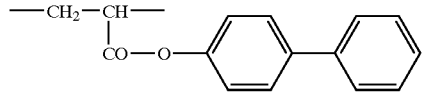
(VI-5)

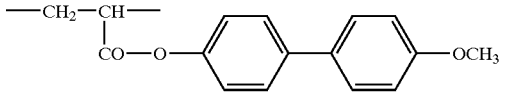
(VI-6)

-continued
(VI-7) 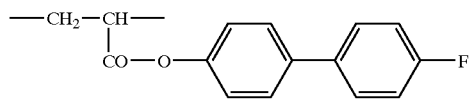
(VI-8) 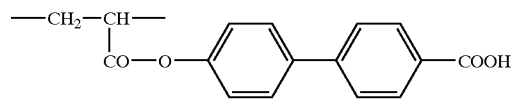
(VI-9) 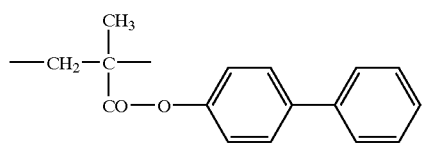
(VI-10) 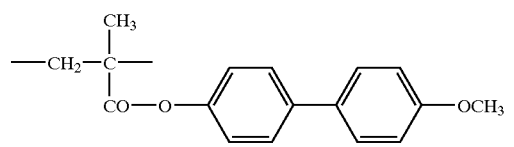
(VI-11) 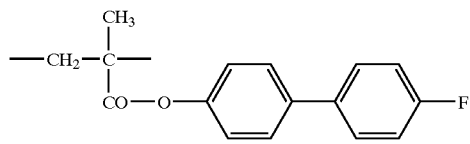
(VI-12) 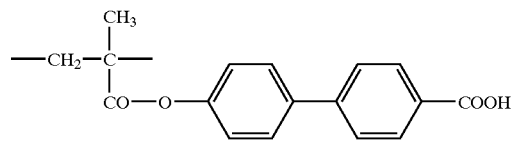
(VI-13) 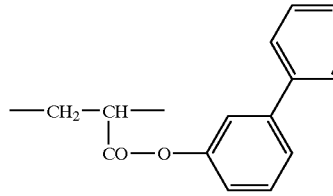
(VI-14) 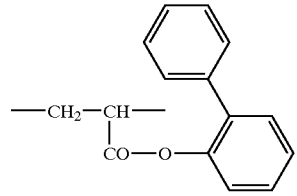
(VI-15) 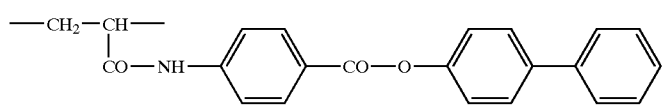
(VI-16) 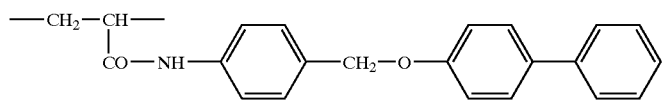
(VI-17) 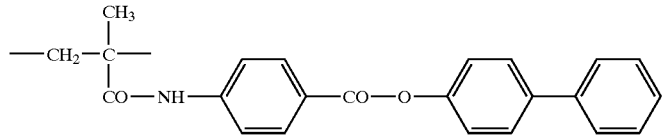
(VI-18) 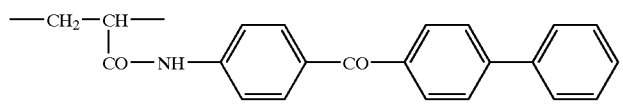
(VI-19) 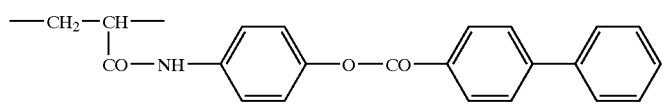
(VI-20) 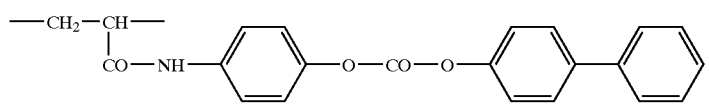
(VI-21)
(VI-22) 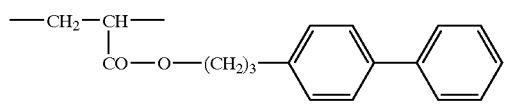

-continued
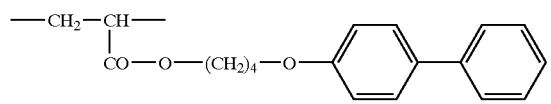 (VI-23)
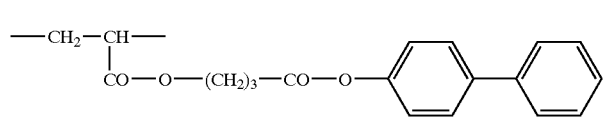 (VI-24)
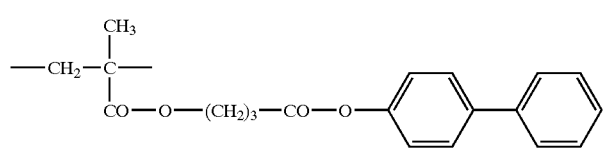 (VI-25)
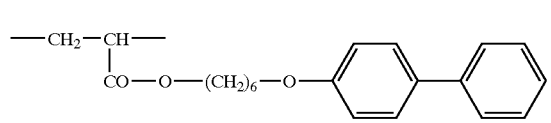 (VI-26)
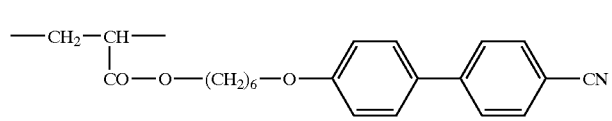 (VI-27)
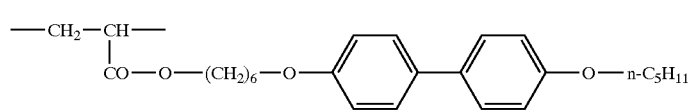 (VI-28)
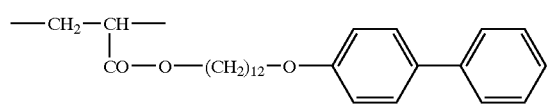 (VI-29)
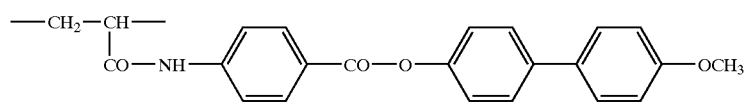 (VI-30)
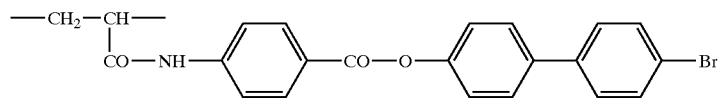 (VI-31)
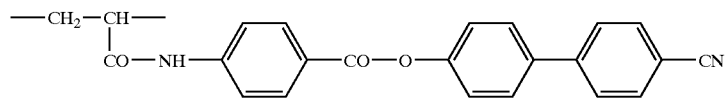 (VI-32)
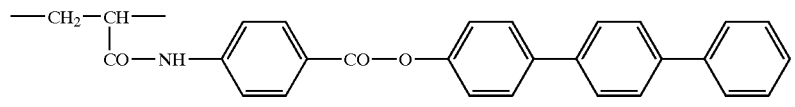 (VI-33)
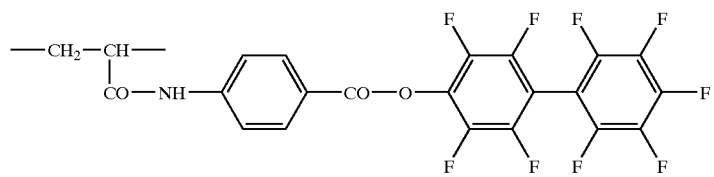 (VI-34)

-continued
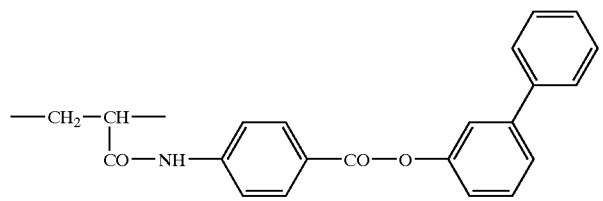
(VI-35)
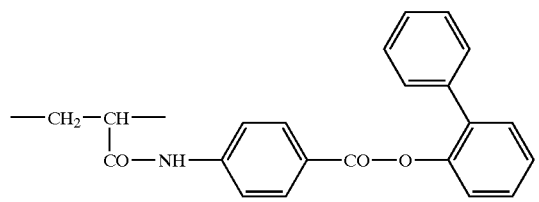
(VI-36)
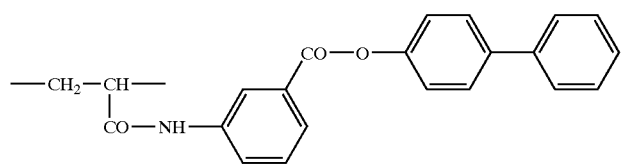
(VI-37)
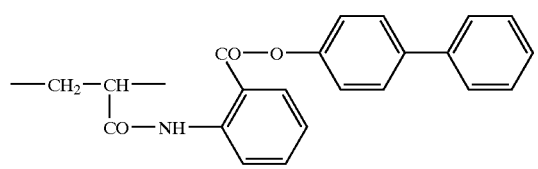
(VI-38)
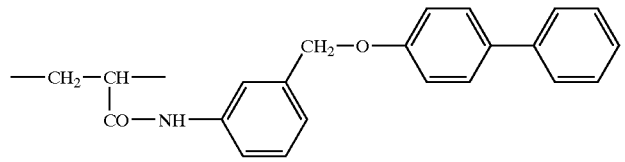
(VI-39)
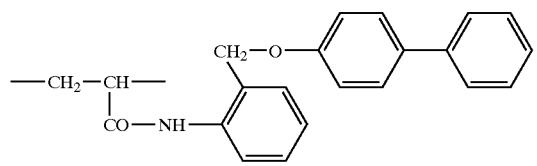
(VI-40)
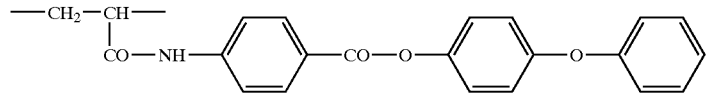
(VI-41)
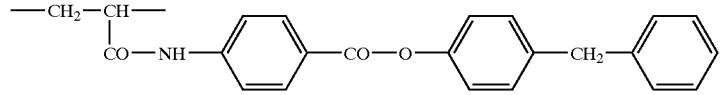
(VI-42)
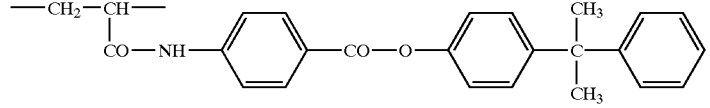
(VI-43)
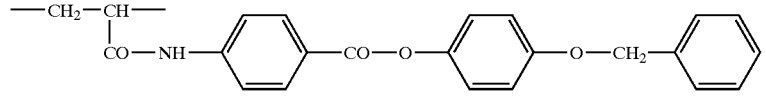
(VI-44)

-continued
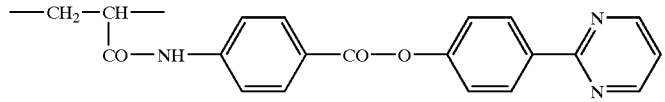
(VI-45)
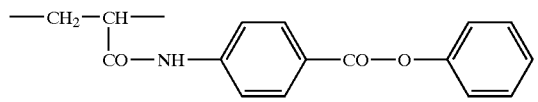
(VI-46)
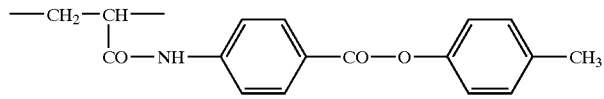
(VI-47)
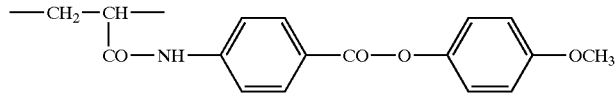
(VI-48)
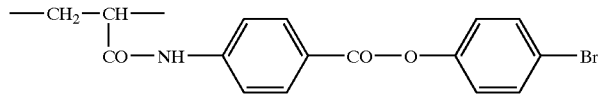
(VI-49)
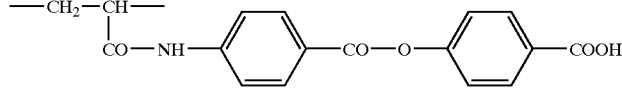
(VI-50)
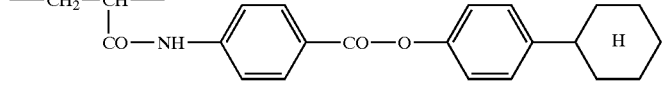
(VI-51)
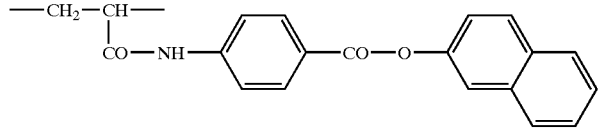
(VI-52)
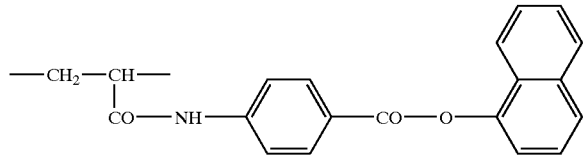
(VI-53)
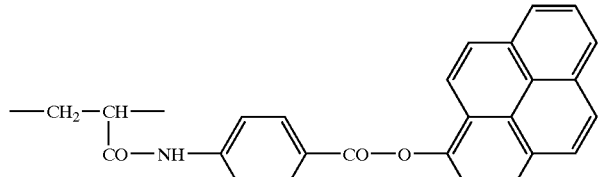
(VI-54)
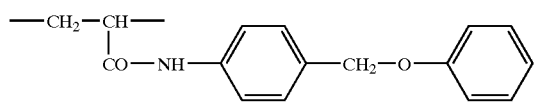
(VI-55)
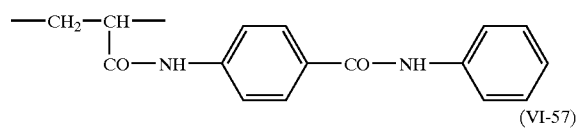
(VI-56)
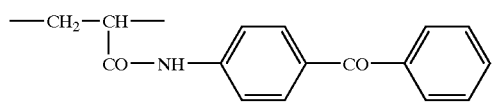
(VI-57)

Examples of acrylic copolymers containing a repeating unit having a hydrocarbon group having 2, 3 or 4 aromatic rings or aromatic heterocycles in the side chain are shown below. AA means a repeating unit derived from acrylic acid and MA means a repeating unit derived from methacrylic acid. The proportion of each repeating unit is expressed in mol %.

| | |
|---|---|
| PA301: | -(AA)$_{60}$-(VI-1)$_{40}$- |
| PA302: | -(AA)$_{70}$-(VI-2)$_{30}$- |
| PA303: | -(AA)$_{60}$-(VI-5)$_{40}$- |
| PA304: | -(AA)$_{65}$-(VI-9)$_{55}$- |
| PA305: | -(AA)$_{70}$-(VI-11)$_{30}$- |
| PA306: | -(AA)$_{80}$-(VI-15)$_{20}$- |
| PA307: | -(AA)$_{70}$-(VI-15)$_{30}$- |
| PA308: | -(AA)$_{60}$-(VI-15)$_{40}$- |
| PA309: | -(AA)$_{70}$-(VI-16)$_{30}$- |
| PA310: | -(AA)$_{60}$-(VI-16)$_{40}$- |
| PA311: | -(AA)$_{50}$-(VI-16)$_{50}$- |
| PA312: | -(AA)$_{70}$-(VI-18)$_{30}$- |
| PA313: | -(AA)$_{60}$-(VI-18)$_{40}$- |
| PA314: | -(AA)$_{50}$-(VI-18)$_{50}$- |
| PA315: | -(AA)$_{60}$-(VI-23)$_{40}$- |
| PA316: | -(AA)$_{60}$-(VI-25)$_{40}$- |
| PA317: | -(AA)$_{60}$-(VI-32)$_{40}$- |
| PA318: | -(AA)$_{60}$-(VI-35)$_{40}$- |
| PA319: | -(AA)$_{60}$-(VI-37)$_{40}$- |
| PA320: | -(AA)$_{60}$-(VI-45)$_{40}$- |
| PA321: | -(AA)$_{60}$-(VI-55)$_{40}$- |
| PA322: | -(MA)$_{60}$-(VI-1)$_{40}$- |
| PA323: | -(MA)$_{70}$-(VI-2)$_{30}$- |
| PA324: | -(MA)$_{60}$-(VI-5)$_{40}$- |
| PA325: | -(MA)$_{65}$-(VI-9)$_{35}$- |
| PA326: | -(MA)$_{70}$-(VI-11)$_{30}$- |
| PA327: | -(MA)$_{80}$-(VI-15)$_{20}$- |
| PA328: | -(MA)$_{70}$-(VI-15)$_{30}$- |
| PA329: | -(MA)$_{60}$-(VI-15)$_{40}$- |
| PA330: | -(MA)$_{70}$-(VI-16)$_{30}$- |
| PA331: | -(MA)$_{60}$-(VI-16)$_{40}$- |
| PA332: | -(MA)$_{50}$-(VI-16)$_{50}$- |
| PA333: | -(MA)$_{70}$-(VI-18)$_{30}$- |
| PA334: | -(MA)$_{60}$-(VI-18)$_{40}$- |
| PA335: | -(MA)$_{50}$-(VI-18)$_{50}$- |
| PA336: | -(MA)$_{60}$-(VI-23)$_{40}$- |
| PA337: | -(MA)$_{60}$-(VI-25)$_{40}$- |
| PA338: | -(MA)$_{60}$-(VI-32)$_{40}$- |
| PA339: | -(MA)$_{60}$-(VI-35)$_{40}$- |
| PA340: | -(MA)$_{60}$-(VI-37)$_{40}$- |
| PA341: | -(MA)$_{60}$-(VI-45)$_{40}$- |
| PA342: | -(MA)$_{60}$-(VI-55)$_{40}$- |

The repeating unit having a hydrocarbon group having 2, 3 or 4 aromatic rings or aromatic heterocycles in the side chain preferably has a tolan structure.

Examples of repeating units having a hydrocarbon group having 2, 3 or 4 aromatic rings or aromatic heterocycles in the side chain having a tolan (diphenylacetylene) structure are shown below.

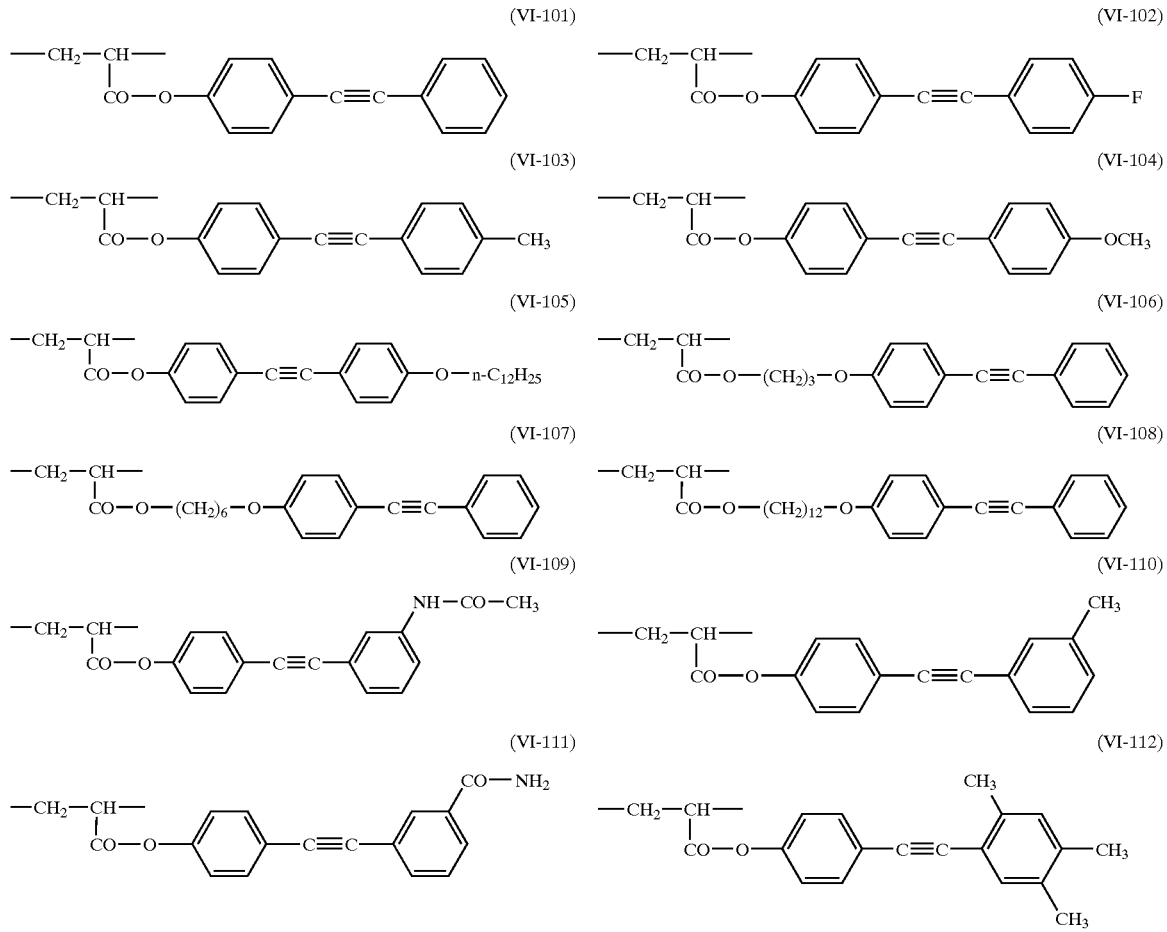

-continued
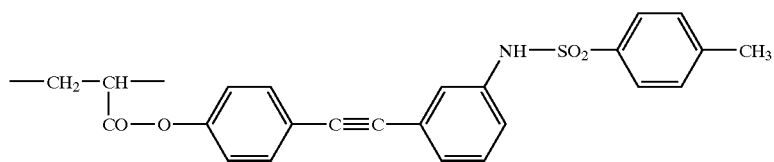
(VI-113)
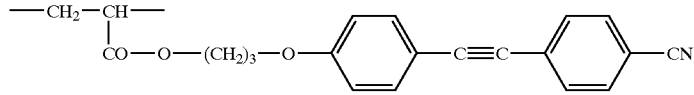
(VI-114)
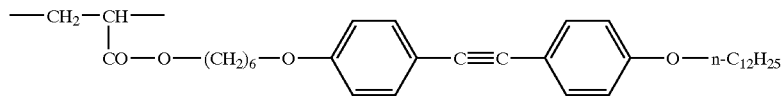
(VI-115)
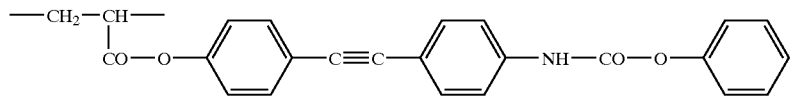
(VI-116)
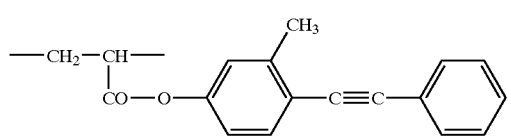
(VI-117)
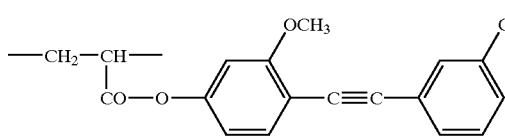
(VI-118)
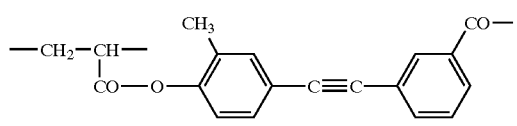
(VI-119)
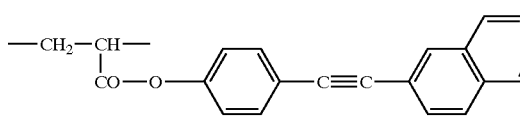
(VI-120)
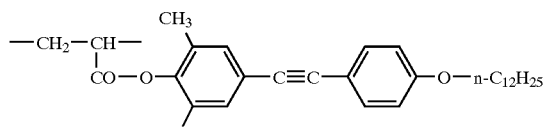
(VI-121)
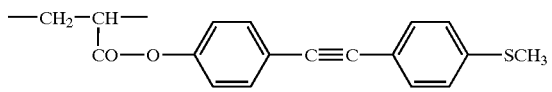
(VI-122)
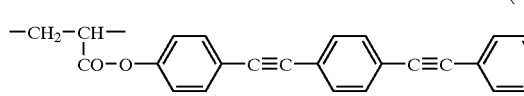
(VI-123)
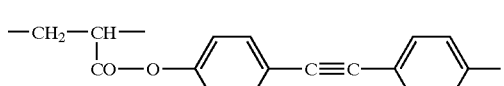
(VI-124)
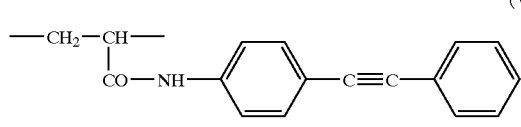
(VI-125)
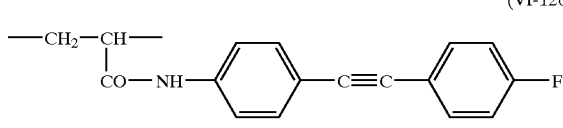
(VI-126)
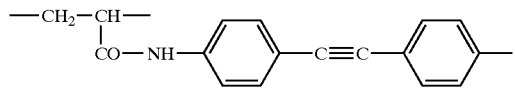
(VI-127)
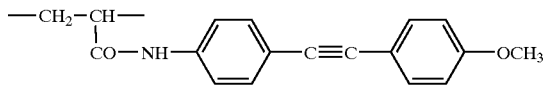
(VI-128)
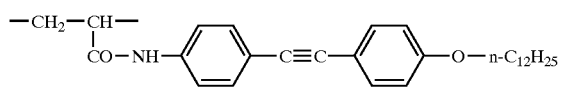
(VI-129)
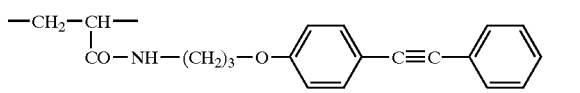
(VI-130)
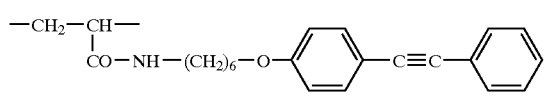
(VI-131)
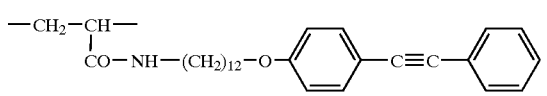
(VI-132)

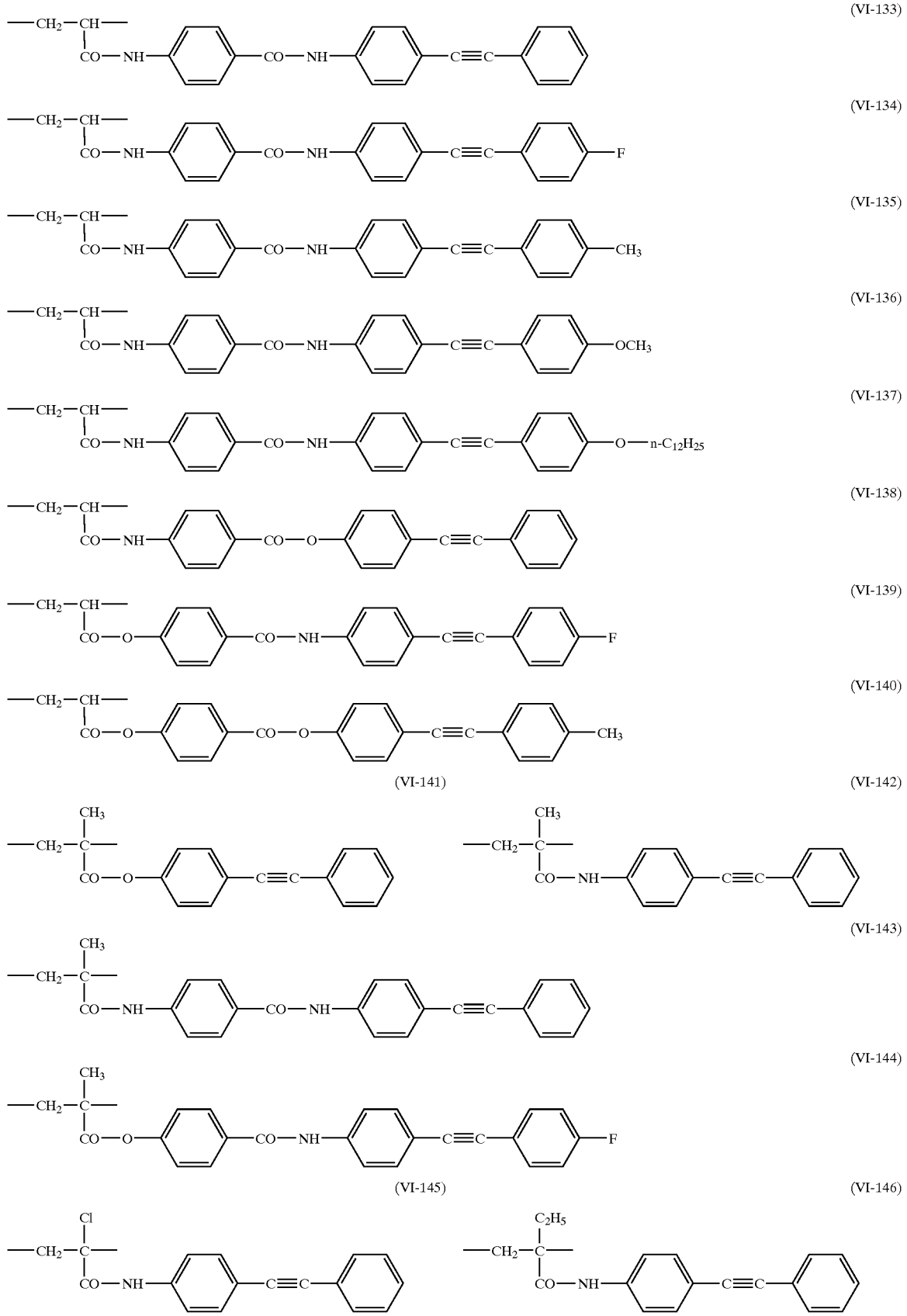

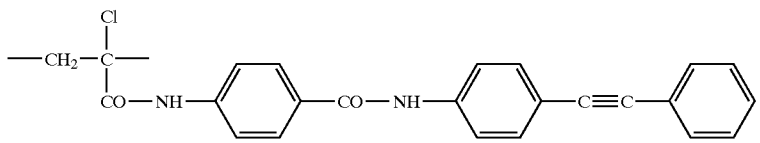

(VI-147)

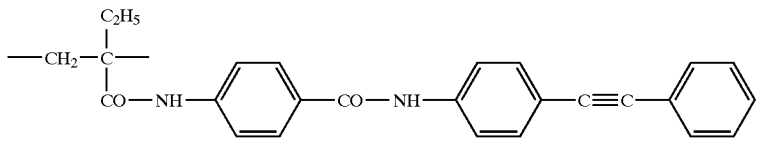

(VI-148)

Examples of acrylic copolymers containing a repeating unit having a hydrocarbon group having 2, 3 or 4 aromatic rings or aromatic heterocycles in the side chain having a tolan structure are shown below. AA means a repeating unit derived from acrylic acid and MA means a repeating unit derived from methacrylic acid. EA and ClA mean repeating units of formulae below where M is as defined for M in formula (I). The proportion of each repeating unit is expressed in mol %.

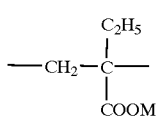

(EA)

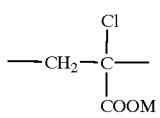

(ClA)

In formula (III) above, Cy represents an alicyclic group, an aromatic group or a heterocyclic group.

The aliphatic ring in the alicyclic group is preferably a 5-membered to 7-membered ring, more preferably a 5-membered or 6-membered ring, most preferably a 6-membered ring. Examples of the aliphatic ring include cyclohexane, cyclohexene and bicyclo [2.2.1] hepta-2-ene rings. The aliphatic ring may be condensed to another aliphatic ring, an aromatic ring or a heterocycle.

Examples of the aromatic ring in the aromatic group include benzene, naphthalene, anthracene, phenanthrene, pyrene and naphthacene rings. The aromatic ring may be condensed to an aliphatic ring or a heterocycle.

The heterocycle in the heterocyclic group is preferably a 5-membered to 7-membered ring, more preferably a 5-membered or 6-membered ring. The heterocycle preferably has aromaticity. The aromatic heterocycle is typically unsaturated and preferably has the maximum number of double bonds. Examples of the heterocycle include furan, thiophene, pyrrole, oxazole, isoxazole, isothiazole, imidazole, pyrazole, furazane, pyran, pyridine, pyridazine, pyrimidine and pyrazine rings. The heterocycle may be condensed to another heterocycle, an aliphatic ring or an aromatic ring.

The alicyclic, aromatic and heterocyclic groups may be substituted. Examples of the substituents include alkyl groups (e.g., methyl, ethyl, t-butyl), substituted alkyl groups (e.g., chloromethyl, hydroxymethyl, chlorotrimethylammonio), alkoxy groups (e.g., methoxy), halogen atoms (F, Cl, Br), carboxyl, acyl groups (e.g., formyl), amino, sulfo, aryl groups (e.g., phenyl), aryloxy groups (e.g., phenoxy) and oxo.

In formula (III) above, $n^2$ represents the mol % of the repeating unit in the range of 1 to 90 mol %. $n^2$ is preferably 5 to 80 mol %, more preferably 10 to 70 mol %.

Examples of repeating units of formula (III) above are shown below.

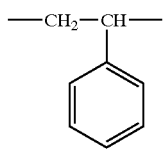

(III-1)

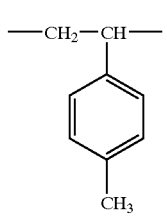

(III-2)

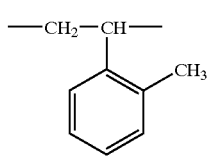

(III-3)

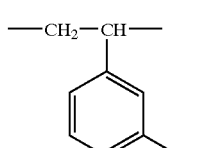

(III-4)

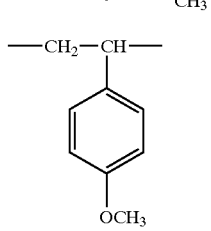

(III-5)

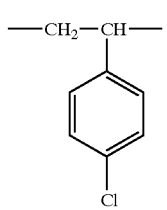

(III-6)

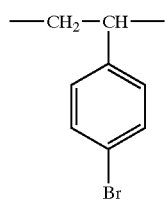 (III-7)
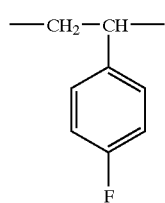 (III-8)
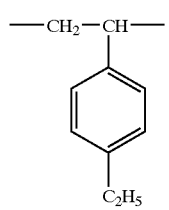 (III-9)
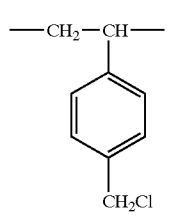 (III-10)
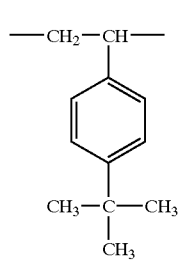 (III-11)
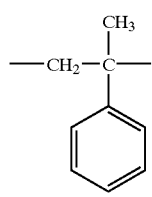 (III-12)
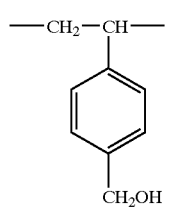 (III-13)
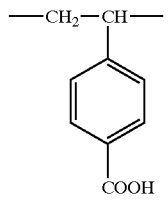 (III-14)
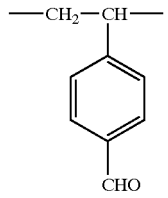 (III-15)
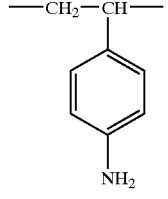 (III-16)
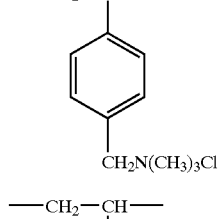 (III-17)
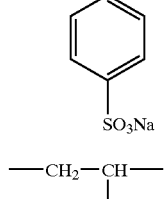 (III-18)
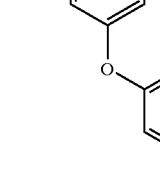 (III-19)
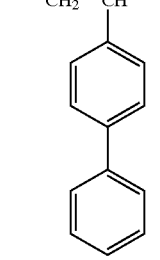 (III-20)

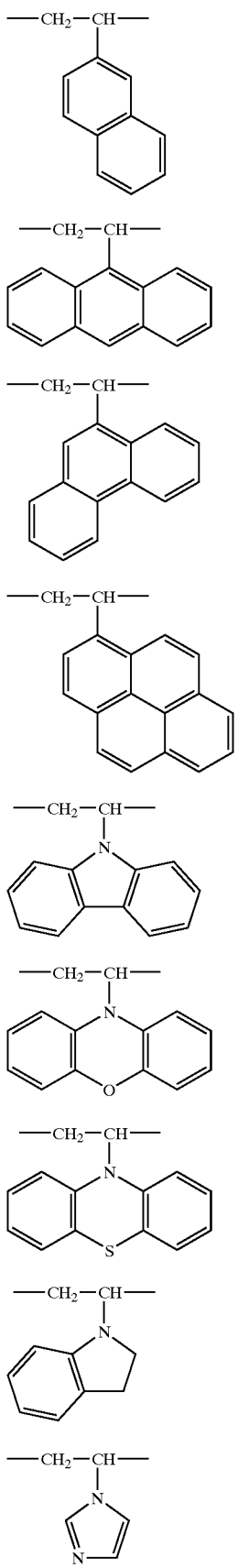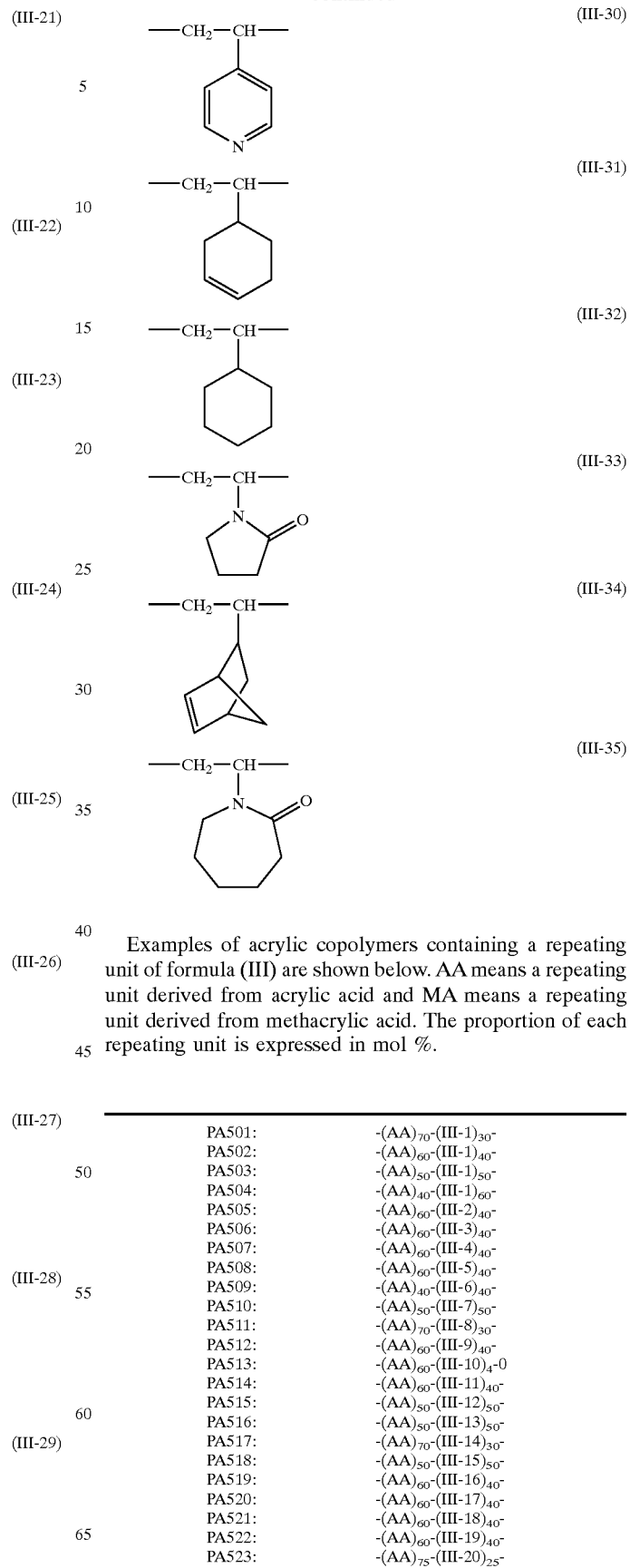

Examples of acrylic copolymers containing a repeating unit of formula (III) are shown below. AA means a repeating unit derived from acrylic acid and MA means a repeating unit derived from methacrylic acid. The proportion of each repeating unit is expressed in mol %.

| | |
|---|---|
| PA501: | -(AA)$_{70}$-(III-1)$_{30}$- |
| PA502: | -(AA)$_{60}$-(III-1)$_{40}$- |
| PA503: | -(AA)$_{50}$-(III-1)$_{50}$- |
| PA504: | -(AA)$_{40}$-(III-1)$_{60}$- |
| PA505: | -(AA)$_{60}$-(III-2)$_{40}$- |
| PA506: | -(AA)$_{60}$-(III-3)$_{40}$- |
| PA507: | -(AA)$_{60}$-(III-4)$_{40}$- |
| PA508: | -(AA)$_{60}$-(III-5)$_{40}$- |
| PA509: | -(AA)$_{40}$-(III-6)$_{40}$- |
| PA510: | -(AA)$_{50}$-(III-7)$_{50}$- |
| PA511: | -(AA)$_{70}$-(III-8)$_{30}$- |
| PA512: | -(AA)$_{60}$-(III-9)$_{40}$- |
| PA513: | -(AA)$_{60}$-(III-10)$_{4}$-0 |
| PA514: | -(AA)$_{60}$-(III-11)$_{40}$- |
| PA515: | -(AA)$_{50}$-(III-12)$_{50}$- |
| PA516: | -(AA)$_{50}$-(III-13)$_{50}$- |
| PA517: | -(AA)$_{70}$-(III-14)$_{30}$- |
| PA518: | -(AA)$_{50}$-(III-15)$_{50}$- |
| PA519: | -(AA)$_{60}$-(III-16)$_{40}$- |
| PA520: | -(AA)$_{60}$-(III-17)$_{40}$- |
| PA521: | -(AA)$_{60}$-(III-18)$_{40}$- |
| PA522: | -(AA)$_{60}$-(III-19)$_{40}$- |
| PA523: | -(AA)$_{75}$-(III-20)$_{25}$- |

| | |
|---|---|
| PA524: | -(AA)$_{60}$-(III-20)$_{40}$- |
| PA525: | -(AA)$_{70}$-(III-21)$_{30}$- |
| PA526: | -(AA)$_{80}$-(III-22)$_{20}$- |
| PA527: | -(AA)$_{70}$-(III-22)$_{30}$- |
| PA528: | -(AA)$_{60}$-(III-22)$_{40}$- |
| PA529: | -(AA)$_{70}$-(III-23)$_{30}$- |
| PA530: | -(AA)$_{70}$-(III-24)$_{30}$- |
| PA531: | -(AA)$_{80}$-(III-25)$_{20}$- |
| PA532: | -(AA)$_{70}$-(III-25)$_{30}$- |
| PA533: | -(AA)$_{60}$-(III-25)$_{40}$- |
| PA534: | -(AA)$_{60}$-(III-26)$_{40}$- |
| PA535: | -(AA)$_{70}$-(III-27)$_{30}$- |
| PA536: | -(AA)$_{80}$-(III-28)$_{20}$- |
| PA537: | -(AA)$_{70}$-(III-29)$_{30}$- |
| PA538: | -(AA)$_{60}$-(III-30)$_{40}$- |
| PA539: | -(AA)$_{70}$-(III-31)$_{30}$- |
| PA540: | -(AA)$_{70}$-(III-32)$_{30}$- |
| PA541: | -(AA)$_{60}$-(III-33)$_{40}$- |
| PA542: | -(AA)$_{70}$-(III-34)$_{30}$- |
| PA543: | -(AA)$_{70}$-(III-35)$_{30}$- |
| PA601: | -(MA)$_{70}$-(III-1)$_{30}$- |
| PA602: | -(MA)$_{60}$-(III-1)$_{4}$-0 |
| PA603: | -(MA)$_{50}$-(III-1)$_{5}$-0 |
| PA604: | -(MA)$_{40}$-(III-1)$_{60}$- |
| PA605: | -(MA)$_{60}$-(III-2)$_{40}$- |
| PA606: | -(MA)$_{60}$-(III-3)$_{40}$- |
| PA607: | -(MA)$_{60}$-(III-4)$_{40}$- |
| PA608: | -(MA)$_{60}$-(III-5)$_{40}$- |
| PA609: | -(MA)$_{40}$-(III-6)$_{40}$- |
| PA610: | -(MA)$_{50}$-(III-7)$_{50}$- |
| PA611: | -(MA)$_{70}$-(III-8)$_{30}$- |
| PA612: | -(MA)$_{60}$-(III-9)$_{40}$- |
| PA613: | -(MA)$_{60}$-(III-10)$_{40}$- |
| PA614: | -(MA)$_{60}$-(III-11)$_{40}$- |
| PA615: | -(MA)$_{50}$-(III-12)$_{50}$- |
| PA616: | -(MA)$_{50}$-(III-13)$_{50}$- |
| PA617: | -(MA)$_{70}$-(III-14)$_{30}$- |
| PA618: | -(MA)$_{50}$-(III-15)$_{50}$- |
| PA619: | -(MA)$_{60}$-(III-16)$_{40}$- |
| PA620: | -(MA)$_{60}$-(III-17)$_{40}$- |
| PA621: | -(MA)$_{60}$-(III-18)$_{40}$- |
| PA622: | -(MA)$_{60}$-(III-19)$_{40}$- |
| PA623: | -(MA)$_{75}$-(III-20)$_{25}$- |
| PA624: | -(MA)$_{60}$-(III-20)$_{40}$- |
| PA625: | -(MA)$_{70}$-(III-21)$_{30}$- |
| PA626: | -(MA)$_{80}$-(III-22)$_{20}$- |
| PA627: | -(MA)$_{70}$-(III-22)$_{30}$- |
| PA628: | -(MA)$_{60}$-(III-22)$_{40}$- |
| PA629: | -(MA)$_{70}$-(III-23)$_{30}$- |
| PA630: | -(MA)$_{70}$-(III-24)$_{30}$- |
| PA631: | -(MA)$_{80}$-(III-25)$_{20}$- |
| PA632: | -(MA)$_{70}$-(III-25)$_{30}$- |
| PA633: | -(MA)$_{60}$-(III-25)$_{40}$- |
| PA634: | -(MA)$_{60}$-(III-26)$_{40}$- |
| PA635: | -(MA)$_{70}$-(III-27)$_{30}$- |
| PA636: | -(MA)$_{80}$-(III-28)$_{20}$- |
| PA637: | -(MA)$_{70}$-(III-29)$_{30}$- |
| PA638: | -(MA)$_{60}$-(III-30)$_{40}$- |
| PA639: | -(MA)$_{70}$-(III-31)$_{30}$- |
| PA640: | -(MA)$_{70}$-(III-32)$_{30}$- |
| PA641: | -(MA)$_{60}$-(III-33)$_{40}$- |
| PA642: | -(MA)$_{70}$-(III-34)$_{30}$- |
| PA643: | -(MA)$_{70}$-(III-35)$_{30}$- |

In formula (IV) above, $R^3$ represents a hydrogen atom or a methyl group.

In formula (IV) above, $L^1$ represents a linking group selected from the group consisting of —NH-alkylene-O—CO—, -alkylene-O—CO—, —O-alkylene-O—CO—, —O-arylene-O-alkylene-O—CO —, —O-arylene-O-alkylene-, —O-arylene-O—, —NH-alkylene-O—CO—, —NH-alkylene-O— and —NH-alkylene-, preferably —NH-alkylene-O—CO—, -alkylene-O—CO—, —O-alkylene-O—CO—, —O-arylene-O-alkylene-O—CO—, —O-arylene-O— and —NH-alkylene-O—CO—, especially —NH-alkylene-O—CO—.

The alkylene group may be branched or may have a cyclic structure. The alkylene group preferably contains 1 to 30, more preferably 1 to 20, still more preferably 1 to 15, most preferably 1 to 12 carbon atoms.

The arylene group is preferably a phenylene or a naphthylene, more preferably a phenylene, most preferably a p-phenylene. The arylene group may be substituted. Examples of substituents for the arylene group are as mentioned earlier for the arylene group.

In formula (IV) above, Q represents a polymerizable group. The polymerizable group is preferably similar to the polymerizable group (Q) of the liquid crystal molecule, as described above. Specifically, Q is preferably an unsaturated polymerizable group, an epoxy group or an aziridinyl group, more preferably an ethylenically unsaturated polymerizable group.

In formula (IV) above, p represents the mol % of the repeating unit in the range of 0.1 to 20 mol %. p is preferably 0.1 to 10 mol %, more preferably 3 to 5 mol %.

Examples of repeating units having a polymerizable group in the side chain are shown below.

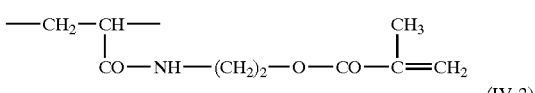

(IV-1)

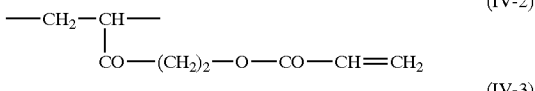

(IV-2)

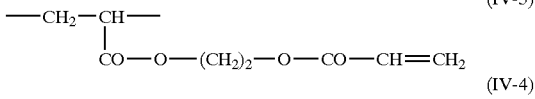

(IV-3)

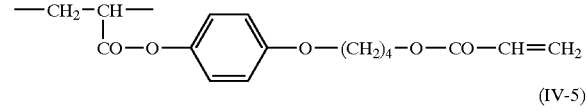

(IV-4)

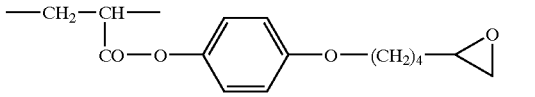

(IV-5)

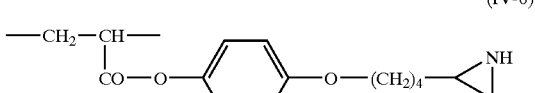

(IV-6)

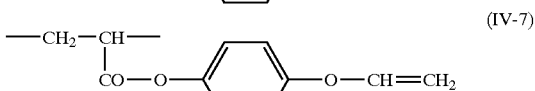

(IV-7)

(IV-8)

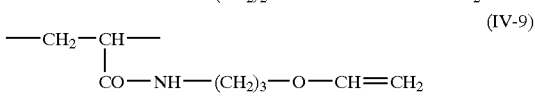

(IV-9)

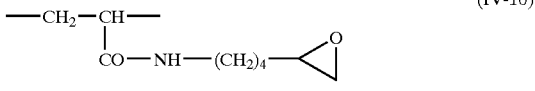

(IV-10)

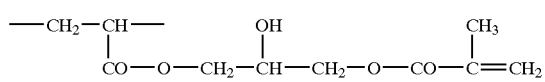

When a repeating unit having a polymerizable group in the side chain is introduced into an acrylic copolymer, the acrylic copolymer preferably contains the repeating unit having a polymerizable group in the side chain in the range of 0.1 to 10 mol %, more preferably 3 to 5 mol %.

In addition to the acrylic orthogonal alignment layers described above, alignment layers based on polyvinyl alcohols as disclosed in the specification of JP-A 2002-062427 or polyamic acids as disclosed-in JP-A 2001-254481 may also be used.

Then, a second alignment layer is formed and a second optically anisotropic liquid crystal layer is formed on the second alignment layer.

Materials and methods for forming the second alignment layer are not specifically limited so far as an alignment layer capable of homogenously aligning the rod-like liquid crystal compound in the second optically anisotropic layer is obtained. For example, the alignment layer can be formed from various materials by various methods such as subjecting a film of an organic compound (preferably a polymer) to a rubbing treatment, obliquely depositing an inorganic compound, forming a layer having microgrooves, or accumulating an organic compound (e.g., ω-trichosanic acid, dioctadecylmethylammonium chloride, methyl stearate) by Langmuir-Blodgett method (LB film). Alignment layers producing an alignment effect under an electric or magnetic field or irradiation are also known.

Especially, the second alignment layer is preferably formed by subjecting a film of a polymer to a rubbing treatment. The rubbing treatment is performed by rubbing the surface of the polymer layer in a direction several times with paper or a cloth. For example, a polymer solution is applied to the surface of the first optically anisotropic layer and dried to form a film, which is then subjected to a rubbing treatment to form a second alignment layer. In the present invention, the second alignment layer can be formed by a rubbing treatment in a direction at an angle of substantially 15° with respect to the longitudinal direction of the transparent substrate. That is, the second alignment layer can be formed by a rubbing process in such a manner that the angle between the rubbing axis and the longitudinal direction of the transparent substrate is substantially 15°. A coating solution containing a rod-like liquid crystal compound is applied to thus formed second orthogonal alignment layer, and the rod-like liquid crystal compound is aligned so that the liquid crystal molecules are aligned in a direction substantially parallel to the rubbing axis of the alignment layer. That is, the rod-like liquid crystal compound can be aligned in a direction at an angle of 15° with respect to the longitudinal direction of the transparent substrate to form a second optically anisotropic layer having a phase shift of π/2.

The type of the polymer used for the second alignment layer is determined depending on the alignemetn (especially, average tilt angle) of the rod-like liquid crystal compound used in the second optically anisotropic layer.

In order to homogenously align the liquid crystal compound (at an average tilt angle of 0 to 50°), a polymer that does not lower the surface energy of the alignment layer (a normal polymer for alignment layers) is used. Specific types of suitable polymers are described in various documents relating to liquid crystal cells or optical compensation sheets.

The thickness of the second alignment layer is preferably 0.01 to 5 μm, more preferably 0.05 to 1 μm.

The second alignment layer may be formed on a temporary substrate and the second optically anisotropic layer may be formed by aligning the liquid crystal compound in the second optically anisotropic layer and then transferred onto the transparent substrate (or onto the first optically anisotropic layer). The liquid crystal compound fixed in an alignment can remain the alignment without alignment layer. The first optically anisotropic layer and the second optically anisotropic layer are laminated in such a manner that in-plane axes a1 and a2 are substantially parallel to each other and that the angle between the slow axis of the first optically anisotropic layer and the slow axis of the second optically anisotropic layer is substantially 60° where al means the in-plane axis parallel to the longitudinal direction of the substrate (or temporary substrate) on which the first optically anisotropic layer is formed and a2 means the in-plane axis parallel to the longitudinal direction of the temporary substrate (or transparent substrate) on which the second optically anisotropic layer is formed.

The second alignment layer may not be necessary if the rod-like liquid crystal compound in the second optically anisotropic layer is stably aligned at a desired angle. For the purpose of improving adhesion between the liquid crystal compound and the transparent substrate, an alignment layer, such as described in JP-A 1997-152509, forming a chemical bond with liquid crystal molecules at the interface may be used, and the rubbing treatment may not be performed when an alignment layer is only used for the purpose of improving adhesion.

In addition to at least one rod-like liquid crystal compound, the first optically anisotropic layer and the second optically anisotropic layer preferably further contain an agent for promoting liquid crystal alignment, especially represented by formula (V) below:

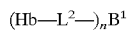  Formula (V)

wherein Hb represents an aliphatic group containing 6 to 40 carbon atoms or an aliphatic-substituted oligosiloxanoxy group containing 6 to 40 carbon atoms. Hb preferably represents an aliphatic group containing 6 to 40 carbon atoms, more preferably a fluorine-substituted aliphatic group containing 6 to 40 carbon atoms or a branched aliphatic group containing 6 to 40 carbon atoms, most preferably a fluorine-substituted alkyl group containing 6 to 40 carbon atoms or a branched alkyl group containing 6 to 40 carbon atoms.

The aliphatic group is more preferably a linear aliphatic group than a cyclic aliphatic group. The linear aliphatic group may be branched. The aliphatic group preferably contains 7 to 35, more preferably 8 to 30, still more preferably 9 to 25, most preferably 10 to 20 carbon atoms.

The aliphatic group includes alkyl, substituted alkyl, alkenyl, substituted alkenyl, alkynyl and substituted alkynyl groups, preferably alkyl, substituted alkyl, alkenyl and substituted alkenyl groups, more preferably alkyl and substituted alkyl groups.

Examples of substituents for the aliphatic group include halogen atoms, hydroxyl, cyano, nitro, alkoxy groups, substituted alkoxy groups (e.g., oligoalkoxy), alkenyloxy groups (e.g., vinyloxy), acyl groups (e.g., acryloyl, methacryloyl), acyloxy groups (e.g., acryloyloxy, benzoyloxy), sulfamoyl, aliphatic-substituted sulfamoyl groups and epoxyalkyl groups (e.g., epoxyethyl), preferably halogen atoms, more preferably a fluorine atom. In fluorine-substituted aliphatic groups, the proportion of fluorine atom substituted for the hydrogen atom in the aliphatic group is preferably 50 to 100%, more preferably 60 to 100%, still more preferably 70 to 100%, further more preferably 80 to 100%, most preferably 85 to 100%.

The aliphatic-substituted oligosiloxanoxy group preferably contains 7 to 35, more preferably 8 to 30, still more preferably 9 to 25, most preferably 10 to 20 carbon atoms. The aliphatic-substituted oligosiloxanoxy group is represented by the formula below:

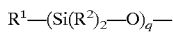

$$R^1-(Si(R^2)_2-O)_q-$$

wherein $R^1$ represents a hydrogen atom, hydroxyl or an aliphatic group; $R^2$ represents a hydrogen atom, an aliphatic group or an alkoxy group; and q represents an integer of any of 1 to 12. The aliphatic groups represented by $R^1$ and $R^2$ are more preferably linear aliphatic groups than cyclic aliphatic groups. The linear aliphatic groups may be branched. The aliphatic groups preferably contain 1 to 12, more preferably 1 to 8, still more preferably 1 to 6, especially 1 to 4 carbon atoms.

The aliphatic groups represented by $R^1$ and $R^2$ include alkyl, substituted alkyl, alkenyl, substituted alkenyl, alkynyl and substituted alkynyl groups, preferably alkyl, substituted alkyl, alkenyl and substituted alkenyl groups, more preferably alkyl and substituted alkyl groups.

The aliphatic groups represented by $R_1$ and $R^2$ may besubstituted by halogen atoms, hydroxyl, cyano, nitro, alkoxy groups, substituted alkoxy groups (e.g., oligoalkoxy), alkenyloxy groups (e.g., vinyloxy), acyl groups (e.g., acryloyl, methacryloyl), acyloxy groups (e.g., acryloyloxy, benzoyloxy), sulfamoyl, aliphatic-substituted sulfamoyl groups and epoxyalkyl groups (e.g., epoxyethyl).

The alkoxy group represented by $R^2$ may be branched or may have a cyclic structure. The alkoxy group preferably contains 1 to 12, more preferably 1 to 8, still more preferably 1 to 6, further more preferably 1 to 4 carbon atoms.

—CO—, —NR—, —SO$_2$— and combinations thereof. R represents a hydrogen atom or an alkyl group containing 1 to 20 carbon atoms. More preferably, $L^{1A}$ represents a divalent linking group selected from the group consisting of -alkylene-, —O—, —S—, —CO—, —NR—, —SO$_2$— and combinations thereof. R preferably represents a hydrogen atom or an alkyl group containing 1 to 20 carbon atoms, more preferably a hydrogen atom or an alkyl group containing 1 to 15 carbon atoms, most preferably a hydrogen atom or an alkyl group containing 1 to 12 carbon atoms.

The alkylene group or fluorine-substituted alkylene group preferably contains 1 to 40, more preferably 1 to 30, still more preferably 1 to 20, further more preferably 1 to 15, most preferably 1 to 12 carbon atoms.

Examples of $L^2$ are shown below. The left side is bonded to Hb and the right side is bonded to $B^1$.

| | |
|---|---|
| L10 | — (a single bond) |
| L11 | —O— |
| L12 | —O—CO— |
| L13 | —CO—C$_4$H$_8$—O— |
| L14 | —O—C$_2$H$_4$—O—C$_2$H$_4$—O— |
| L15 | —S— |
| L16 | —N(n-C$_{12}$H$_{25}$)— |
| L17 | —SO$_2$—N(n-C$_3$H$_7$)—CH$_2$CH$_2$—O— |
| L18 | —O—{CF(CF$_3$)—CF$_2$—O}$_3$—CF(CF$_3$)— |

In formula (V) above, n represents an integer of any of 2 to 12, n preferably represents an integer of any of 2 to 9, more preferably an integer of any of 2 to 6, still more preferably 2, 3 or 4, most preferably 3 or 4.

In formula (V) above, $B^1$ represents an n-valent group having an excluded volume effect containing at least three cyclic structures. $B^1$ preferably represents an n-valent group of formula (V-a) below.

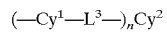

$$(-Cy^1-L^3-)_nCy^2 \qquad \text{Formula (V-a)}$$

wherein $Cy^1$ represents a divalent cyclic group. $Cy^1$ preferably represents a divalent aromatic hydrocarbon group or a divalent heterocyclic group, more preferably a divalent aromatic hydrocarbon group.

| | |
|---|---|
| Hb1 | n-C$_{16}$H$_{33}$— |
| Hb2 | n-C$_{20}$H$_{41}$— |
| Hb3 | n-C$_6$H$_{13}$—CH(n-C$_4$H$_9$)—CH$_2$—CH$_2$— |
| Hb4 | n-C$_{12}$H$_{25}$— |
| Hb5 | n-C$_{18}$H$_{37}$— |
| Hb6 | n-C$_{14}$H$_{29}$— |
| Hb7 | n-C$_{15}$H$_{31}$— |
| Hb8 | n-C$_{10}$H$_{21}$— |
| Hb9 | n-C$_{10}$H$_{21}$—CH(n-C$_4$H$_9$)—CH$_2$—CH$_2$— |
| Hb10 | n-C$_8$F$_{17}$— |
| Hb11 | n-C$_8$H$_{17}$— |
| Hb12 | CH(CH$_3$)$_2$—{C$_3$H$_6$—CH(CH$_3$)}$_3$—C$_2$H$_4$— |
| Hb13 | —CH(CH$_3$)$_2$—{C$_3$H$_6$—CH(CH$_3$)}$_2$—C$_3$H$_6$—C(CH$_3$)=CH—CH$_2$— |
| Hb14 | n-C$_8$H$_{17}$—CH(n-C$_6$H$_{13}$)—CH$_2$—CH$_2$— |
| Hb15 | n-C$_6$H$_{13}$—CH(C$_2$H$_5$)—CH$_2$—CH$_2$— |
| Hb16 | n-C$_8$F$_{17}$—CH(n-C$_4$F$_9$)—CH$_2$— |
| Hb17 | n-C$_8$F$_{17}$—CF(n-C$_6$F$_{13}$)—CF$_2$—CF$_2$— |
| Hb18 | n-C$_3$F$_7$—CF(CF$_3$)—CF$_2$— |
| Hb19 | Si(CH$_3$)$_3$—{Si(CH$_3$)$_2$—O}$_6$—O— |
| Hb20 | Si(OC$_3$H$_7$)(C$_{16}$F$_{33}$)(C$_2$H$_4$—SO$_2$—NH—C$_8$F$_{17}$)—O— |

In formula (V) above, $L^2$ represents a single bond or a divalent linking group. The divalent linking group is preferably a group selected from the group consisting of -alkylene-, -fluorine-substituted alkylene-, —O—, —S—, The aromatic hydrocarbon group means arylene groups and substituted arylene groups.

Examples of arylene groups include phenylene, indenylene, naphthylene, fluorenylene, phenanthrenylene, anthrylene and pyrenylene groups, preferably phenylene and naphthylene groups.

Examples of substituted arylene groups include aliphatic groups, aromatic hydrocarbon groups, heterocyclic group, halogen atoms, alkoxy groups (e.g., methoxy, ethoxy, methoxyethoxy), aryloxy groups (e.g., phenoxy), arylazo groups (e.g., phenylazo), alkylthio groups (e.g., methylthio, ethylthio, propylthio), alkylamino groups (e.g., methylamino, propylamino), acyl groups (e.g., acetyl, propanoyl, octanoyl, benzoyl), acyloxy groups (e.g., acetoxy, pivaloyloxy, benzoyloxy), hydroxy, mercapto, amino, carboxyl, sulfo, carbamoyl, sulfamoyl and ureido.

When another aromatic hydrocarbon ring is bonded to the divalent aromatic hydrocarbon group as a substituent via a single bond, vinylene bond or ethynylene bond, a specific effect of promoting liquid crystal alignment is obtained as described above.

It may also have a group corresponding to Hb—$L^2$— as a substituent.

The divalent heterocyclic group represented by $Cy^1$ preferably has a 5-membered, 6-membered or 7-membered heterocycle, more preferably a 5-membered or 6-membered heterocycle, most preferably a 6-membered heterocycle. Heteroatoms contained in the heterocycle are preferably nitrogen, oxygen and sulfur atoms. The heterocycle is preferably an aromatic heterocycle. The aromatic heterocycle is typically an unsaturated heterocycle, more preferably an unsaturated heterocycle having the maximum number of double bonds. Examples of heterocycles include furan, thiophene, pyrrole, pyrroline, pyrrolidine, oxazole, isoxazole, thiazole, isothiazole, imidazole, imidazoline, imidazolidine, pyrazole, pyrazoline, pyrazolidine, triazole, furazane, tetrazole, pyran, thiine, pyridine, piperdine, oxazine, morpholine, thiazine, pyridazine, pyrimidine, pyrazine, piperazine and triazine rings.

The heterocycle may be condensed to another heterocycle, an aliphatic ring or an aromatic hydrocarbyl ring. Examples of condensed heterocycles include benzofuran, isobenzofuran, benzothiophene, indole, indoline, isoindole, benzoxazole, benzothiazole, indazole, benzimidazole, chromene, chromane, isochromane, quinoline, isoquinoline, cinnoline, phthalazine, quinazoline, quinoxaline, dibenzofuran, carbazole, xanthene, acridine, phenanthridine, phenanthroline, phenazine, phenoxazine, thianthrene, indolizine, quinolizine, quinuclidine, naphthyridine, purine and pteridine rings.

The divalent heterocyclic group may have a substituent. Examples of substituents are as mentioned for the substituted arylene group.

The divalent heterocyclic group may be bonded to $L^3$ or the cyclic group ($Cy^2$) at the center of the molecule (when $L^3$ is a single bond) via a heteroatom (e.g., a nitrogen atom in a piperidine ring). Attached heteroatoms may form an onium salt (e.g., an oxonium, sulfonium or ammonium salt).

The cyclic structures of $Cy^1$ and $Cy^2$ described below may form a planar structure as a whole. When the cyclic structures form planar structures (i.e. disc-like structures) as a whole, a specific effect of promotong liquid crystal alignment is obtained as described above.

Examples of $Cy^1$ are shown below. When a plurality of groups corresponding to Hb—$L^2$— are bonded to a divalent aromatic hydrocarbyl group or a divalent heterocyclic group, any one is Hb—$L^2$— defined in the formula above and the others are substituents for the divalent aromatic hydrocarbyl group or the divalent heterocyclic group.

Cy101:

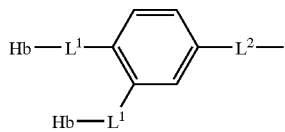

Cy102:

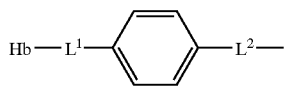

Cy103:

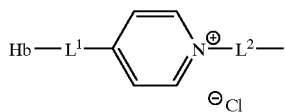

Cy104:

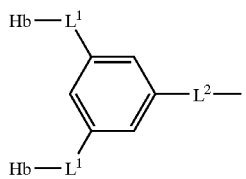

Cy105:

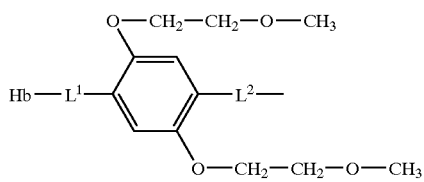

Cy106:

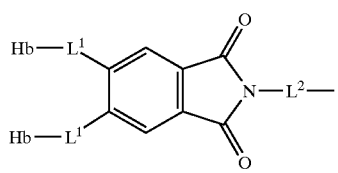

Cy107:

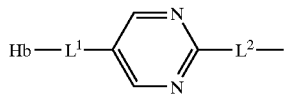

Cy108:

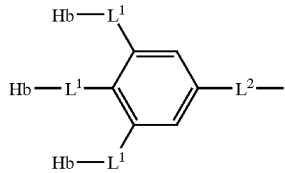

Cy109:

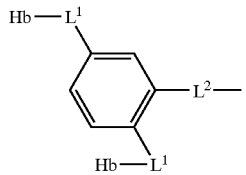

Cy110:
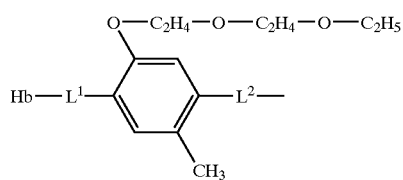

Cy111:
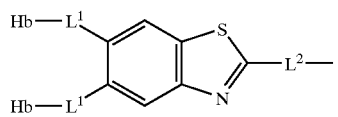

Cy112:
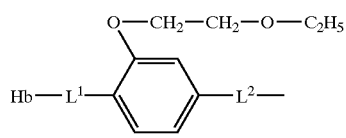

Cy113:
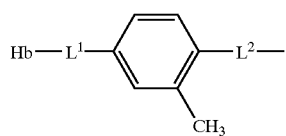

Cy114:
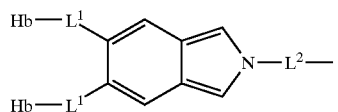

Cy115:
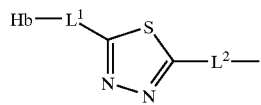

Cy116:
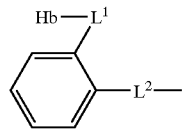

Cy117:
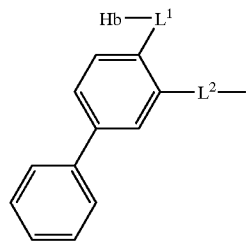

Cy118:
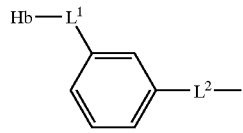

Cy119:
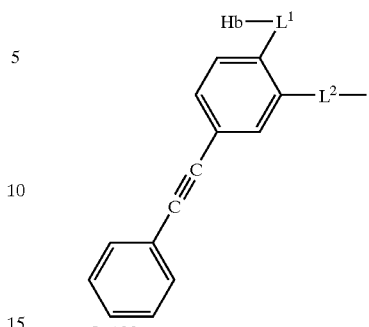

Cy120:
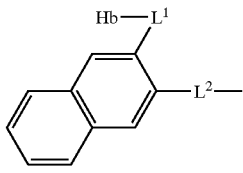

Cy121:
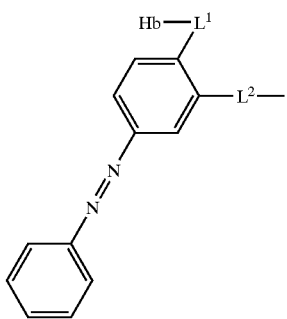

In formula (V-a) above, $L^3$ represents a single bond or a divalent linking group selected from the group consisting of -alkylene-, -alkenylene-, -alkynylene-, —O—, —S—, —CO—, —NR—, —SO$_2$— and combinations thereof. R represents a hydrogen atom or an alkyl group containing 1 to 30 carbon atoms. $L^3$ preferably represents a divalent linking group selected from the group consisting of —O—, —S—, —CO—, —NR—, —SO$_2$— and combinations thereof. R is preferably a hydrogen atom or an alkyl group containing 1 to 20 carbon atoms, more preferably a hydrogen atom or an alkyl group containing 1 to 15 carbon atoms, most preferably a hydrogen atom or an alkyl group containing 1 to 12 carbon atoms.

The alkylene group preferably contains 1 to 40, more preferably 1 to 30, still more preferably 1 to 20, further more preferably 1 to 15, most preferably 1 to 12 carbon atoms.

The alkenylene or alkynylene group preferably contains 2 to 40, more preferably 2 to 30, still more preferably 2 to 20, further more preferably 2 to 15, most preferably 2 to 12 carbon atoms.

Examples of $L^3$ are shown below. The left side is bonded to $Cy^1$ and the right side is bonded to $Cy^2$.

| L20 | — (a single bond) |
|---|---|
| L21 | —S— |
| L22 | —NH— |
| L23 | —NH—SO$_2$—NH— |
| L24 | —NH—CO—NH— |

-continued

| L25 | —SO$_2$— |
| L26 | —O—NH— |
| L27 | —C≡C— |
| L28 | —CH=CH—S— |
| L29 | —CH$_2$—O— |
| L30 | —N(CH$_3$)— |
| L31 | —CO—O— |

In formula (V-a) above, n represents an integer of any of 2 to 12, n is preferably an integer of any of 2 to 9, more preferably an integer of any of 2 to 6, still more preferably 2, 3 or 4, most preferably 3 or 4.

In formula (V-a) above, Cy$^2$ represents an n-valent cyclic group. Cy$^2$ is preferably an n-valent aromatic hydrocarbon group or an n-valent heterocyclic group.

Examples of the aromatic hydrocarbon ring in the aromatic hydrocarbon group represented by Cy$^2$ include benzene, indene, naphthalene, fluorene, phenanthrene, anthracene and pyrene rings, preferably benzene and naphthalene rings, especially a benzene ring.

The aromatic hydrocarbon group represented by Cy$^2$ may be substituted. Examples of substituents include aliphatic groups, aromatic hydrocarbon groups, heterocyclic groups, halogen atoms, alkoxy groups (e.g., methoxy, ethoxy, methoxyethoxy), aryloxy groups (e.g., phenoxy), arylazo groups (e.g., phenylazo), alkylthio groups (e.g., methylthio, ethylthio, propylthio), alkylamino groups (e.g., methylamino, propylamino), arylamino groups (e.g., phenylamino), acyl groups (e.g., acetyl, propanoyl, octanoyl, benzoyl), acyloxy groups (e.g., acetoxy, pivaloyloxy, benzoyloxy), and hydroxy, mercapto, amino, carboxyl, sulfo, carbamoyl, sulfamoyl and ureido.

The heterocyclic group represented by Cy$^2$ preferably has a 5-membered, 6-membered or 7-membered heterocycle, more preferably a 5-membered or 6-membered heterocycle, most preferably a 6-membered heterocycle. Heteroatoms contained in the heterocycle are preferably nitrogen, oxygen and sulfur atoms. The heterocycle is preferably an aromatic heterocycle. The aromatic heterocycle is typically an unsaturated heterocycle, more preferably an unsaturated heterocycle having the maximum number of double bonds. Examples of the heterocycle include furan, thiophene, pyrrole, pyrroline, pyrrolidine, oxazole, isoxazole, thiazole, isothiazole, imidazole, imidazoline, imidazolidine, pyrazole, pyrazoline, pyrazolidine, triazole, furazane, tetrazole, pyran, thiine, pyridine, piperidine, oxazine, morpholine, thiazine, pyridazine, pyrimidine, pyrazine, piperazine and triazine rings, preferably a triazine ring, especially a 1,3,5-triazine ring.

The heterocycle may be condensed to another heterocycle, an aliphatic ring or an aromatic hydrocarbyl ring. However, monocyclic heterocycles are preferred.

Examples of Cy$^2$ are shown below.

Cy201(n = 4):

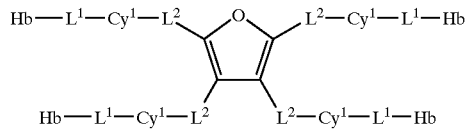

Cy202(n = 4):

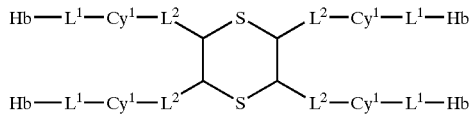

Cy203(n = 4):

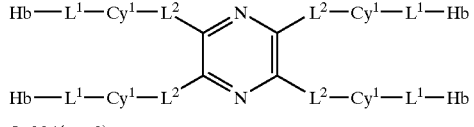

Cy204(n = 3):

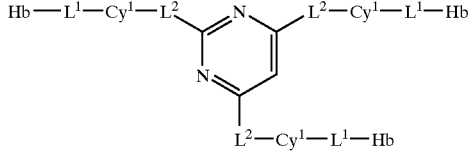

Cy205(n = 3):

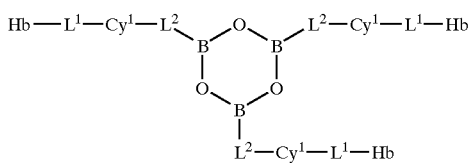

Cy206(n = 3):

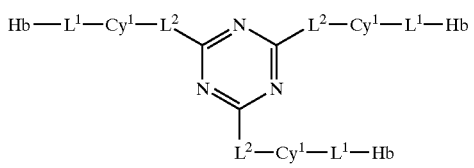

Cy207(n = 3):

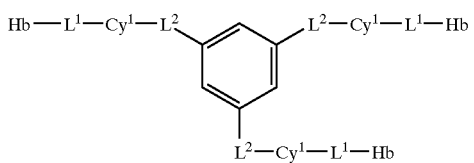

Cy208(n = 2):

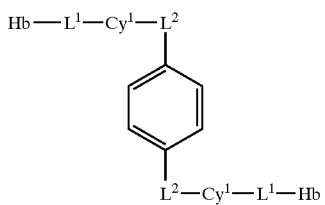

Cy209(n = 2):

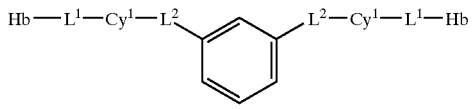

Cy210(n = 2):

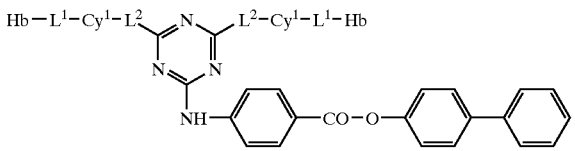

-continued

Cy211(n = 2):

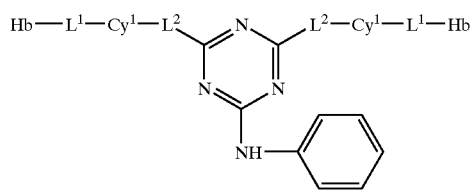

Agents for promoting liquid crystal alignment are compounds obtained by combining a hydrophobic group (Hb), a linking group ($L^2$) and a group having an excluded volume effect ($B^1$) described above. These combinations are not specifically limited.

Examples of agents for promoting liquid crystal alignment represented by formula (V) above are shown below.

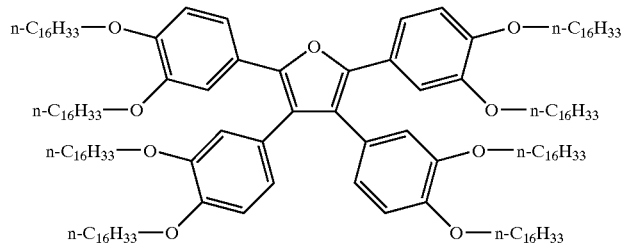
(1)

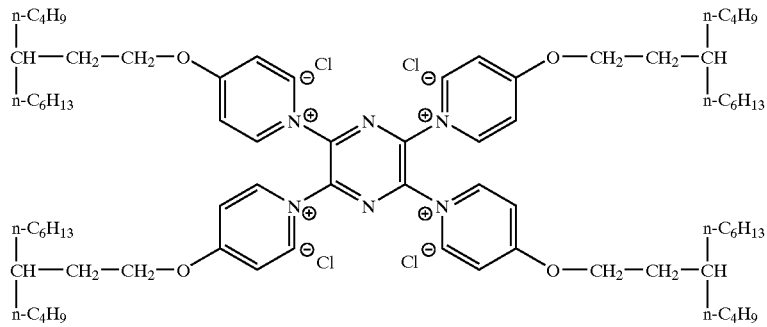
(3)

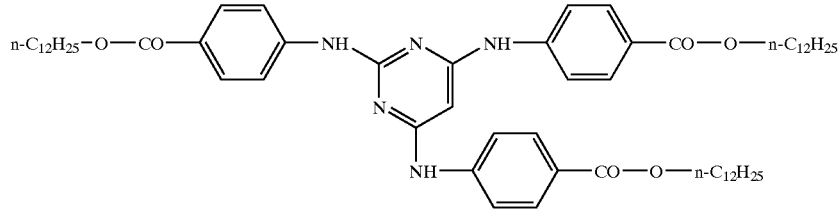
(4)

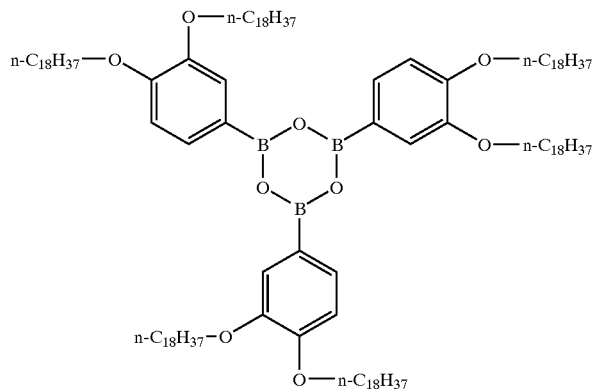
(5)

-continued
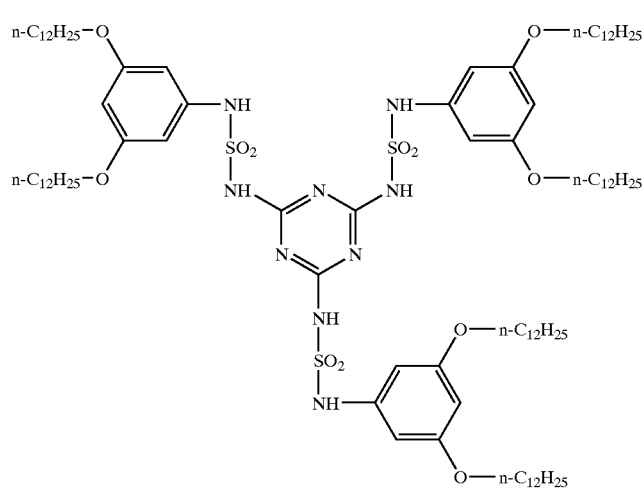
(6)
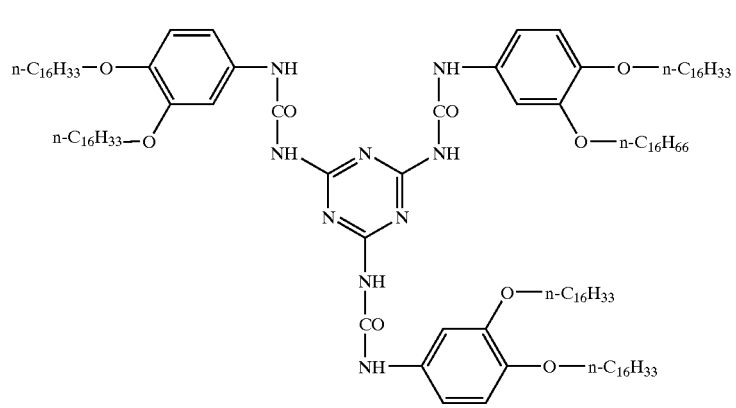
(7)
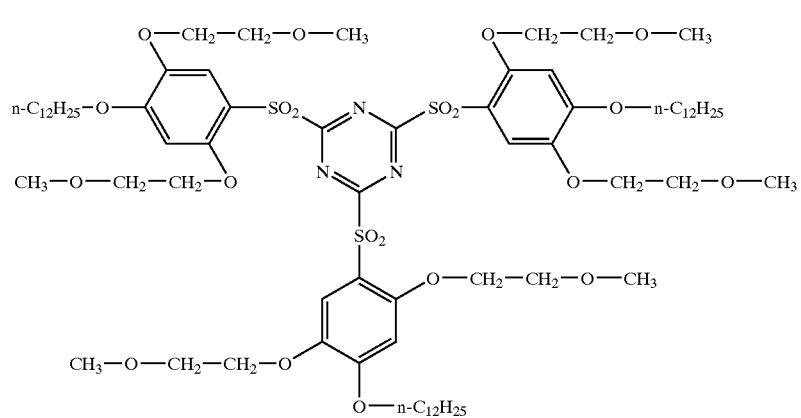
(8)

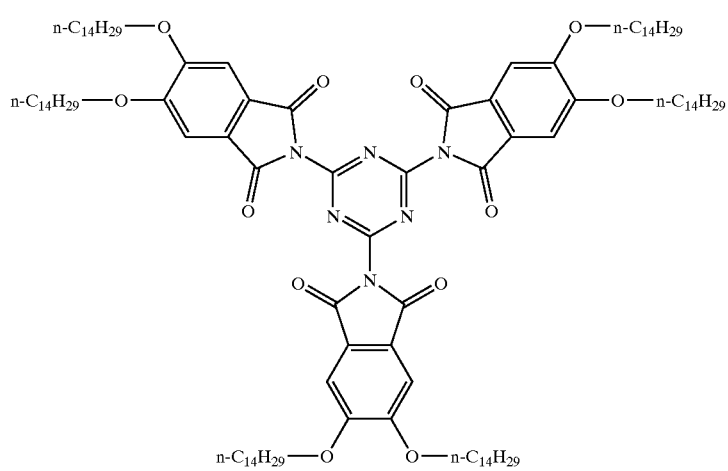
(9)
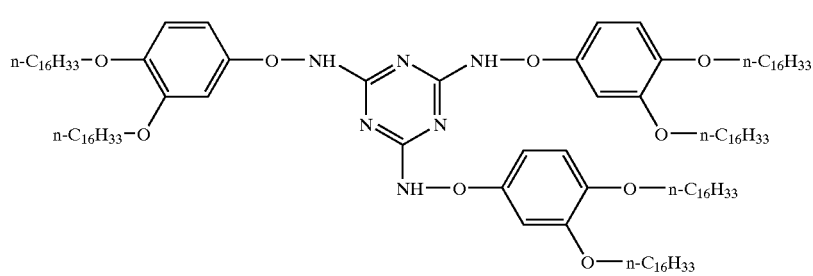
(10)
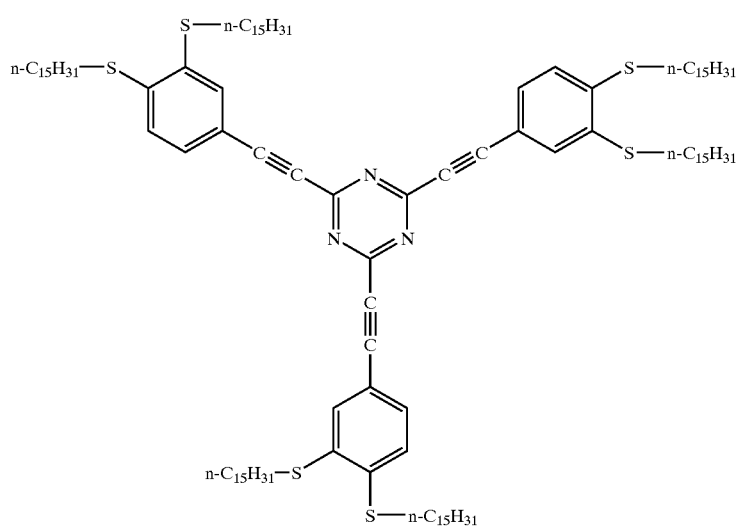
(11)
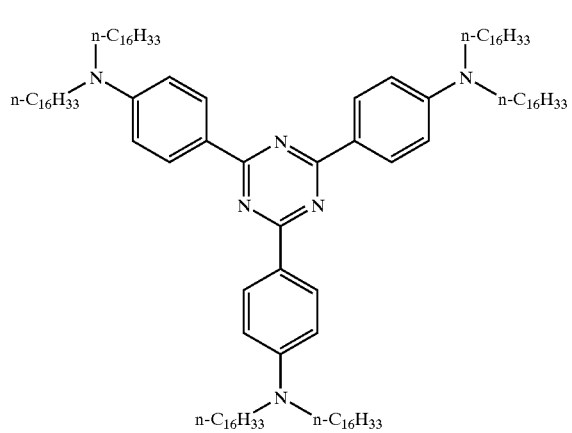
(12)

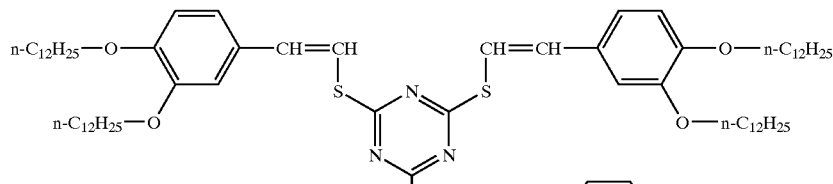
(13)
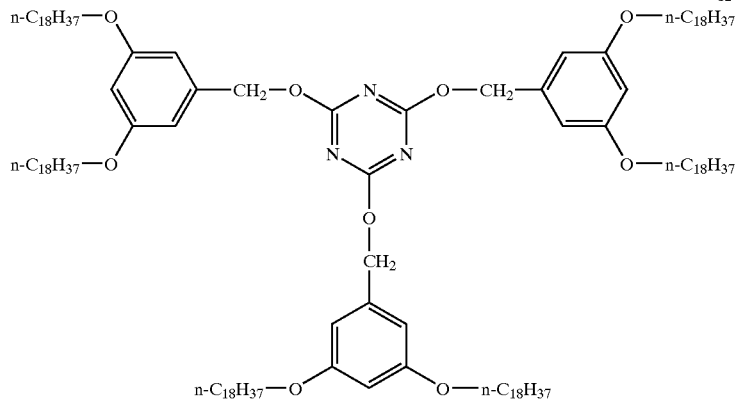
(14)
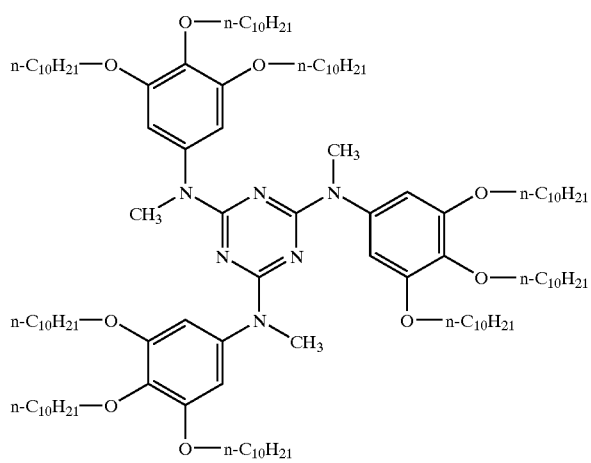
(15)
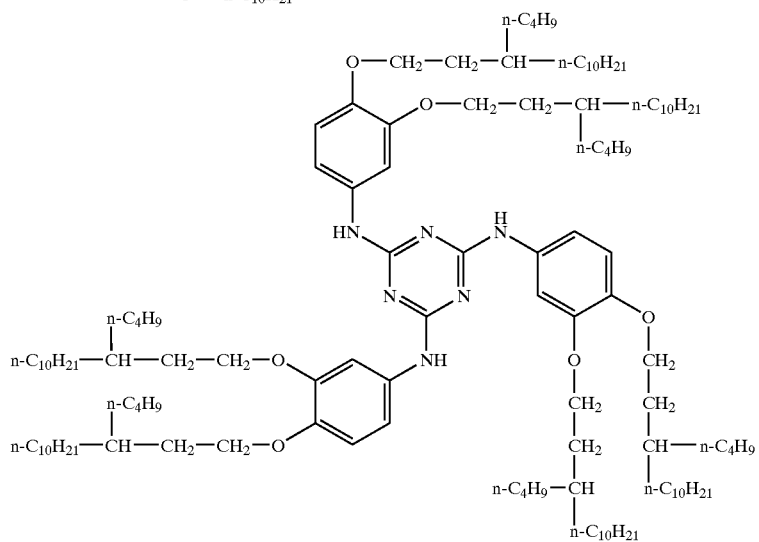
(16)

-continued
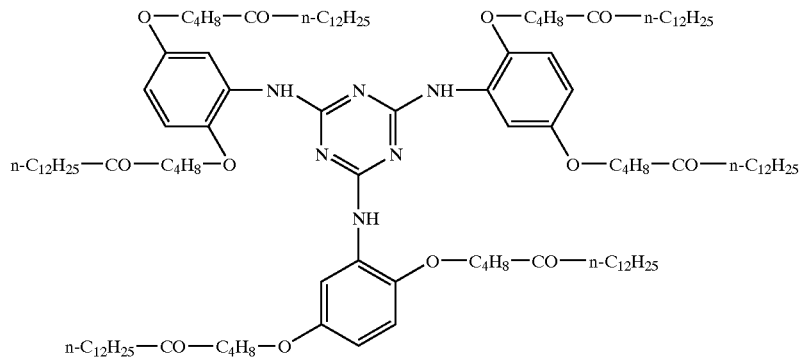
(17)
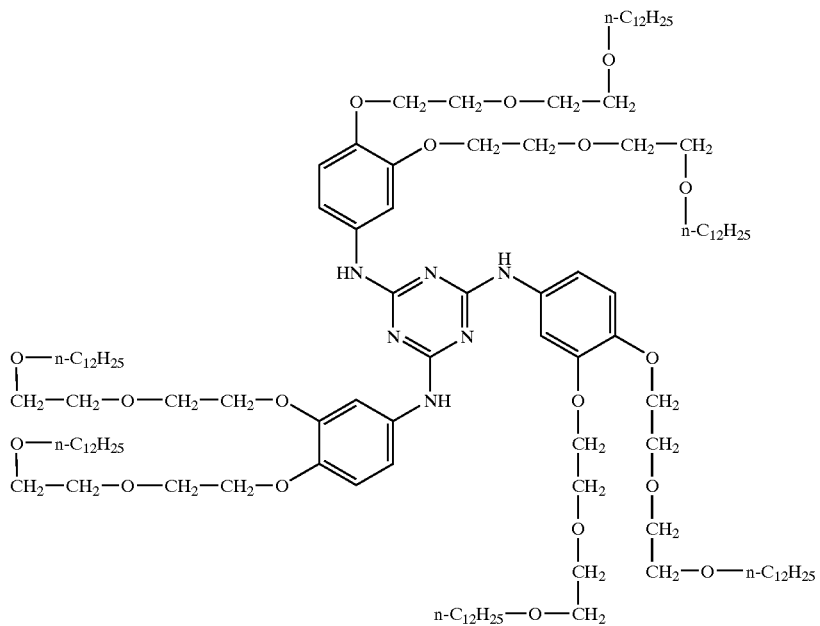
(18)
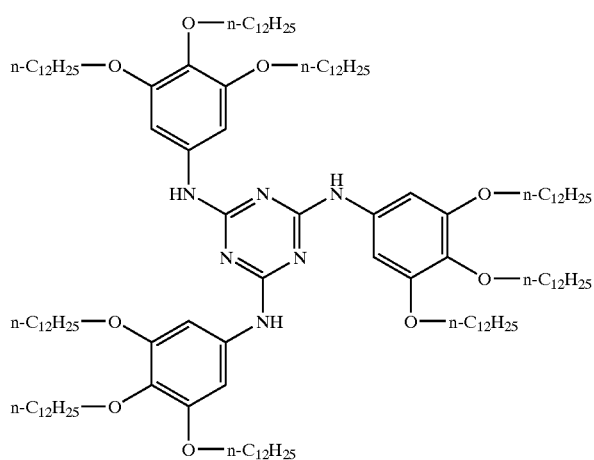
(19)

-continued
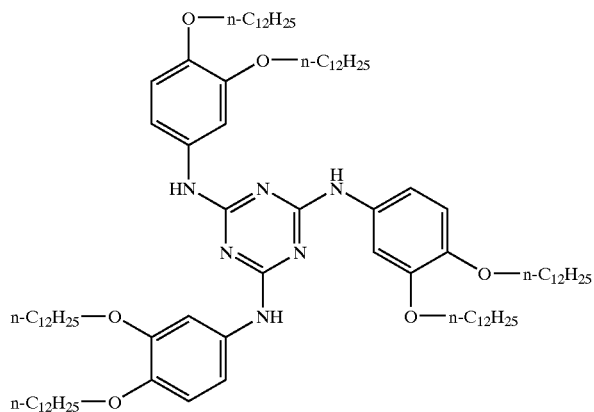
(20)
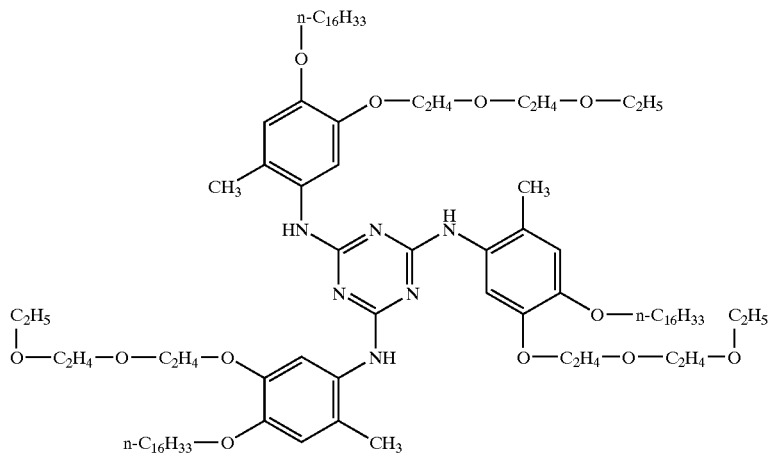
(21)
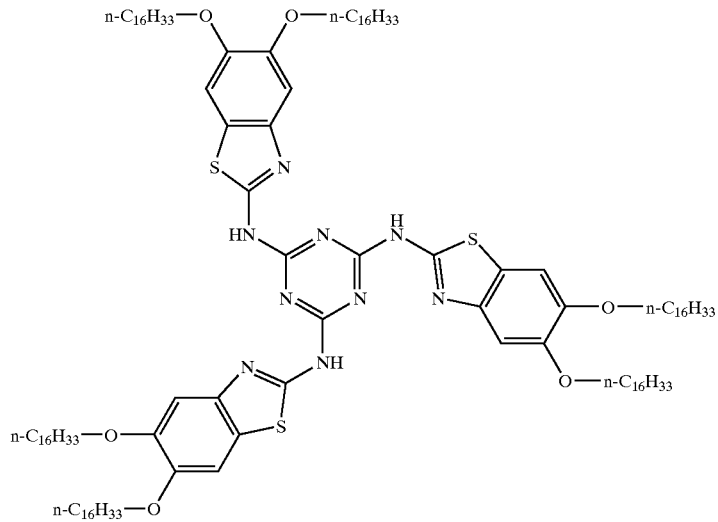
(22)

(23)
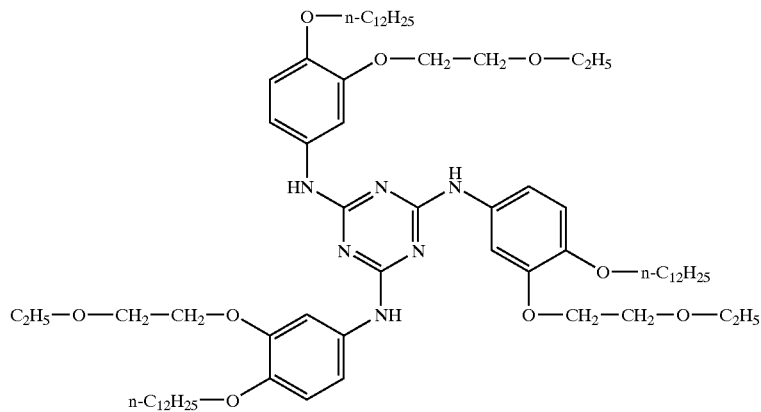
(24)
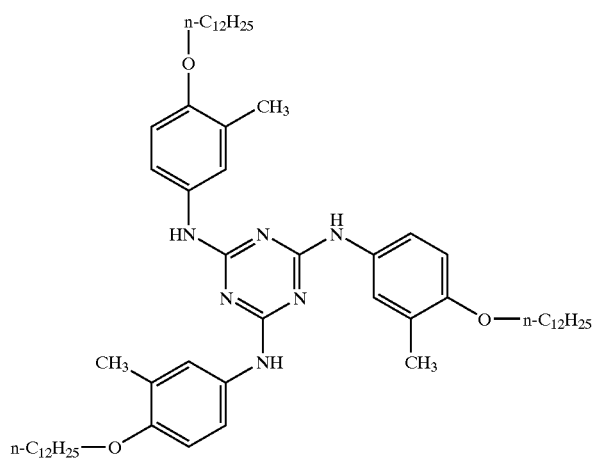
(25)
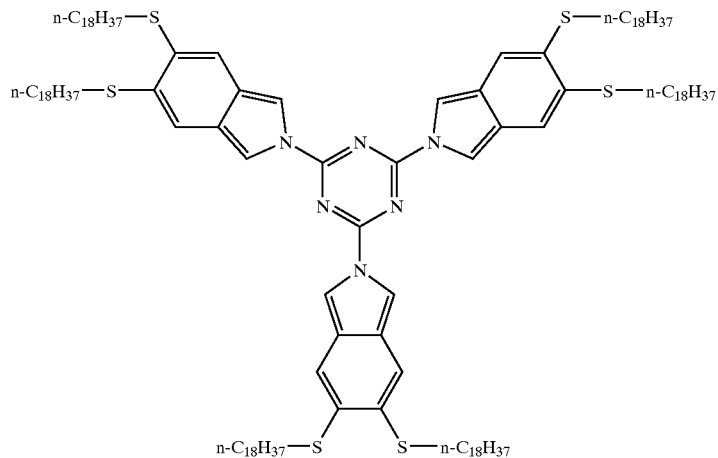

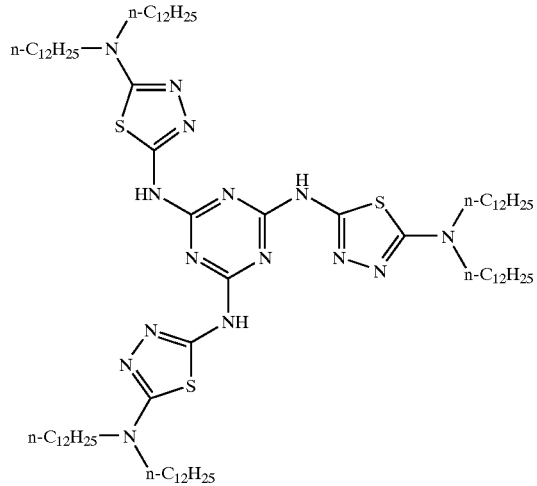
(26)
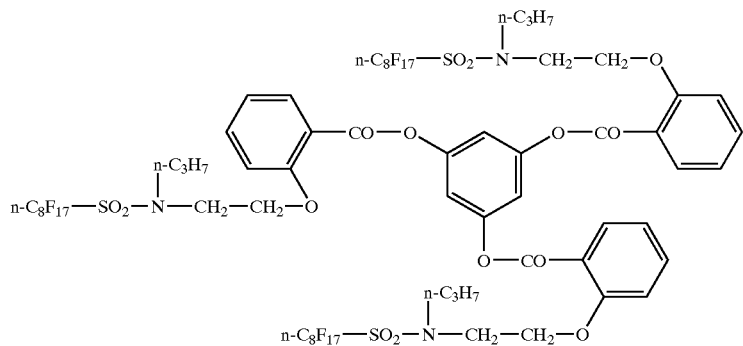
(27)
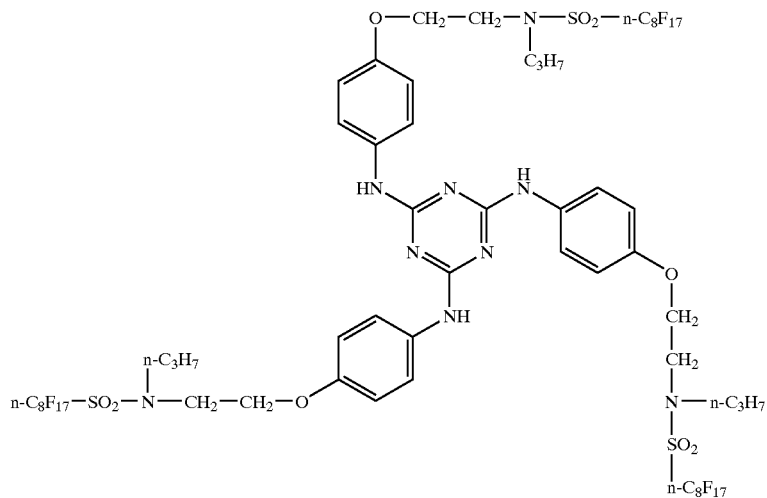
(28)

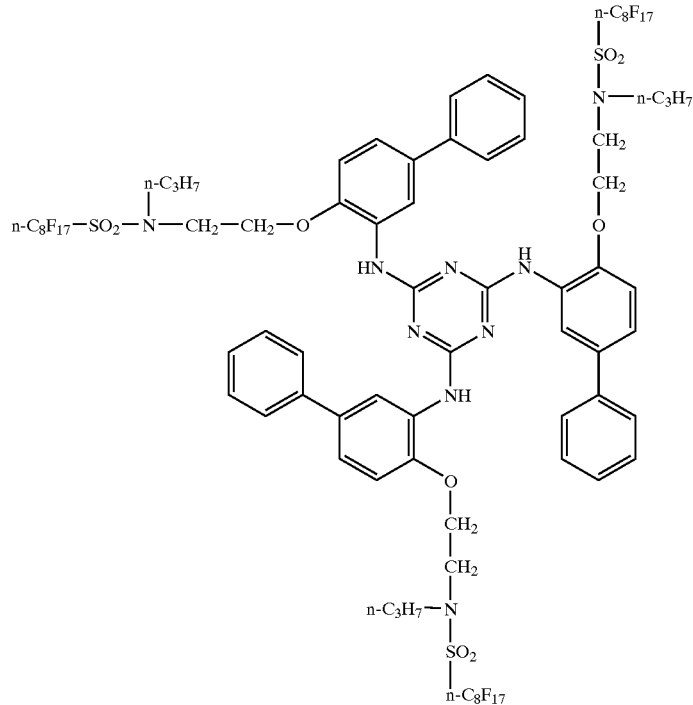
(29)
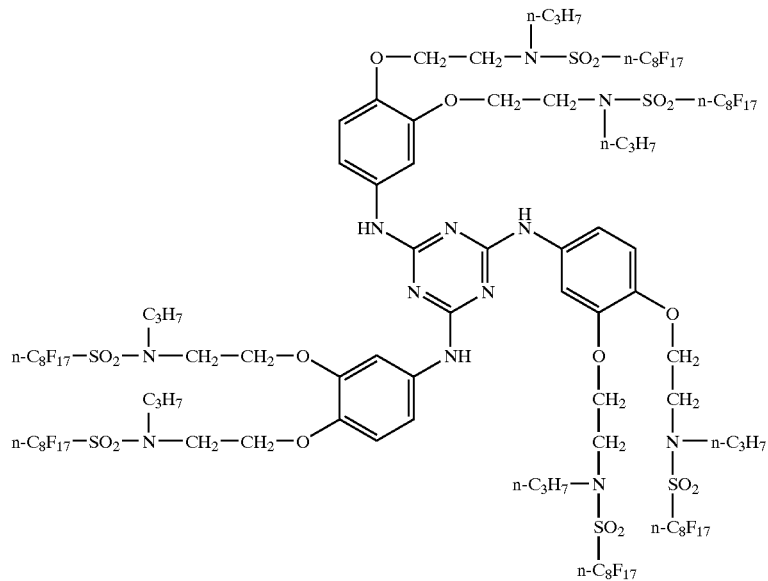
(30)

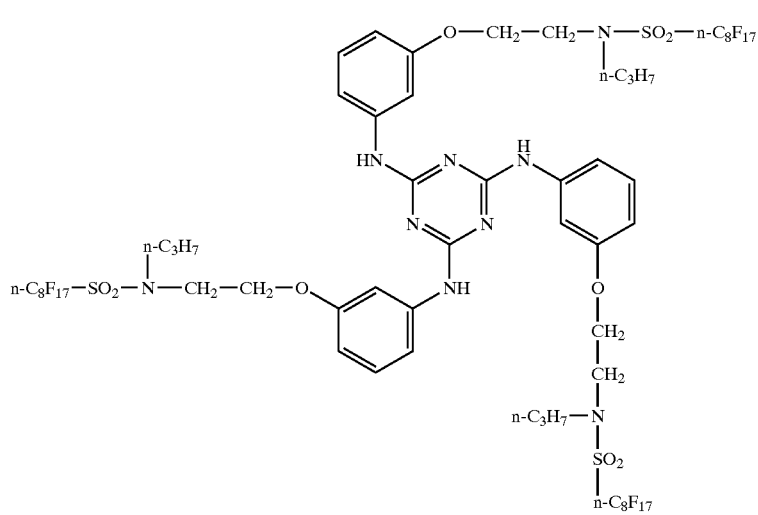
(31)
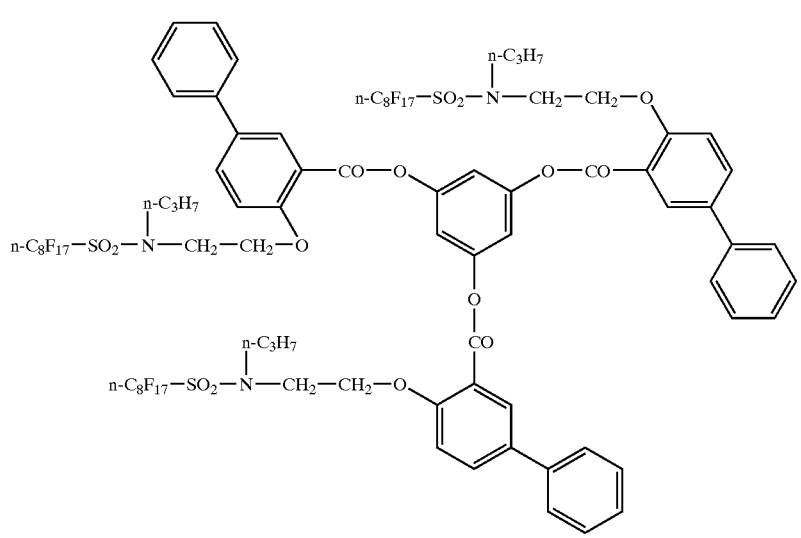
(32)
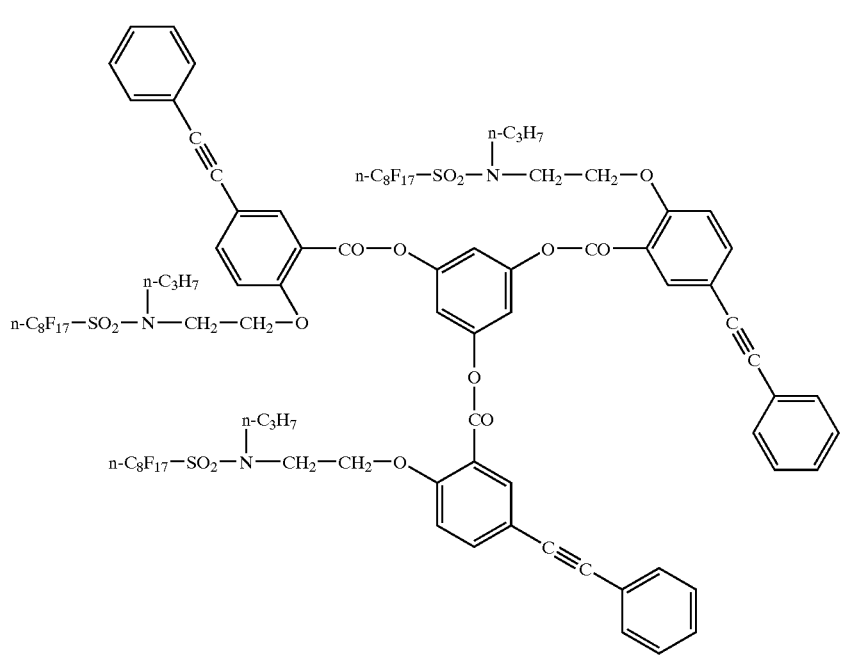
(33)

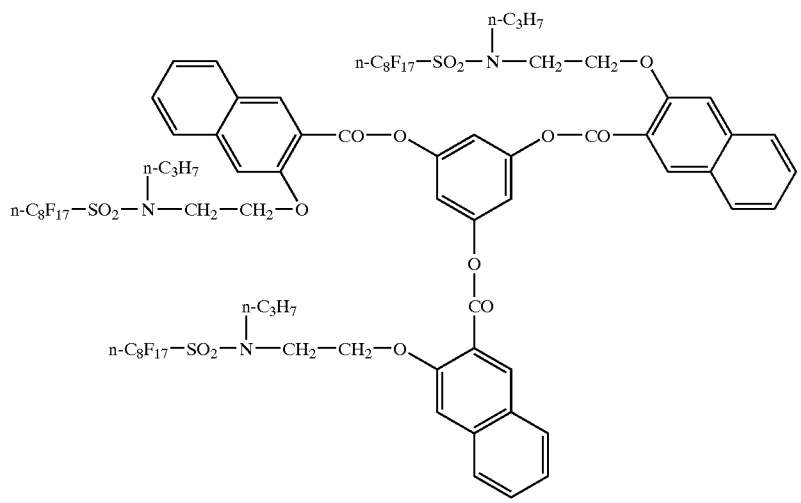
(34)
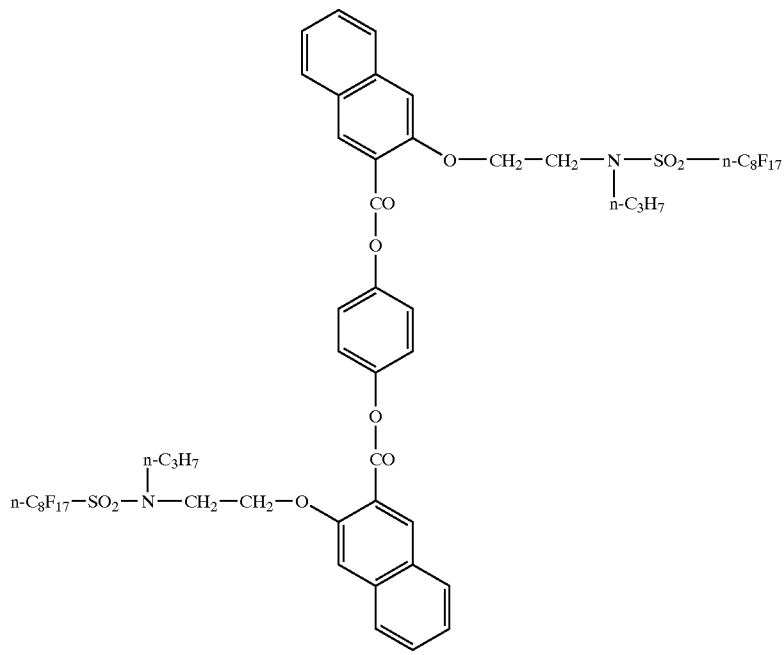
(35)
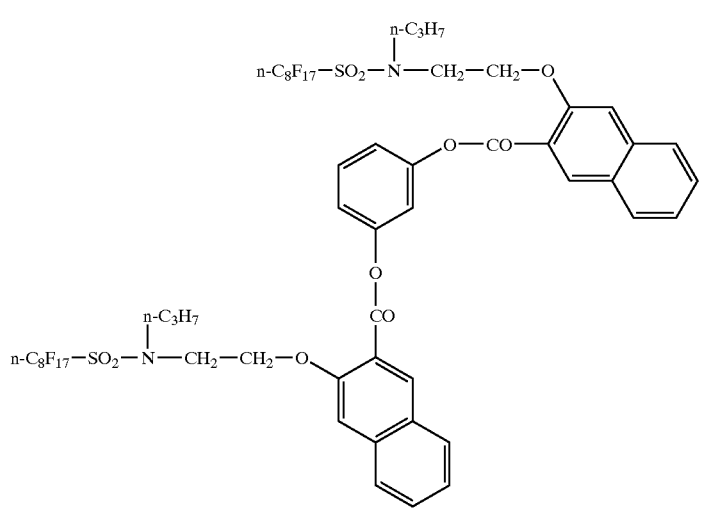
(36)

-continued
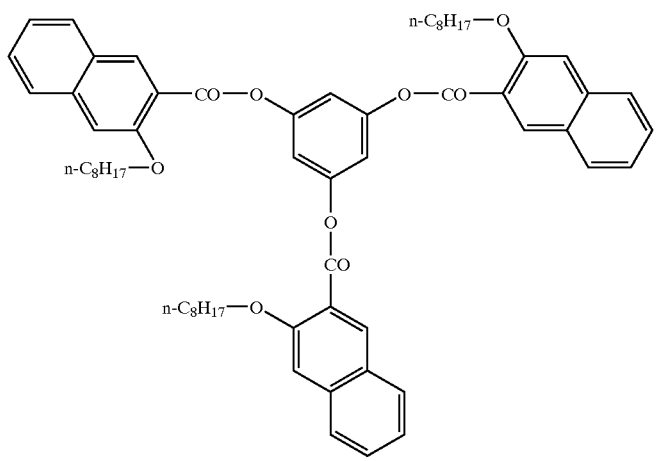
(37)
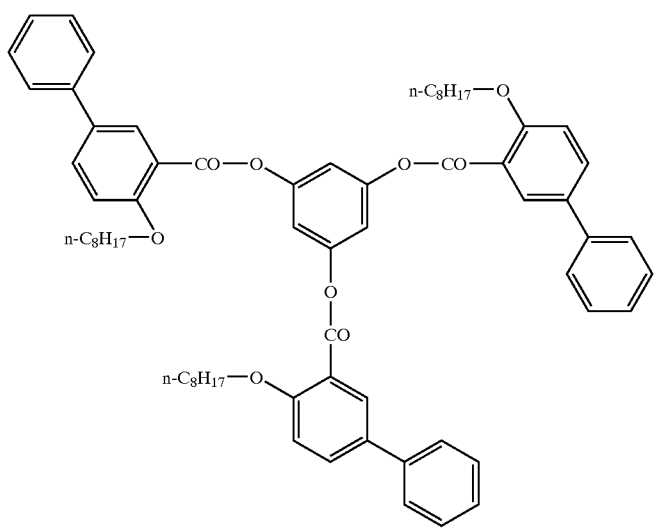
(38)
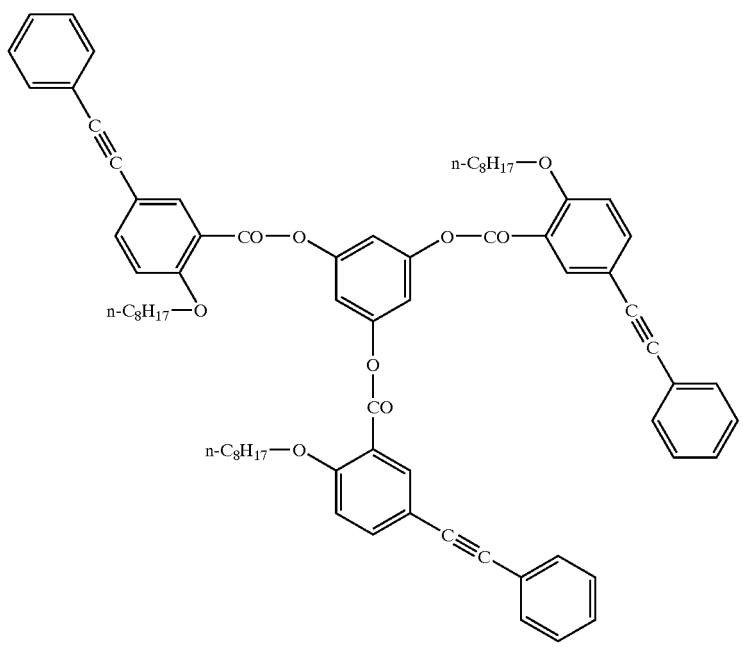
(39)

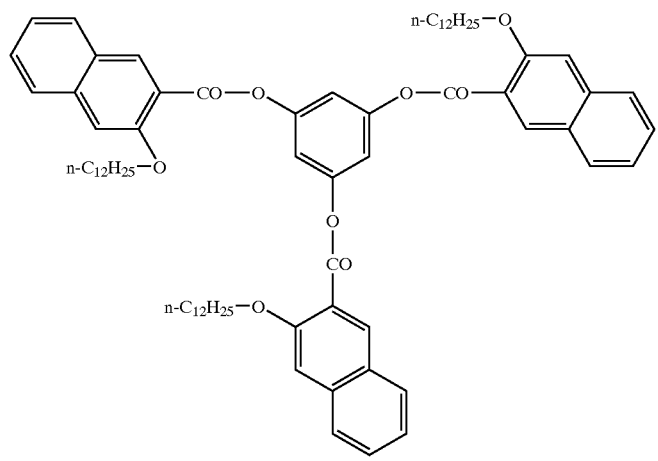
(40)
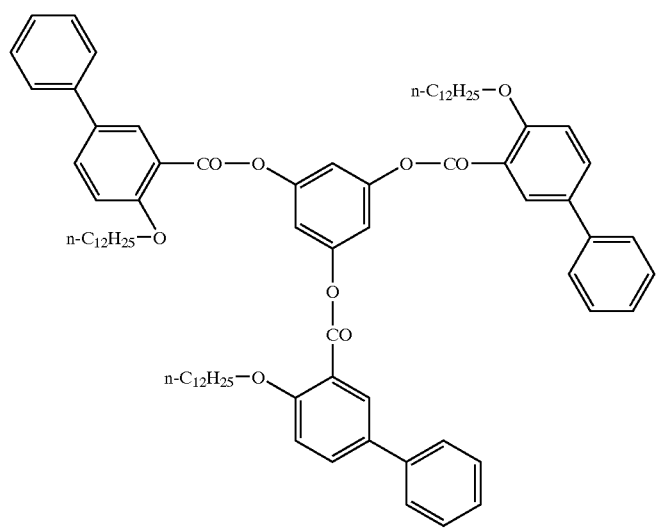
(41)
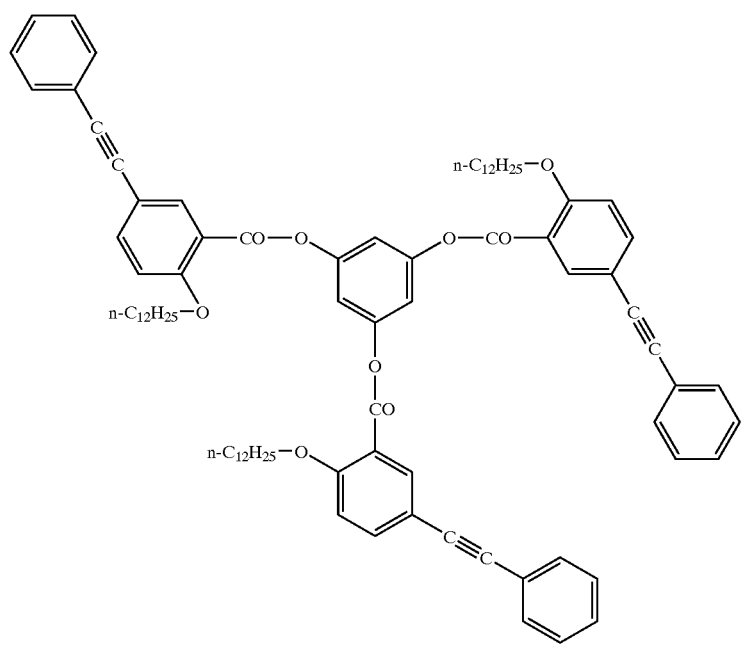
(42)

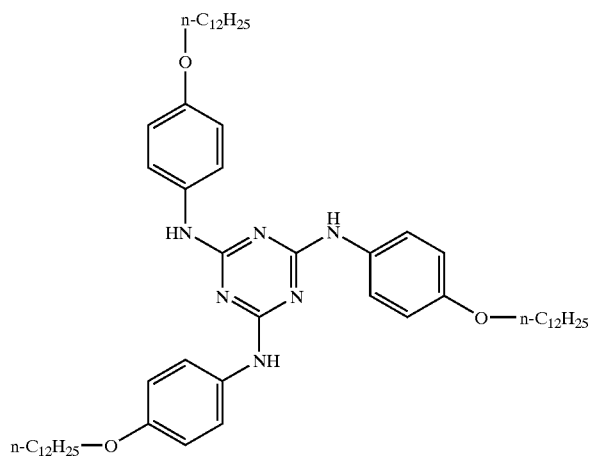
(43)
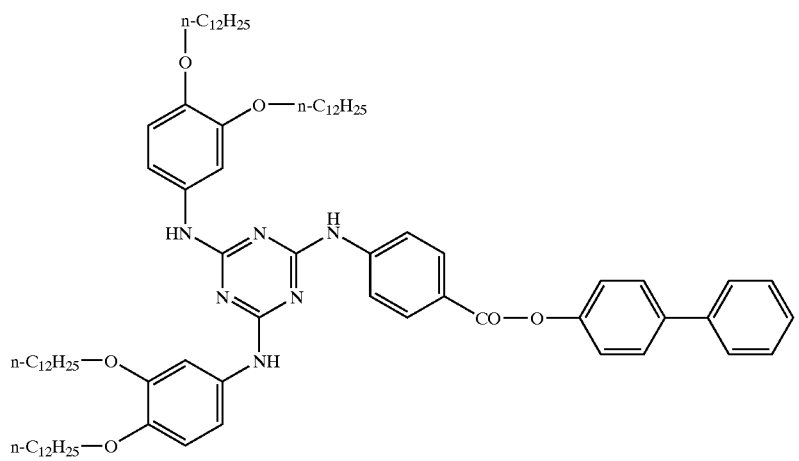
(44)
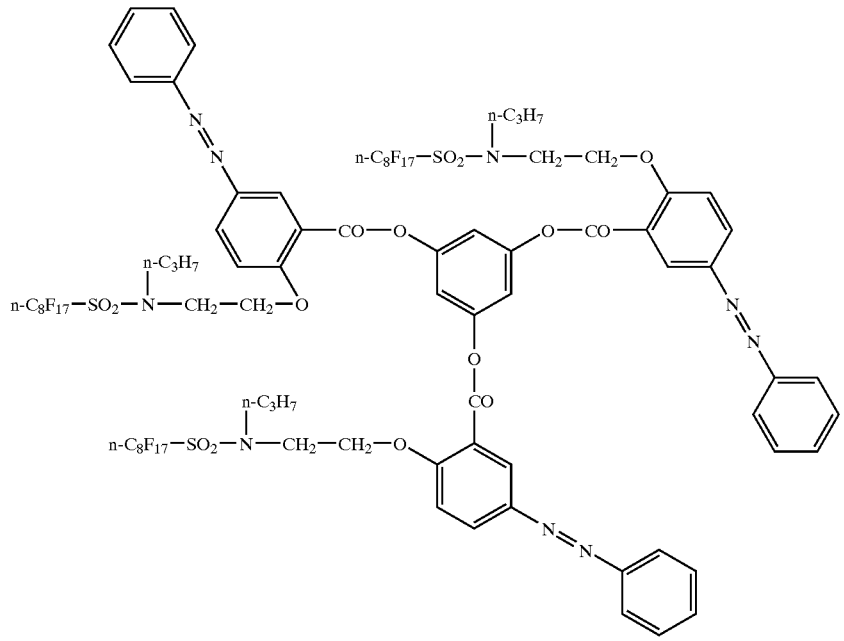
(45)

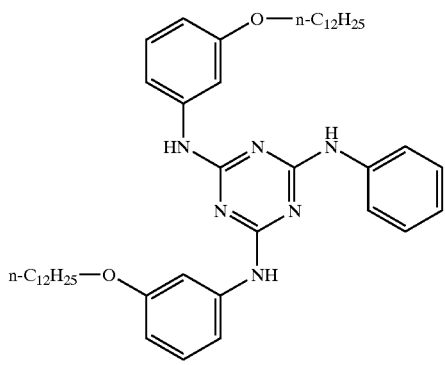 (46)

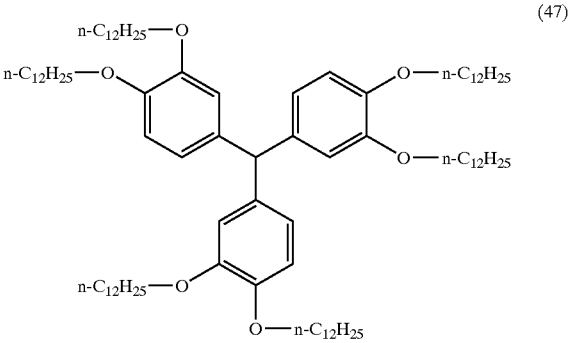 (47)

The first and second optically anisotropic layers of the present invention contain at least one rod-like liquid crystal compound. In the first and second optically anisotropic layers, the molecules of the rod-like liquid crystal compound are preferably substantially uniformly aligned, more preferably fixed in a substantially uniformly aligned state, and the liquid crystal molecules are most preferably fixed by polymerization reaction. The alignment of the liquid crystal molecules is adjusted so that the angle between the slow axis in the plane of the optically anisotropic layer and the longitudinal direction of the transparent substrate is substantially 75° or 15°. The liquid crystal molecules are preferably homogenously aligned (homogeneous alignment). As used herein, "substantially" means ±5°, preferably ±4°. For example, substantially 75° means 75±5°. Preferably used rod-like liquid crystal compounds are azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Not only low molecular liquid crystal compounds as mentioned above but also high molecular liquid crystal compounds can be used.

Suitable rod-like liquid crystal compounds include those described in "Makromol. Chem., Vol. 190, p. 2255(1989)"; "Advanced Materials Vol. 5, p. 107 (1993)"; U.S. Pat. Nos. 4,683,327, 5,622,648 and 5,770,107; International Publications WO95/22,586, WO95/24,455, WO97/00,600, WO98/23,580 and WO98/52905; JP-A 1989-272551, JP-A 1994-16616, JP-A 1995-110469 and JP-A 1999-80081; and Japanese Patent Application No. 2001-64627, more preferably, compounds of formula (VI) below:

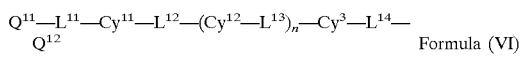
Formula (VI)

wherein $Q^{11}$ and $Q^{12}$ independently represent a polymerizable group; $L^{11}$ and $L^{14}$ independently represent a divalent linking group; $L^{12}$ and $L^{13}$ independently represent a single bond or a divalent linking group; $Cy^{11}$, $Cy^{12}$ and $Cy^{13}$ independently represented divalent cyclic group; and n represents 0, 1 or 2.

In formula (VI) above, $Q^{11}$ and $Q^{12}$ independently represent a polymerizable group. The polymerization reaction of the polymerizable group is preferably addition polymerization (including ring opening polymerization) or condensation polymerization. In other words, the polymerizable group is preferably a functional group responsible for addition polymerization reaction or condensation polymerization reaction. Examples of polymerizable groups are shown below.

 (Q-1)

 (Q-2)

 (Q-3)

 (Q-4)

 (Q-5)

 (Q-6)

 (Q-7)

 (Q-8)

 (Q-9)

—SH (Q-10)

—CHO (Q-11)

—OH (Q-12)

—CO$_2$H (Q-13)

—N=C=O (Q-14)

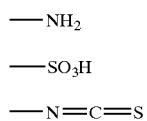

—NH$_2$ (Q-15)

—SO$_3$H (Q-16)

—N=C=S (Q-17)

The polymerizable group (Q$^{11}$ and Q$^{12}$) is preferably an unsaturated polymerizable group (Q-1 to Q-7), an epoxy group (Q-8) or an aziridinyl group (Q-9), more preferably a n unsaturated polymerizable group, most preferably an ethylenically unsaturated polymerizable group (Q-1 to Q-6).

L$^{11}$ and L 14 independently represent a divalent linking g group. Preferably, L$^{11}$ and L$^{14}$ independently represent a divalent linking group selected from the group consisting of —O—, —S—, —CO—, —NR$^{12}$—, divalent linear groups, divalent cyclic groups and combinations thereof wherein R$^{12}$ represents an alkyl group containing 1 to 7 carbon atoms or a hydrogen atom. R$^{12}$ preferably represents an alkyl group containing 1 to 4 carbon atoms or a hydrogen atom, more preferably a methyl group, an ethyl group or a hydrogen atom, most preferably a hydrogen atom. Examples of divalent linking groups consisting of combinations are shown below. Here, the left side is bonded to Q (Q$^{11}$ or Q$^{12}$) and the right side is bonded to Cy (Cy$^{11}$ or Cy$^{13}$).

L-1: —CO—O— " divalent linear group" —O—
L-2: —CO—O— "divalent linear group" —O— "divalent cyclic group" —CO—O—
L-3: —CO—O— "divalent linear group" —O— "divalent cyclic group" —O—CO—
L-4: —CO—O— "divalent linear group" —O— "divalent cyclic group"-"divalent linear group"-.
L-5: —CO—O— "divalent linear group" —O— "divalent cyclic group"-.
L-6: —CO—O— "divalent linear group" —O— "divalent cyclic group"-"divalent linear group" —CO—O—
L-7: —CO—O— "divalent linear group" —O— "divalent cyclic group" —O—CO— "divalent linear group"-.

The divalent linear group contained in the divalent linking group represented by L$^{11}$ and L$^{14}$ means an alkylene, substituted alkylene, alkenylene, substituted alkenylene, alkynylene or substituted alkynylene group. Preferred are alkylene, substituted alkylene, alkenylene and substituted alkenylene groups, more preferably alkylene and alkenylene groups.

The alkylene group may be branched. The alkylene group preferably contains 1 to 12, more preferably 2 to 10, most preferably 3 to 8 carbon atoms.

The alkylene moiety of the substituted alkylene group is as defined above for the alkylene group. Examples of substituents for the substituted alkylene group include halogen atoms.

The alkenylene group may be branched. The alkenylene group preferably contains 2 to 12, more preferably 2 to 8, most preferably 2 to 4 carbon atoms.

The alkenylene moiety of the substituted alkenylene group is as defined above for the alkenylene group. Examples of substituents for the substituted alkenylene group include halogen atoms.

The alkynylene group may be branched. The alkynylene group preferably contains 2 to 12, more preferably 2 to 8, most preferably 2 to 4 carbon atoms.

The alkynylene moiety of the substituted alkynylene group is as defined above for the alkynylene group. Examples of substituents for the substituted alkynylene group include halogen atoms.

The definition and examples of the divalent cyclic group contained in the divalent linking group represented by L$^{11}$ and L$^{14}$ are similar to the definition and examples of Cy$^{11}$, Cy$^{12}$ and Cy$^{13}$ below.

In formula (VI) above, L$^{12}$ and L$^{13}$ independently represent a single bond or a divalent linking group. L$^{12}$ and L$^{13}$ independently represent a divalent linking group selected from the group consisting of —O—, —S—, —CO—, —NR$^{12}$—, divalent linear groups, divalent cyclic groups and combinations thereof or a single bond wherein R$^{12}$ represents an alkyl group containing 1 to 7 carbon atoms or a hydrogen atom, preferably an alkyl group containing 1 to 4 carbon atoms or a hydrogen atom, more preferably a methyl group, an ethyl group or a hydrogen atom, most preferably a hydrogen atom. The divalent linear group and divalent cyclic group contained in the divalent linking group represented by L$^{12}$ and L$^{13}$ are as defined for L$^{11}$ and L$^{14}$.

In formula (VI) above, n represents 0, 1 or 2. When n is 2, two L$^3$s may be identical or different, and two Cy$^{12}$s may also be identical or different. n is preferably 1 or 2, more preferably 1.

In formula (VI) above, Cy$^{11}$, Cy$^{12}$ and Cy$^{13}$ independently represent a divalent cyclic group.

The ring contained in the cyclic group is preferably a 5-membered, 6-membered or 7-membered ring, more preferably a 5-membered or 6-membered ring, most preferably a 6-membered ring. The ring contained in the cyclic group may be a condensed ring, but a motorcycle is more preferred.

The ring contained in the cyclic group may be any of aromatic rings, aliphatic rings and heterocycles. Examples of aromatic rings include benzene and naphthalene rings. Examples of aliphatic rings include a cyclohexane ring. Examples of heterocycles include pyridine and pyrimidine rings.

Cyclic groups having a benzene ring preferably include a 1,4-phenylene group. Cyclic groups having a naphthalene ring preferably include a naphthalene-1,5-diyl group and a naphthalene-2,6-diyl group. Cyclic groups having a pyridine ring preferably include a pyridine-2,5-diyl group. Cyclic groups having a pyrimidine ring preferably include a pyrimidine-2,5-diyl group.

The cyclic group is preferably a 1,4-phenylene group or a 1,4-cyclohexylene group.

The cyclic group may be substituted. Examples of substituents include halogen atoms, cyano, nitro, alkyl groups containing 1 to 5 carbon atoms, halogen-substituted alkyl groups containing 1 to 5 carbon atoms, alkoxy groups containing 1 to 5 carbon atoms, alkylthio groups containing 1 to 5 carbon atoms, acyl groups containing 1 to 5 carbon atoms, acyloxy groups having 2 to 6 carbon atoms, alkoxycarbonyl groups having 2 to 6 carbon atoms, carbamoyl, alkyl-substituted carbamoyl groups having 2 to 6 carbon atoms and amide groups having 2 to 6 carbon atoms.

Examples of polymerizable liquid crystal compounds of formula (VI) above are shown below.

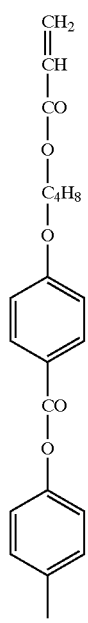 (N1)
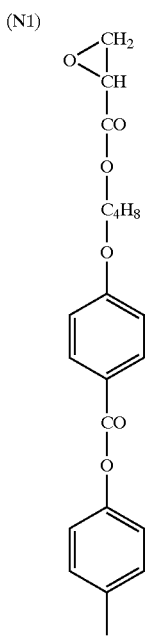 (N2)
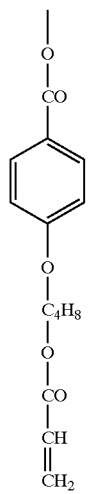
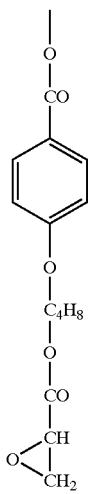
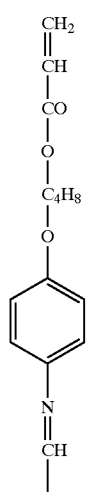 (N3)
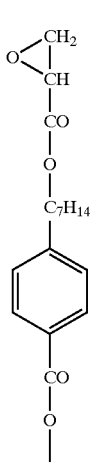 (N4)

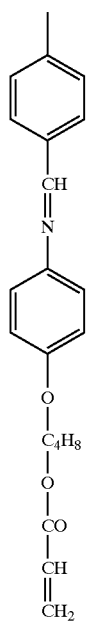
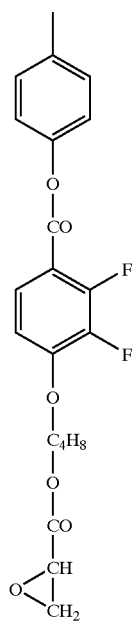
(N5)
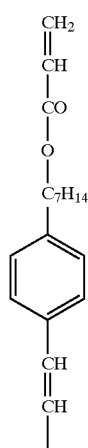
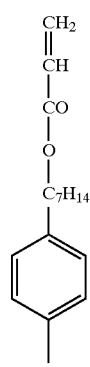
(N6)
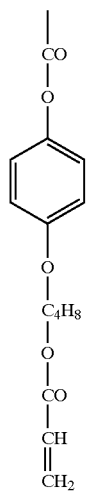
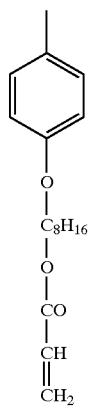

-continued
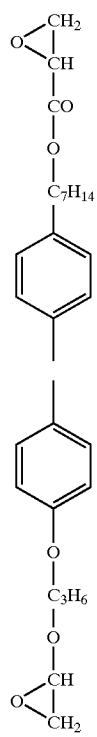
(N7)
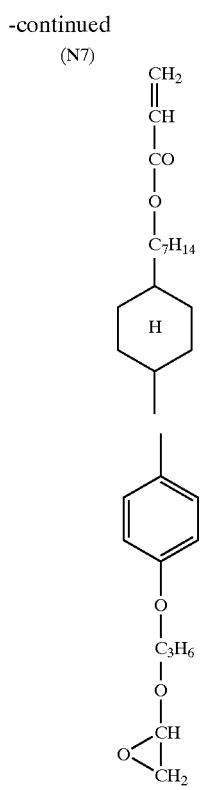
(N8)
(N9)
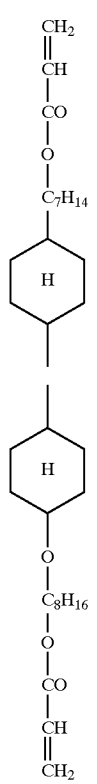
(N10)
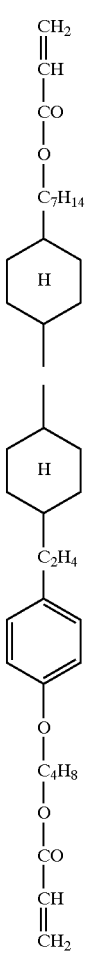

-continued
(N11) 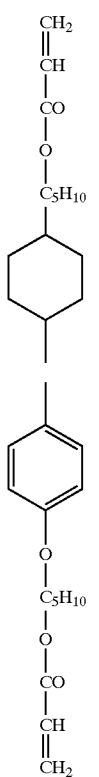
(N12) 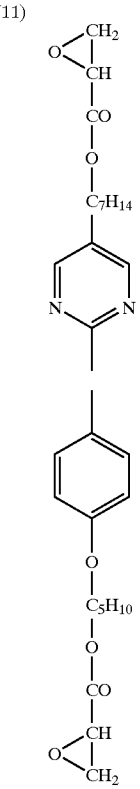
(N13) 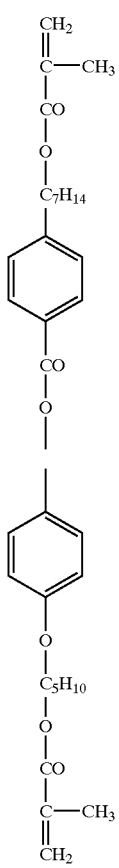
(N14) 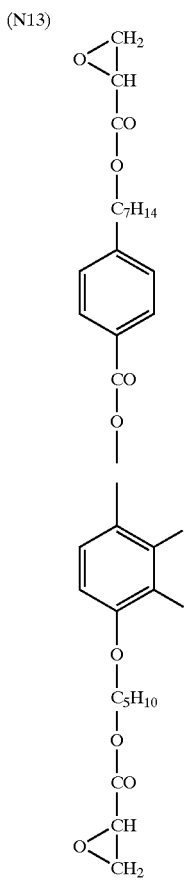

-continued
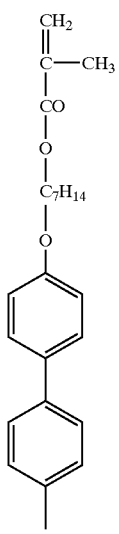
(N15)
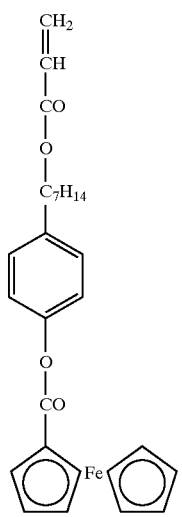
(N16)
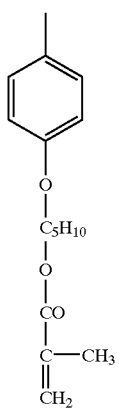
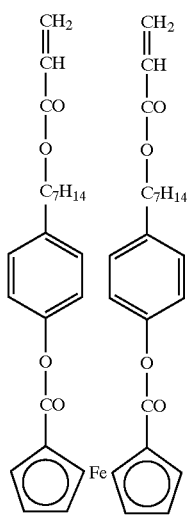
(N17)
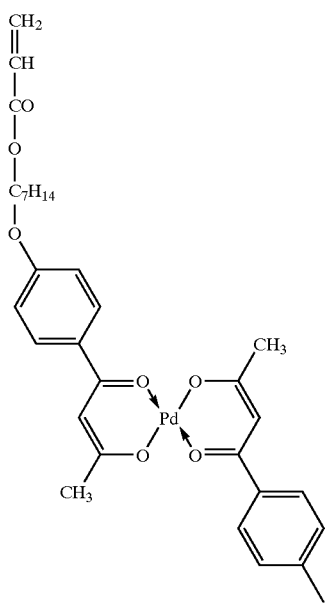
(N18)

-continued
(N19)
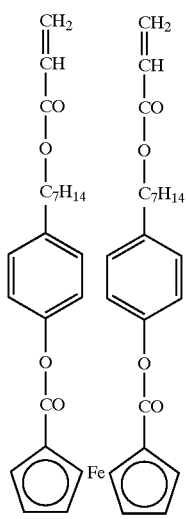
(N20)
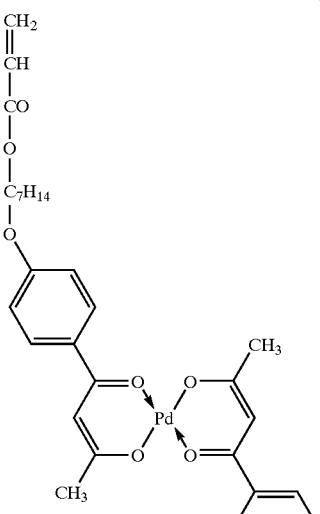
(N21)
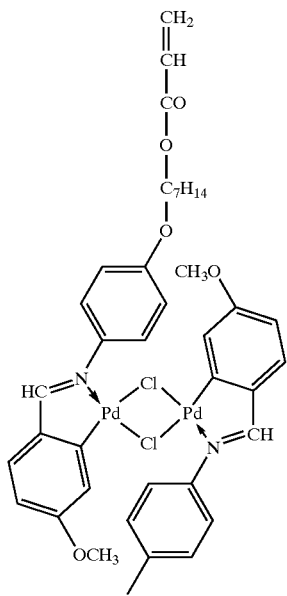

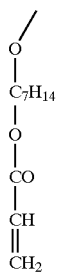
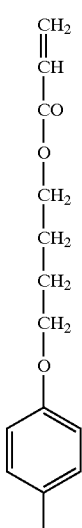
(N22)
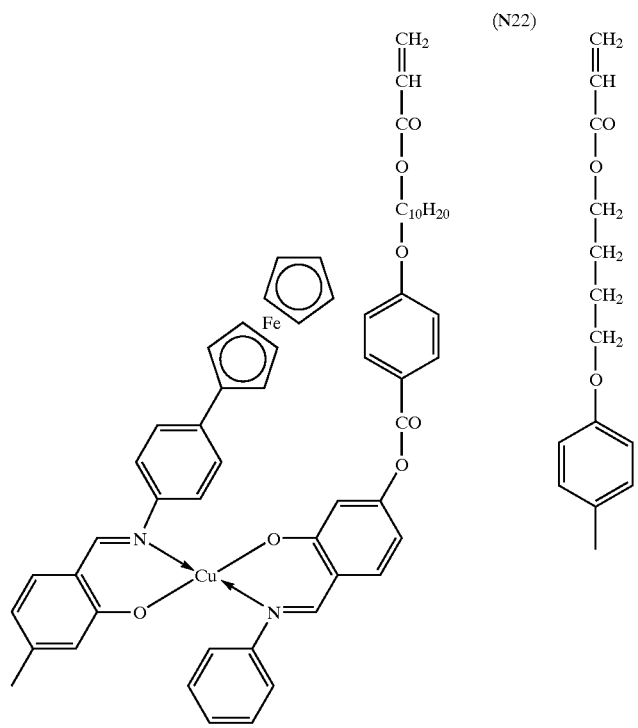
(N23)
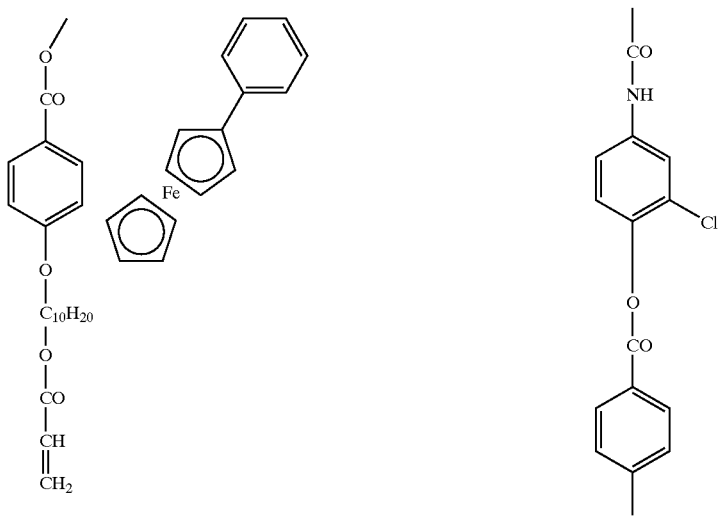

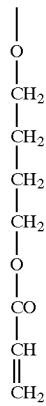
(N24)
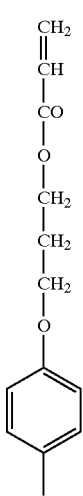
(N25)
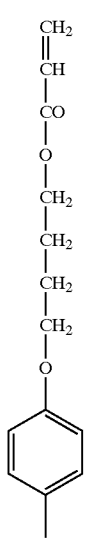
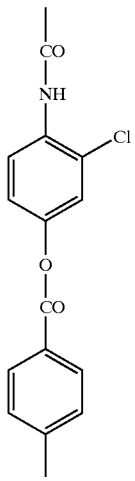
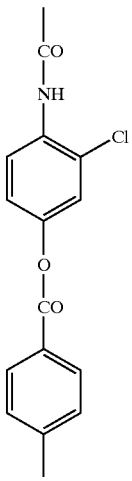

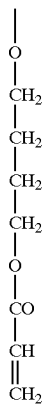 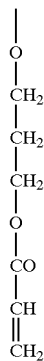
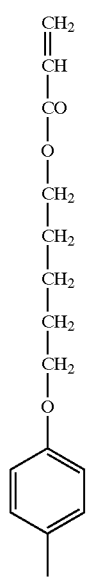 (N26) 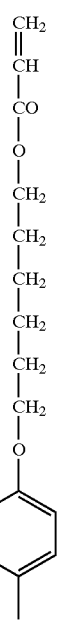 (N27)
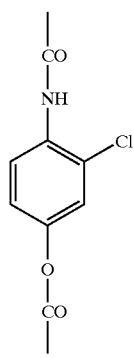 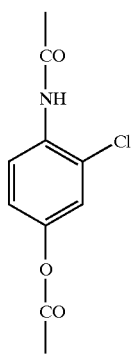

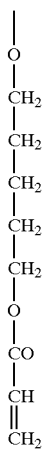
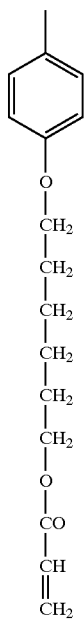
(N28)
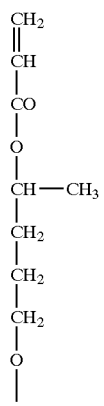
(N29)
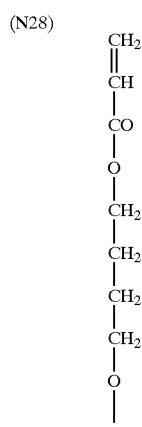
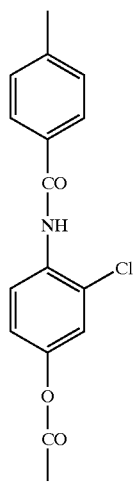
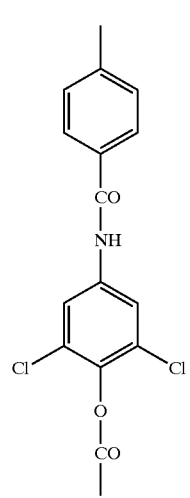

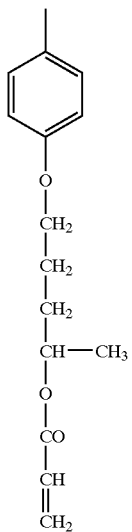 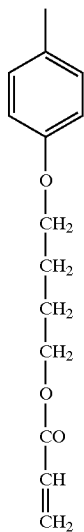
(N30)  (N31)
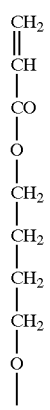 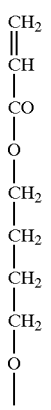
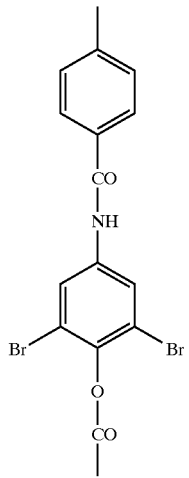 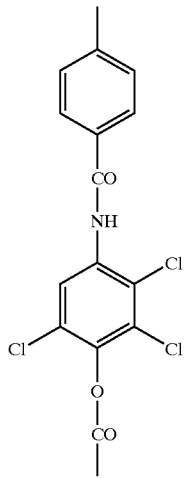

-continued
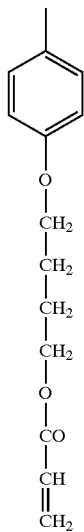 (N32)
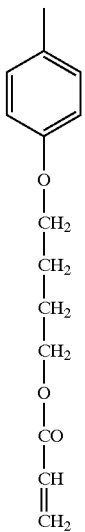 (N33)
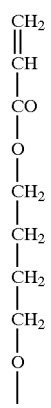
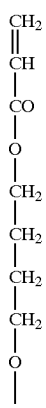
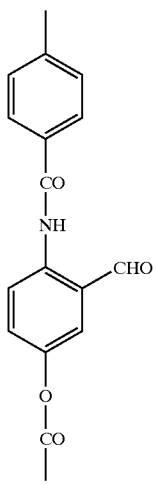
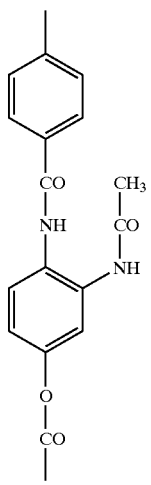

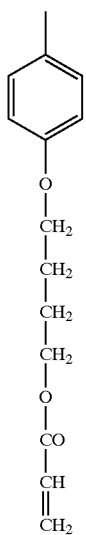 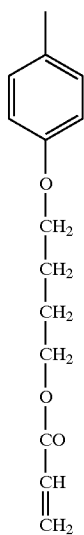 (N34)
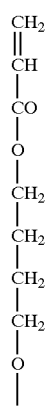 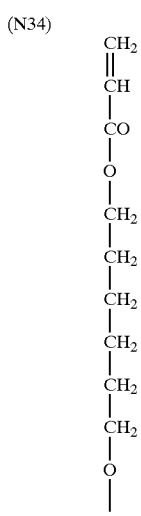 (N35)
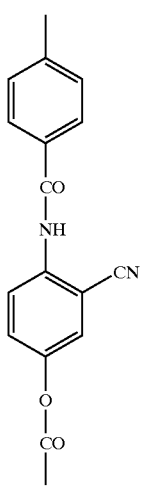 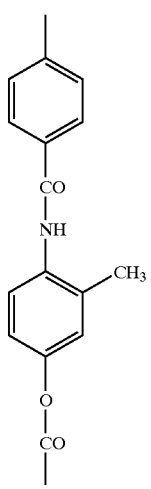

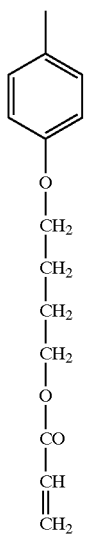
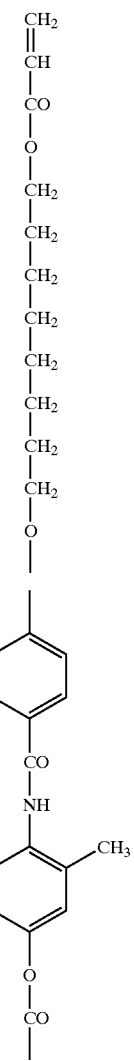
(N36)
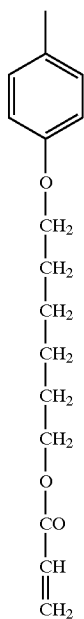
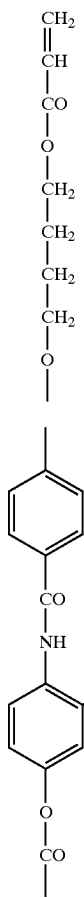
(N37)

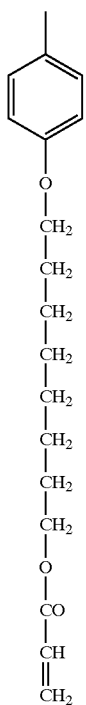 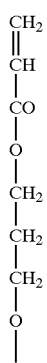 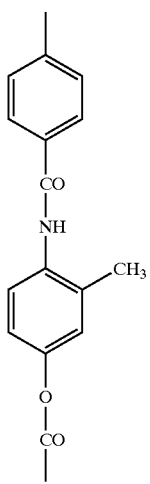
(N38)
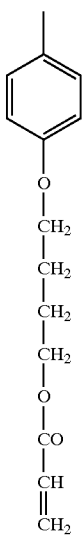 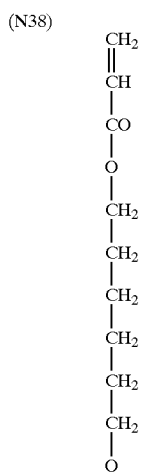 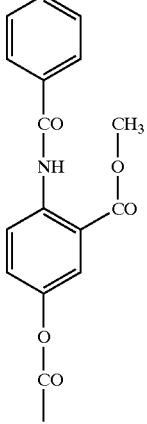
(N39)

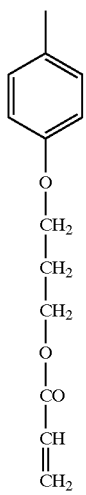
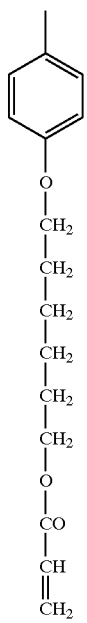
(N40)
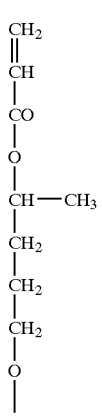
(N41)
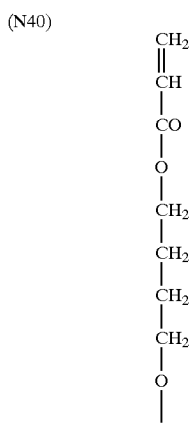
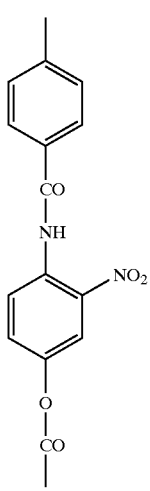
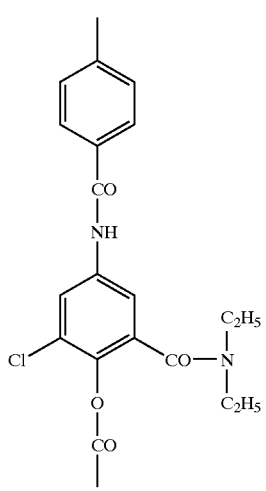

-continued
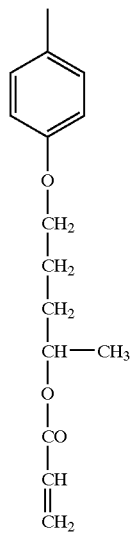
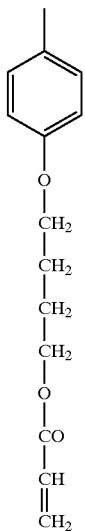
(N42)
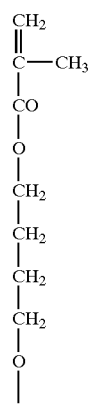
(N43)
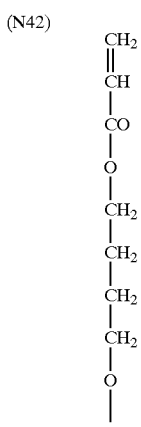
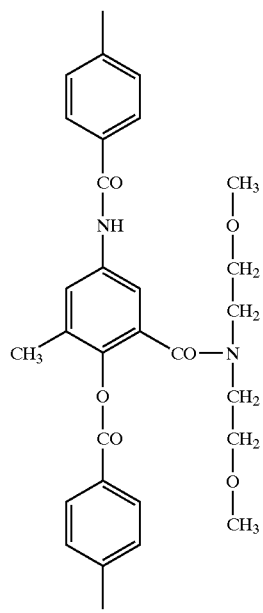
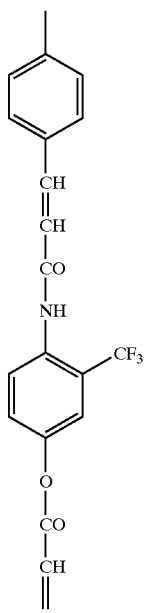

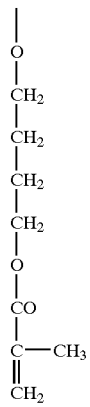 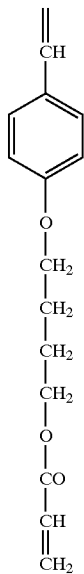
(N44)
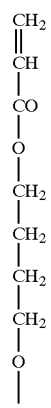
(N45)
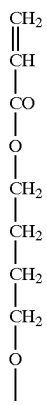
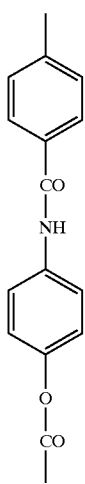 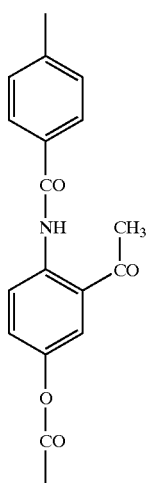

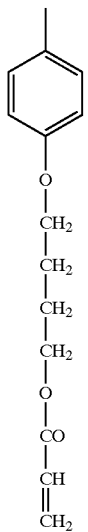 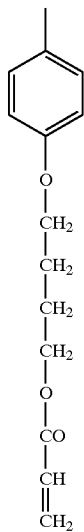
(N46)
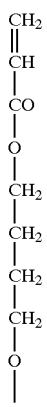
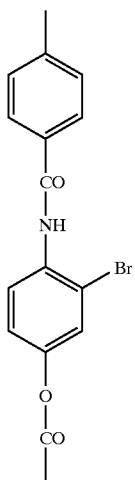

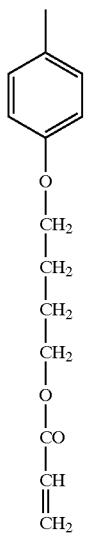

(N47)

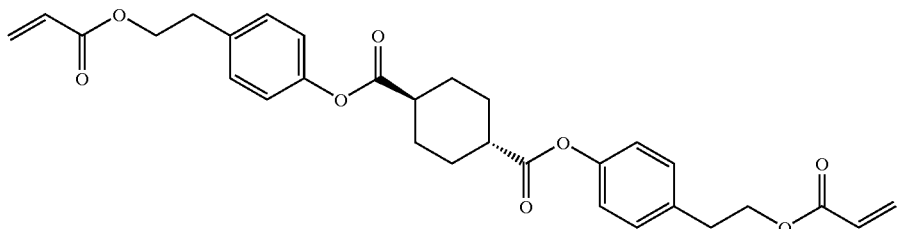

(N48)

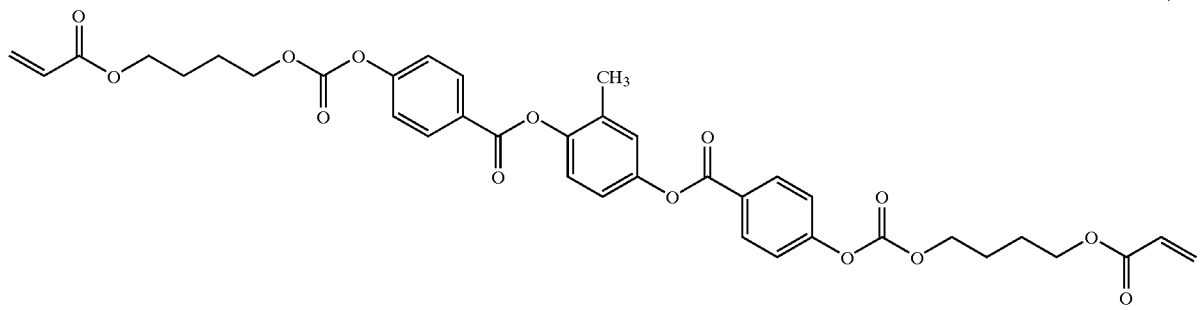

(N49)

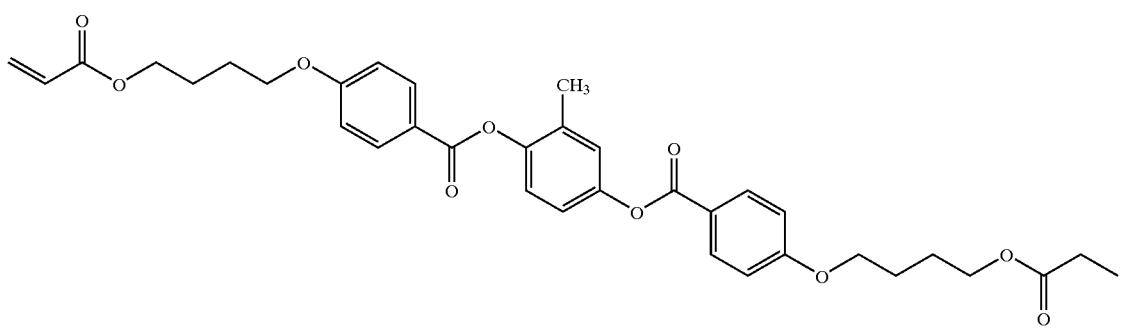

The first and second optically anisotropic layers can be formed by applying a coating solution containing rod-like liquid crystal molecules and a polymerization initiator as described below or other additives to the first and second alignment layers, respectively. The solvent used for preparing the coating solution is preferably an organic solvent. Examples of organic solvents include amides (e.g., N,N-dimethyl formamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methylethylketone) and ethers (e.g., tetrahydrofuran, 1,2-dimethoxyethane). Alkyl halides and ketones are preferred. Two or more organic solvents maybe used in combination. The coating solution can be applied by known techniques (e.g., extrusion coating, direct gravure coating, reverse gravure coating, die coating).

Aligned liquid crystal molecules are fixed in the alignment, preferably by the polymerization reaction of the polymerizable group (P) introduced into the liquid crystal molecules. The polymerization reaction includes thermal polymerization reaction using a thermal polymerization initiator and photo-polymerization reaction using a photo-polymerization initiator. Photo-polymerization reaction is preferred. Examples of photo-polymerization initiators include a-carbonyl compounds (described in U.S. Pat. Nos. 2,367,661 and 2,367,670), acyloin ethers (described in U.S. Pat. No. 2, 448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in JP-A 1985-105667 and U.S. Pat. No. 4,239, 850) and oxadiazole compounds (described in U.S. Pat. No. 4,212,970).

The amount of the photo-polymerization initiators to be used is preferably 0.01 to 20% by weight, more preferably 0.5 to 5% by weight on the basis of solids in the coating solution. Irradiation for polymerizing the liquid crystal molecules preferably uses UV rays. The irradiation energy is preferably 20 mJ/cm$^2$ to 50 J/cm$^2$, more preferably 100 to 800 mJ/cm$^2$. Irradiation may be performed with heating to accelerate the photo-polymerization reaction.

The thicknesses of the first and second optically anisotropic layers are preferably 0.1 to 10 μm, more preferably 0.5 to 5 μm.

Suitable materials for the transparent substrate include, but not specifically limited to, glass plates or polymer films, among which polymer films are preferred to obtain lightweight thin-layer products. Especially, polymer films with low wavelength dispersion are preferably used. The transparent substrate preferably has a small optical anisotropy. Here, the transparent substrate means that it has a transmittance of 80% or more. Preferably, the low wavelength dispersion specifically means an Re400/Re700 ratio of less than 1.2. Preferably, the small optical anisotropy specifically means an in-plane retardation (Re) of 20 nm or less, more preferably 10 nm or less. The long transparent substrate has the form of a roll or a rectangular sheet. Preferably, the first and second optically anisotropic layers are laminated on a transparent substrate in the form of a roll, which is then cut into a desired size.

Examples of polymers include cellulose esters, polycarbonates, polysulfones, polycycloolefin, polyether sulfones, polyacrylates and polymethacrylates, preferably cellulose esters, more preferably acetyl cellulose, most preferably triacetyl cellulose. The polymer films are preferably formed by solvent casting. The thickness of the transparent substrate is preferably 20 to 500 μm, more preferably 50 to 200 μm. The transparent substrate may be subjected to a surface treatment (e.g., glow discharge treatment, corona discharge treatment, UV treatment, flame treatment) to improve adhesion between the transparent substrate and the overlying layer (an adhesive layer, orthogonal alignment layer or optically anisotropic layer). An adhesive layer (undercoat layer) may be provided on the transparent substrate.

Although the foregoing description relates to embodiments of retarders in which incident light is right-handed circularly polarized light for convenience of explanation, it will be appreciated that the present invention also includes embodiments for left-handed circularly polarized light. In an embodiment for left-handed circularly polarized light, a first optically anisotropic layer having a phase shift of n and a second optically anisotropic layer having a phase shift of π/2 are laminated on a long transparent substrate in such a manner that the longitudinal direction of the substrate forms an angle of −75° with the slow axis of the first opticallyanisotropic layer and an angle of −15° with the slow axis of the second optically anisotropic layer. Retarders of this embodiment can be prepared by being the rubbing axis of the first alignment layer at 15° and the rubbing axis of the second alignment layer at −15° with respect to the longitudinal direction of the transparent substrate.

Retarders of the present invention can be especially advantageously used as λ/4 plates in reflective liquid crystal display devices, λ/4 plates in pickups for writing on optical discs, or λ/4 plates in anti-reflection coatings. Typically, λ/4 plates are used as circular polarizers in combination with polarizing films. Thus, retarders can be easily incorporated into intended devices such as reflective liquid crystal display devices when they are combined with polarizing films to form circular polarizers. Retarders of the present invention can be used in combination with polarizing films in reflective liquid crystal display devices to reduce blueness when a black image is displayed. Moreover, retarders of the present invention can be stored and transported in the form of a roll and can be continuously treated in a roll-to-roll manner during lamination to polarizing films, so that they can be easily prepared into circular polarizers.

Circular polarizers of the present invention comprise a polarizing film in addition to a retarder of the present invention. The polarizing film is laminated at the bottom the transparent substrate (on the side opposite to the first and second optically anisotropic layers) in such a manner that the longitudinal direction of the transparent substrate substantially coincides with the absorption axis. That is, circular polarizers of the present invention have a polarizing film having a polarization axis in a direction substantially perpendicular to the longitudinal direction of the transparent substrate.

Polarizing films used in the present invention include iodine-based polarizing films, dye-based polarizing films using dichroic dyes and polyene-based polarizing films. Iodine-based polarizing films and dye-based polarizing films are typically prepared with polyvinyl alcohol-based films. The transmission axis of the polarizing film corresponds to the direction perpendicular to the orientation direction of the film. The polarizing film typically has a protective film on each side. In the present invention, however, the transparent substrate can serve as a protective film on one side of the polarizing film. When a separate protective film is used other than the transparent substrate, it is preferably a cellulose ester film having high opticalisotropy, especially a triacetyl cellulose film.

Circular polarizers of the present invention serve as broadband λ/4 plates. The broadband λ/4 plates here specifically mean that they have a retardation value/wavelength ratio within the range of 0.2 to 0.3 measured at a wavelength of any of 450 nm, 550 nm and 650 nm. The retardation value/wavelength ratio is preferably within the range of 0.21 to 0.29, more preferably within the range of 0.22 to 0.28, still more preferably within the range of 0.23 to 0.27, most preferably within the range of 0.24 to 0.26.

EXAMPLES

The present invention will further be detailed referring to specific Examples. It is to be noted that any materials, reagents, ratios of use thereof and operations shown in the Examples below can properly be modified without departing from the spirit of the present invention. Thus the present invention is by no means limited to the Examples described below.

Example 1

(Formation of an Alignment Layer)

An optically isotropic triacetyl cellulose film in the form of a roll of 100 μm in thickness, 500 mm in width and 500 m in length was used as a transparent substrate. A diluted solution for an alignment layer (a polymer of the structural formula below) was continuously applied to one side of the transparent substrate to form an orthogonal alignment layer having a thickness of 0.5 μm. Then, a rubbing process was continuously performed in a direction at 16° clockwise with respect to the longitudinal direction of the transparent substrate.

Polymer PA-132 for the orthogonal alignment layer

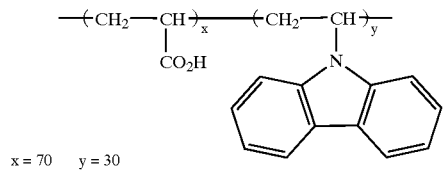

x = 70   y = 30

(Preparation of an Optically Anisotropic Layer (A))

A coating solution of the composition below was continuously applied to the alignment layer using a bar coater, and dried and heated (matured in alignment), and further irradiated with Uv rays to form an optically anisotropic layer (A) having a thickness of 1.6 μm. The optically anisotropic layer had a slow axis in a direction at 74° anticlockwise with respect to the longitudinal direction of the transparent substrate.

The retardation value at 550 nm was 225 nm.

Composition of the coating solution for the optically anisotropic layer

| | |
|---|---|
| Rod-like liquid crystal compound (1) below | 14.5 wt % |
| Sensitizer (1) below | 1.0 wt % |
| Photo-polymerization initiator (1) below | 3.0 wt % |
| An agent for promoting homogenous alignment (1) below | 1.0 wt % |
| Methyl ethyl ketone | 80.5 wt % |

Rod-like liquid crystal compound (1)

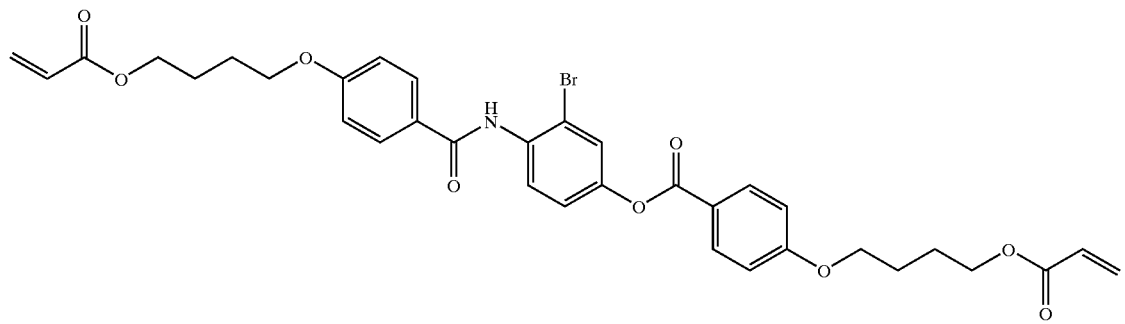

Sensitizer (1)

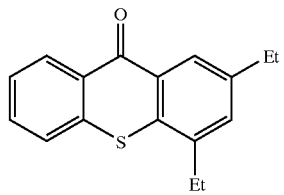

Photo-polymerization initiator (1)

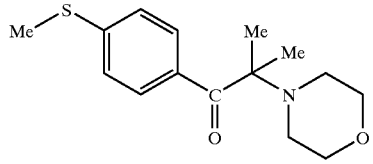

Agent for promoting homogenous alignment (1)

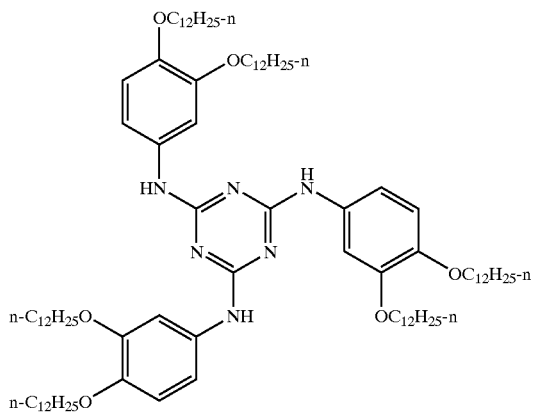

Example 2

(Forming an Alignment Layer)

An optically isotropic triacetyl cellulose film in the form of a roll of 100 μm in thickness, 500 mm in width and 500 m in length was used as a transparent substrate. A diluted solution for an alignment layer (a polymer of the structural formula below) was continuously applied to one side of the transparent substrate to form an orthogonal alignment layer having a thickness of 0.8 μm. Then, a rubbing process was continuously performed in a direction at 16° clockwise with respect to the longitudinal direction of the transparent substrate.

Polymer PA-132 for the orthogonal alignment layer

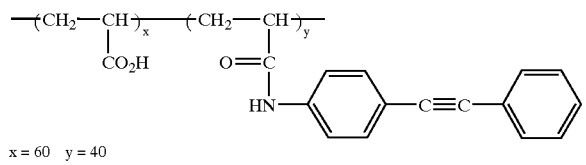

x = 60  y = 40

A coating solution of the composition below was continuously applied to the alignment layer using a bar coater, and dried and heated (matured in alignment), and further irradiated with UV rays to form an optically anisotropic layer (A) having a thickness of 1.6 μm. The optically anisotropic layer had a slow axis in a direction at 74° anticlockwise with respect to the longitudinal direction of the transparent substrate. The retardation value at 550 nm was 224 nm.

Composition of the coating solution for the optically anisotropic layer

| | |
|---|---|
| Rod-like liquid crystal compound (1) above | 14.5 wt % |
| Sensitizer (1) above | 1.0 wt % |
| Photo-polymerization initiator (1) above | 3.0 wt % |
| Agent for promoting homogenous alignment (1) above | 1.0 wt % |
| Methyl ethyl ketone | 80.5 wt % |

Example 3

(Forming an Alignment Layer)

An optically isotropic triacetyl cellulose film in the form of a roll of 100 μm in thickness, 500 mm in width and 30 m in length was used as a transparent substrate. A diluted solution for an alignment layer (a polymer of the structural formula below) was continuously applied to one side of the transparent substrate to form an alignment layer having a thickness of 0.5 μm. Then, a rubbing treatment was continuously performed in a direction at 16° clockwise with respect to the longitudinal direction of the transparent substrate.

Polymer for the alignment layer

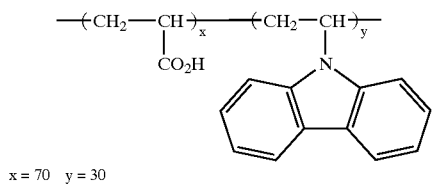

x = 70  y = 30

(Preparation of an Optically Anisotropic Layer (B))

A coating solution of the composition below was continuously applied to the alignment layer using a bar coater, and dried and heated (matured in alignment), and further irradiated with UV rays to form an optically anisotropic layer (B) having a thickness of 0.8 μm. The optically anisotropic layer had a slow axis parallel to the rubbing direction, i.e. in a direction at 16° with respect to the longitudinal direction of the transparent substrate. The retardation value at 550 nm was 113 nm.

Composition of the coating solution for the optically anisotropic layer

| | |
|---|---|
| Rod-like liquid crystal compound (1) above | 13.0 wt % |
| Sensitizer (1) above | 1.0 wt % |
| Photo-polymerization initiator (1) above | 3.0 wt % |
| Agent for promoting homogenous alignment (1) above | 1.0 wt % |
| Methyl ethyl ketone | 82.0 wt % |

Example 4

The diluted solution for an alignment layer used in Example 3 was continuously applied on the optically anisotropic layer of the retarder prepared in Example 1 to form an alignment layer. Then, the alignment layer was subjected to a rubbing treatment at 58° clockwise with respect to the slow axis of the optically anisotropic layer (A) and 16° anticlockwise with respect to the longitudinal direction of the retarder prepared in Example 1.

Then, the coating solution of a liquid crystal compound used in Example 3 was continuously applied on the alignment layer using a bar coater, and dried and heated (matured in alignment), and further irradiated with UV rays to form an optically anisotropic layer (B) having a thickness of 0.8 μm.

Example 5

The diluted solution for an alignment layer used in Example 3 was continuously applied on the optically anisotropic layer of the retarder prepared in Example 2 to form an alignment layer. Then, the alignment layer was subjected to a rubbing treatment at 58° clockwise with respect to the slow axis of the optically anisotropic layer (A) and 16° anticlockwise with respect to the longitudinal direction of the retarder prepared in Example 2.

Then, the coating solution of a liquid crystal compound used in Example 3 was continuously applied to the alignment layer using a bar coater, and dried and heated (matured in alignment), and further irradiated with UV rays to form an optically anisotropic layer (B) having a thickness of 0.8 μm.

Comparative Example 1

The same diluted solution as used in Example 3 was used to form an alignment layer. Then, a rubbing treatment was continuously performed in a direction at 74° anticlockwise with respect to the longitudinal direction of the transparent substrate.

A coating solution of the same composition as used in Example 3 was continuously applied on the alignment layer using a bar coater, and dried and heated (matured in alignment), and further irradiated with UV rays to form an optically anisotropic layer (A) having a thickness of 1.6 μm. The optically anisotropic layer had a slow axis in a direction at 74° with respect to the longitudinal direction of the transparent substrate. The retardation value at 550 nm was 225 nm.

The diluted solution for an alignment layer used in Example 3 was continuously applied to the optically anisotropic layer (A) of the retarder to form an alignment layer. Then, the alignment layer was subjected to a rubbing treatment at 58° clockwise with respect to the slow axis of the optically anisotropic layer (A) and 16° anticlockwise with respect to the longitudinal direction of the retarder.

Then, the coating solution of a liquid crystal compound used in Example 3 was continuously applied to the alignment layer using a bar coater, and dried and heated (matured in alignment), and further irradiated with UV rays to form an optically anisotropic layer (B) having a thickness of 0.8 μm. The retardation value of the optically anisotropic layer (B) was 113 nm, and the angle between the two anisotropic layers was 58°.

Comparative Example 2

A retarder was formed exactly in the same manner as in Example 4 except that the agent for promoting homogenous alignment was excluded from the optically anisotropic layers (A) and (B). The angle between the two anisotropic layers was adjusted to 58°, but the retardation value of the optically anisotropic layer (A) was 180 nm and the retardation value of the optically anisotropic layer (B) was 73 nm, showing that the retarder did not have a sufficient optical performance for λ/4 plates.

Example 6
Evaluation of the Retarders

The retarders prepared in Examples 4, 5 and Comparative examples 1, 2 were each laminated to a polarizer consisting of a polarizing film and a protective film at an angle of 90° between the polarization axis of the polarizing film and the longitudinal direction of the retarder, i.e. in a roll-to-roll manner to prepare circular polarizers. The resulting circular polarizers were irradiated (at wavelengths of 450 nm, 550 nm and 650 nm) from the side of the polarizing film to determine the phase shift (retardation value: Re) of the transmitted light. The results are shown in the table below.

TABLE 1

|  | Re (450 nm) | Re (550 nm) | Re (630 nm) |
|---|---|---|---|
| Desired Value | 112.5 nm | 137.5 nm | 157.5 nm |
| Example 4 | 112 nm | 135 nm | 143 nm |
| Example 5 | 110 nm | 135 nm | 141 nm |
| Comparative Example 1 | 98 nm | 119 nm | 126 nm |
| Comparative Example 2 | 105 nm | 130 nm | 132 nm |

As shown in the table above, the retarders prepared in Examples 4 and 5 show a phase shift of π/2 especially in the short wavelength region. The retarders prepared in Comparative examples 1 and 2 were poor in the alignment, condition of the liquid crystals and showed many alignment defects. It is shown that the phase shift also decreased in the whole wavelength region.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A retarder comprising:
   a long transparent substrate; and up on the substrate,
   a first optically anisotropic layer formed from a homogenously aligned rod-like liquid crystal compound and having a phase shift substantially equal to n measured at a wavelength of 550 nm;
   a second optically anisotropic layer formed form a homogenously aligned rod-like liquid crystal compound and having a phase shift substantially equal to π/2 measured at a wavelength of 550 nm; and
   a first alignment layer having a rubbing axis defining the azimuthal direction of the homogenous alignment of the rod-like liquid crystal compound in the first optically anisotropic layer;
   wherein the angle between the slow axis in the plane of the first optically anisotropic layer and the longitudinal direction of the transparent substrate is substantially 75°, the angle between the slow axis in the plane of the second optically anisotropic layer and the longitudinal direction of the transparent substrate is substantially 15°, the angle between the slow axis in the plane of the second optically anisotropic layer and the slow axis in the plane of the first optically anisotropic layer is substantially 60° and the azimuthal direction of the homogenous alignment of the rod-like liquid crystal compound in the first optically anisotropic layer is substantially orthogonal to the rubbing axis of the first alignment layer.

2. The retarder of cl aim 1, comprising a second alignment layer having a rubbing axis defining the azimuthal direction of the homogenous alignment of the rod-like liquid crystal compound in the second optically anisotropic layer, wherein the angle between the rubbing axis of the first alignment layer and the longitudinal direction of the transparent substrate is substantially −15° and the angle between the rubbing axis of the second alignment layer and the longitudinal direction of the transparent substrate is substantially 15°.

3. The retarder of cl aim 1 wherein the first alignment layer is formed of at least one copolymer having at least one of repeating units represented by any one of formulae (I) to (III) below and at least one of repeating units represented by formula (IV) below:

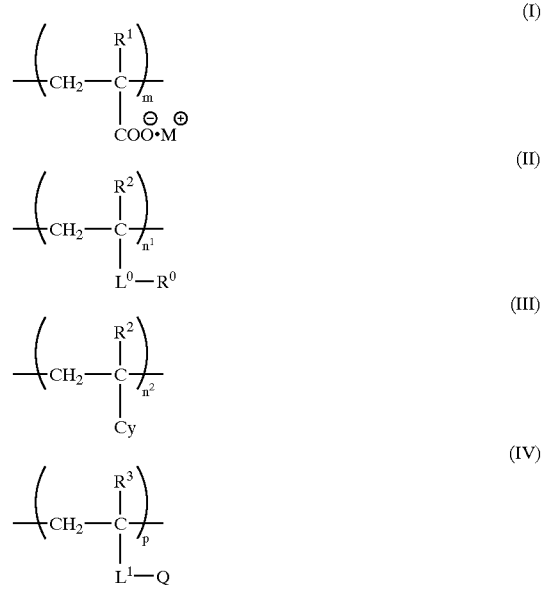

wherein $R^1$ to $R^3$ independently represent a hydrogen atom, a halogen atom or an alkyl group having 1 to 6 carbon atoms; M represents a proton, an alkali metal ion or an ammonium ion; $L^0$ and $L^1$ independently represent a divalent linking group selected from the group consisting of —O—, —S—, —CO—, —NR$^4$—, —SO$_2$—, alkylene groups, alkenylene groups, arylene groups and combinations thereof; $R^4$ represents a hydrogen atom or an alkyl group containing 1 to 6 carbon atoms; $R^0$ represents a C10–100 group containing at least two aromatic rings or aromatic heterocycles; Cy represents a condensed aromatic cyclic hydrocarbon group or a condensed aromatic heterocyclic group; Q represents a polymerizable group; and m, $n^1$, $n^2$ and p represent the mol % of each repeating unit where m is 10–99 mol %, $n^1$ and $n^2$ are each 1–90 mol % and p is 0.1–20 mol %.

4. The retarder of claim 1 wherein the first optically anisotropic layer contains at least an agent for promoting homogenous alignment represented by formula (V) below:

$$(Hb\text{—}L^2\text{—})_n B^1 \qquad \text{Formula (V)}$$

wherein Hb represents an aliphatic group having 6 to 40 carbon atoms or an aliphatic-substituted oligosiloxanoxy group having 6 to 40 carbon atoms; $L^2$ represents a divalent linking group selected from the group consisting of —O—, —S—, —CO—, —NR$^5$—, —SO$_2$—, alkylene groups, alkenylene groups, arylene groups and combinations thereof; $R^5$ represents a hydrogen atom or an alkyl group having 1 to 6 carbon atoms; n represents an integer of any of 2 to 12; and $B^1$ represents an n-valent group containing at least three cyclic structures;

and wherein the tilt angle of the rod-like liquid crystal compound is substantially less than 10°.

5. The retarder of claim 1 wherein the rod-like liquid crystal compound in the first optically anisotropic layer or the second optically anisotropic layer is at least one of rod-like liquid crystal compounds of formula (VI) below:

$$Q^{11}\text{—}L^{11}\text{—}Cy^{11}\text{—}L^{12}\text{—}(Cy^{12}\text{—}L^{13})_n\text{—}Cy^{13}\text{—}L^{14}\text{—}Q^{12} \qquad \text{Formula (VI)}$$

wherein $Q^{11}$ and $Q^{12}$ independently represent a polymerizable group; $L^{11}$ and $L^{14}$ independently represent a divalent linking group; $L^{12}$ and $L^{13}$ independently represent a single bond or a divalent linking group; $Cy^{11}$, $Cy^{12}$ and $Cy^{13}$ independently represent a divalent cyclic group; and n represents 0, 1 or 2.

6. A method for preparing a retarder comprising the steps of:
   forming a first alignment layer up on a long transparent substrate, said first alignment layer having a rubbing axis at an angle of substantially −15° with respect to the longitudinal direction of the transparent substrate,
   forming a first optically anisotropic layer by applying a rod-like liquid crystal compound to the first alignment layer and homogenously aligning the rod-like liquid crystal compound in an azimuthal direction substantially orthogonal to the rubbing axis of the first alignment layer, so as that the first optically anisotropic layer has a phase shift substantially equal to n measured at a wavelength of 550 nm,
   forming a second alignment layer on the transparent substrate, said second alignment layer having a rubbing axis at an angle of substantially 15° with respect to the longitudinal direction of the transparent substrate, and
   forming a second optically anisotropic layer by applying a rod-like liquid crystal compound to the second alignment layer and homogenously aligning the rod-like liquid crystal compound in an azimuthal direction substantially parallel to the rubbing axis of the second alignment layer, so as that the second optically anisotropic layer has a phase shift substantially equal to π/2 measured at a wavelength of 550 nm.

7. The method of claim 6 wherein the step of forming a first alignment layer and the step of forming a first optically anisotropic layer are followed by the step of forming a second alignment layer and the step of forming a second optically anisotropic layer.

8. The method of claim 6 wherein the step of forming a second alignment layer and the step of forming a second optically anisotropic layer are followed by the step of forming a first alignment layer and the step of forming a first optically anisotropic layer.

9. The method of claim 6 wherein both steps of forming a first optically anisotropic layer and a second optically anisotropic layer are steps of forming them by applying a composition comprising the rod-like liquid crystal compound and at least an agent for promoting homogenous alignment represented by formula (V) below:

$$(Hb\text{—}L^2\text{—})_n B^1 \qquad \text{Formula (V)}$$

wherein Hb represents an aliphatic group having 6 to 40 carbon atoms or an aliphatic-substituted oligosiloxanoxy group having 6 to 40 carbon atoms; $L^2$ represents a divalent linking group selected from the group consisting of —O—, —S—, —CO—, —NR$^5$—, —SO$_2$—, alkylene groups, alkenylene groups, arylene groups and combinations thereof; $R^5$ represents a hydrogen atom or an alkyl group having 1 to 6 carbon atoms; n represents an integer of any of 2 to 12; and $B^1$ represents an n-valent group containing at least three cyclic structures;

and homogenously aligning the rod-like liquid crystal compound in the presence of the agent, so as that the tilt angle of the rod-like liquid crystal compound is substantially less than 10°.

10. The method of claim 6 wherein the first alignment layer is formed of at least one copolymer having at least one of repeating units represented by any one of formulae (I) to (III) below and at least one of repeating units represented by formula (IV) below:

(I)

(II)

(III)

(IV)

wherein $R^1$ to $R^3$ independently represent a hydrogen atom, a halogen atom or an alkyl group having 1 to 6 carbon atoms; M represents a proton, an alkali metal ion or an ammonium ion; $L^0$ and $L^1$ independently represent a divalent linking group selected from the group consisting of —O—, —S—, —CO—, —NR$^4$—, —SO$_2$—, alkylene groups, alkenylene groups, arylene groups and combinations thereof; $R^4$ represents a hydrogen atom or an alkyl group containing 1 to 6 carbon atoms; $R^0$ represents a C10–100 group containing at least two aromatic rings or aromatic heterocycles; Cy represents a condensed aromatic cyclic hydrocarbon group or a condensed aromatic heterocyclic group; Q represents a polymerizable group; and m, $n^1$, $n^2$ and p represent the mol % of each repeating unit where m is 10–99 mol %, $n^1$ and $n^2$ are each 1–90 mol % and p is 0.1–20 mol %.

11. A circular polarizer comprising:

a long transparent substrate having a front surface and rear surface; and up on the front surface of the substrate, a first optically anisotropic layer formed of a homogenously aligned rod-like liquid crystal compound and having a phase shift substantially equal to n measured at a wavelength of 550 nm;

a second optically anisotropic layer formed of a homogenously aligned rod-like liquid crystal compound and having a phase shift substantially equal to $\pi/2$ measured at a wavelength of 550 nm; and a first alignment layer having a rubbing axis defining the azimuthal direction of the homogenous alignment of the rod-like liquid crystal compound in the first optically anisotropic layer; and on the rear surface of the substrate, a polarizing film having a polarization axis substantially orthogonal to the longitudinal direction of the substrate;

wherein the angle between the slow axis in the plane of the first optically anisotropic layer and the longitudinal direction of the transparent substrate is substantially 75°, the angle between the slow axis in the plane of the second optically anisotropic layer and the longitudinal direction of the transparent substrate is substantially 15°, the angle between the slow axis in the plane of the second optically anisotropic layer and the slow axis in the plane of the first optically anisotropic layer is substantially 60° and the azimuthal direction of the homogenous alignment of the rod-like liquid crystal compound in the first optically anisotropic layer is substantially orthogonal to the rubbing axis of the first alignment layer.

12. The circular polarizer of claim 11, comprising a second alignment layer having a rubbing axis defining the azimuthal direction of the homogenous alignment of the rod-like liquid crystal compound in the second optically anisotropic layer, wherein the angle between the rubbing axis of the first alignment layer and the longitudinal direction of the transparent substrate is substantially −15° and the angle between the rubbing axis of the second alignment layer and the longitudinal direction of the transparent substrate is substantially 15°.

13. The circular polarizer of claim 11 wherein the first alignment layer contains at least one copolymer having at least one of repeating units represented by any one of formulae (I) to (III) below and at least one of repeating units represented by formula (IV) below:

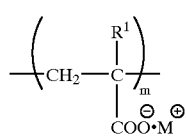 (I)

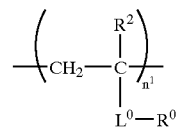 (II)

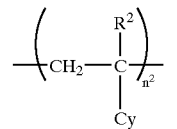 (III)

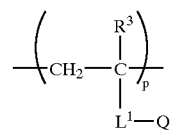 (IV)

wherein $R^1$ to $R^3$ independently represent a hydrogen atom, a halogen atom or an alkyl group having 1 to 6 carbon atoms; M represents a proton, an alkali metal ion or an ammonium ion; $L^0$ and $L^1$ independently represent a divalent linking group selected from the group consisting of —O—, —S—, —CO—, —NR$^4$—SO$^2$—, alkylene groups, alkenylene groups, arylene groups and combinations thereof; $R^4$ represents a hydrogen atom or an alkyl group containing 1 to 6 carbon atoms; $R^0$ represents a C10–100 group containing at least two aromatic rings or aromatic heterocycles; Cy represents a condensed aromatic cyclic hydrocarbon group or a condensed aromatic heterocyclic group; Q represents a polymerizable group; and m, $n^1$, $n^2$ and p represent the mol % of each repeating unit where m is 10–99 mol %, $n^1$ and $n^2$ are each 1–90 mol % and p is 0.1–20 mol %.

14. The circular polarizer of claim 11 wherein the first optically anisotropic layer contains at least an agent for promoting homogenous alignment represented by formula (V) below:

 Formula (V)

wherein Hb represents an aliphatic group having 6 to 40 carbon atoms or an aliphatic-substituted oligosiloxanoxy group having 6 to 40 carbon atoms; $L^2$ represents a divalent linking group selected from the group consisting of —O—, —S—, —CO—, —NR$^5$—, —SO$_2$—, alkylene groups, alkenylene groups, arylene groups and combinations thereof; $R^5$ represents a hydrogen atom or an alkyl group having 1 to 6 carbon atoms; n represents an integer of any of 2 to 12; and $B^1$ represents an n-valent group containing at least three cyclic structures;

and wherein the tilt angle of the rod-like liquid crystal compound is substantially less than 10°.

15. The circular polarizer of claim 11 wherein the rod-like liquid crystal compound in the first optically anisotropic layer or the second optically anisotropic layer is at least one of rod-like liquid crystal compounds of formula (VI) below:

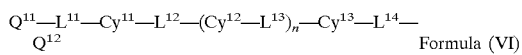 Formula (VI)

wherein $Q^{11}$ and $Q^{12}$ independently represent a polymerizable group; $L^{11}$ and $L^{14}$ independently represent a divalent linking group; $L^{12}$ and $L^{13}$ independently represent a single bond or a divalent linking group;.

$Cy^{11}$, $Cy^{12}$ and $Cy^{13}$ independently represent a divalent cyclic group; and n represents 0, 1 or 2.

16. A method for preparing a circular polarizer comprising the steps of:

forming a first alignment layer up on a front surface of a long transparent substrate, said first alignment layer having a rubbing axis at an angle of substantially −15° with respect to the longitudinal direction of the transparent substrate, forming a first optically anisotropic layer by applying a rod-like liquid crystal compound to the first alignment layer and homogenously aligning the rod-like liquid crystal compound in an azimuthal direction substantially orthogonal to the rubbing axis of the first alignment layer, so as that the first optically anisotropic layer has a phase shift substantially equal to n measured at a wavelength of 550 nm, forming a second alignment layer on the transparent substrate, said second alignment layer having a rubbing axis at an angle of substantially 15° with respect to the longitudinal direction of the transparent substrate, forming a second optically anisotropic layer by applying a rod-like liquid crystal compound to the second alignment layer and homogenously aligning the rod-like liquid crystal compound in an azimuthal direction substantially parallel to the rubbing axis of the second alignment layer, so as that the second optically anisotropic layer has a phase shift substantially equal to $\pi/2$ measured at a wavelength of 550 nm, and forming a polarizing film on a rear surface of the substrate, having an absorption axis substantially parallel to the longitudinal direction of the transparent substrate and a polarization axis in a direction substantially perpendicular to the longitudinal direction of the transparent substrate.

17. The method of claim 16 wherein the step of forming a first alignment layer and the step of forming a first optically anisotropic layer are followed by the step of forming a second alignment layer and the step of forming a second optically anisotropic layer.

18. The method of claim 16 wherein the step of forming a second alignment layer and the step of forming a second optically anisotropic layer are followed by the step of forming a first alignment layer and the step of forming a first optically anisotropic layer.

19. The method of claim 16 wherein both steps of forming a first optically anisotropic layer and a second optically anisotropic layer are forming them by applying a composition comprising the rod-like liquid crystal compound and at least an agent for promoting homogenous alignment represented by formula (V) below:

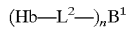  Formula (V)

wherein Hb represents an aliphatic group having 6 to 40 carbon atoms or an aliphatic-substituted oligosiloxanoxy group having 6 to 40 carbon atoms; $L^2$ represents a divalent linking group selected from the group consisting of —O—, —S—, —CO—, —NR$^5$—, —SO$_2$—, alkylene groups, alkenylene groups, arylene groups and combinations thereof; $R^5$ represents a hydrogen atom or an alkyl group having 1 to 6 carbon atoms; n represents an integer of any of 2 to 12; and $B^1$ represents an n-valent group containing at least three cyclic structures;

and homogenously aligning the rod-like liquid crystal compound in the presence of the agent, so as that the tilt angle of the rod-like liquid crystal compound is substantially less than 10°.

20. The method of claim 16 wherein the first alignment layer is formed of at least one copolymer having at least one of repeating units represented by any one of formulae (I) to (III) below and at least one of repeating units represented by formula (IV) below:

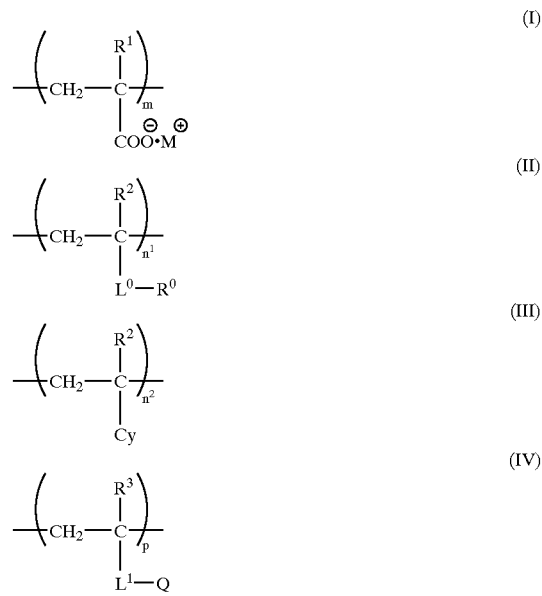

wherein $R^1$ to $R^3$ independently represent a hydrogen atom, a halogen atom or an alkyl group having 1 to 6 carbon atoms; M represents a proton, an alkali metal ion or an ammonium ion; $L^0$ and $L^1$ independently represent a divalent linking group selected from the group consisting of —O—, —S—, —CO—, —NR$^4$—, —SO$_2$—, alkylene groups, alkenylene groups, arylene groups and combinations thereof; $R^4$ represents a hydrogen atom or an alkyl group containing 1 to 6 carbon atoms; $R^0$ represents a C10–100 group containing at least two aromatic rings or aromatic heterocycles; Cy represents a condensed aromatic cyclic hydrocarbon group or a condensed aromatic heterocyclic group; Q represents a polymerizable group; and m, $n^1$, $n^2$ and p represent the mol % of each repeating unit where m is 10–99 mol %, $n^1$ and $n^2$ are each 1–90 mol % and p is 0.1–20 mol %.

21. A device comprising:

a long transparent substrate having a front surface and rear surface; and up on the front surface of the substrate, a first optically anisotropic layer formed of a homogenously aligned rod-like liquid crystal compound and having a phase shift substantially equal to n measured at a wavelength of 550 nm;

a second optically anisotropic layer formed of a homogenously aligned rod-like liquid crystal compound and having a phase shift substantially equal to $\pi/2$ measured at a wavelength of 550 nm; and a first alignment layer having a rubbing axis defining the azimuthal direction of the homogenous alignment of the rod-like liquid crystal compound in the first optically anisotropic layer; and on the rear surface of the substrate, a polarizing film having a polarization axis substantially orthogonal to the longitudinal direction of the substrate;

wherein the angle between the slow axis in the plane of the first optically anisotropic layer and the longitudinal direction of the transparent substrate is substantially 75°, the angle between the slow axis in the plane of the second optically anisotropic layer and the longitudinal direction of the transparent substrate is substantially 15°, the angle between the slow axis in the plane of the second optically anisotropic layer and the slow axis in the plane of the first optically anisotropic layer is substantially 60° and the azimuthal direction of the homogenous alignment of the rod-like liquid crystal compound in the first optically anisotropic layer is substantially orthogonal to the rubbing axis of the first alignment layer.

* * * * *